US011829422B2

(12) United States Patent
Kuwahara et al.

(10) Patent No.: US 11,829,422 B2
(45) Date of Patent: Nov. 28, 2023

(54) SYSTEM AUTOMATIC DESIGN DEVICE, SYSTEM AUTOMATIC DESIGN METHOD, AND NON-TRANSITORY COMPUTER-READABLE MEDIUM

(71) Applicant: NEC Corporation, Tokyo (JP)

(72) Inventors: Takuya Kuwahara, Tokyo (JP); Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 103 days.

(21) Appl. No.: 17/672,059

(22) Filed: Feb. 15, 2022

(65) Prior Publication Data
US 2022/0269728 A1    Aug. 25, 2022

(30) Foreign Application Priority Data

Feb. 24, 2021 (JP) .................................. 2021-027222

(51) Int. Cl.
*G06F 16/951* (2019.01)
*G06F 9/445* (2018.01)
*G06F 16/904* (2019.01)
*G06F 9/455* (2018.01)
*G06F 16/906* (2019.01)
*G06F 16/901* (2019.01)

(52) U.S. Cl.
CPC .......... *G06F 16/904* (2019.01); *G06F 16/906* (2019.01); *G06F 16/9024* (2019.01)

(58) Field of Classification Search
CPC ...... G06F 40/30; G06F 40/169; G06F 40/154; G06F 40/186; G06F 16/906; G06F 16/951; G06F 16/904; G06F 16/9024; G06N 5/041
See application file for complete search history.

(56) References Cited

U.S. PATENT DOCUMENTS

2017/0032052 A1* 2/2017 Raman ................ G06F 16/9024

FOREIGN PATENT DOCUMENTS

WO    2019/216082 A1    11/2019

OTHER PUBLICATIONS

Abdesselam et al. Bond-graph to hyper-graph transformation rules in System of Systems modelling, 6 pages (Year: 2016).*

* cited by examiner

*Primary Examiner* — Thuy Dao
(74) *Attorney, Agent, or Firm* — Sughrue Mion, PLLC

(57) ABSTRACT

A system automatic design device includes: a view generation unit configured to generate a view obtained by converting requirement data using an aspect model and to output the generated view as a pre-update view; a graph conversion unit configured to converting the requirement data or the pre-update view using a graph conversion rule; a requirement data update unit configured to reflect a content of a post-update view obtained after the pre-update view is converted on the requirement data; and a system requirement concretization unit configured to obtain system configuration data, in which the requirement data is concretized, by repeatedly performing operations of: converting the requirement data by the graph conversion unit, or converting the pre-update view into the post-update view by the graph conversion unit, and converting the requirement data by reflecting the content of the post-update view on the requirement data by the requirement data update unit.

9 Claims, 58 Drawing Sheets

Fig. 4
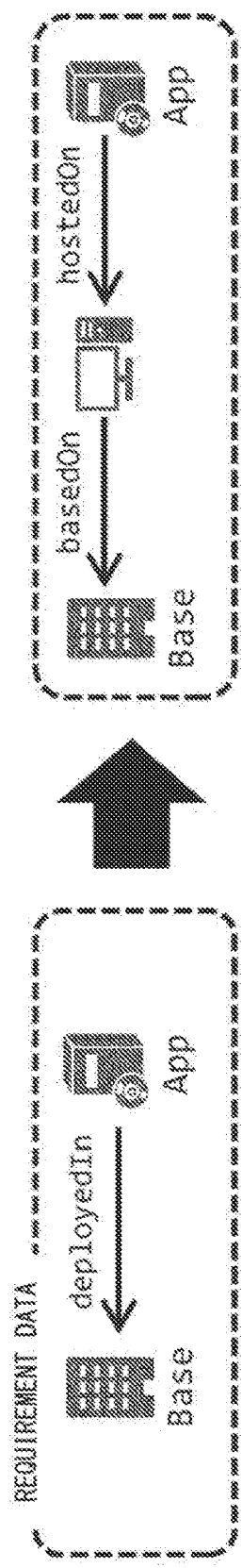
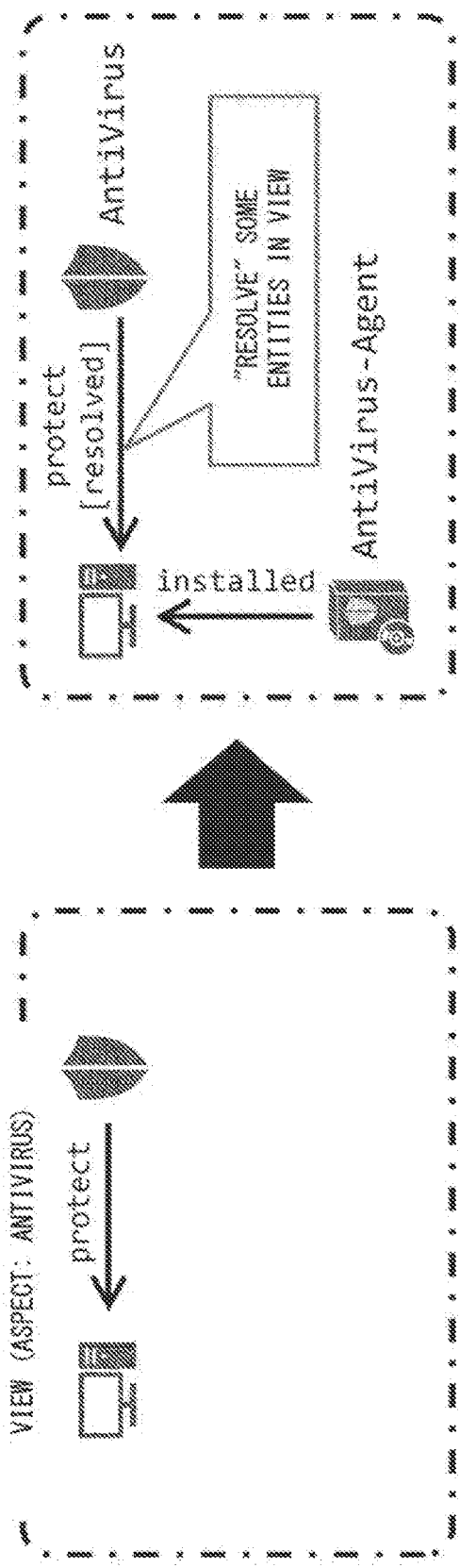

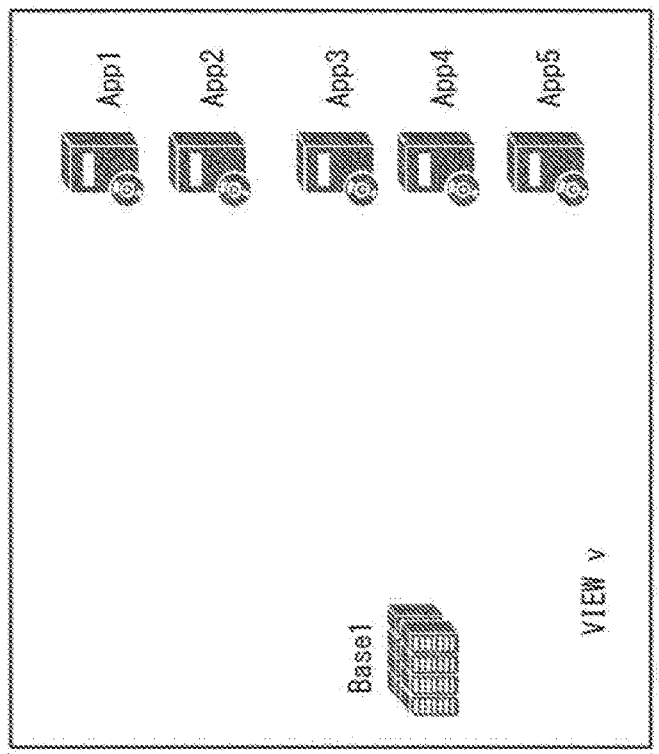
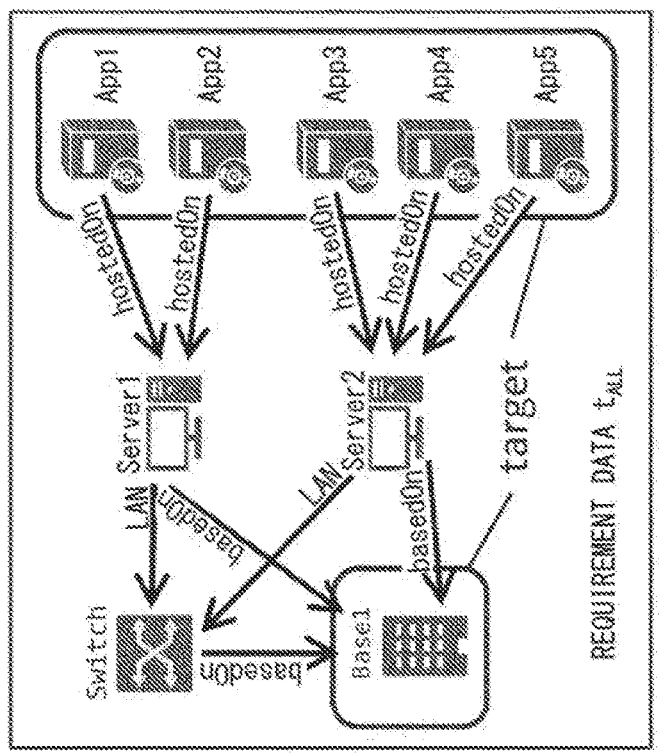
Fig. 28

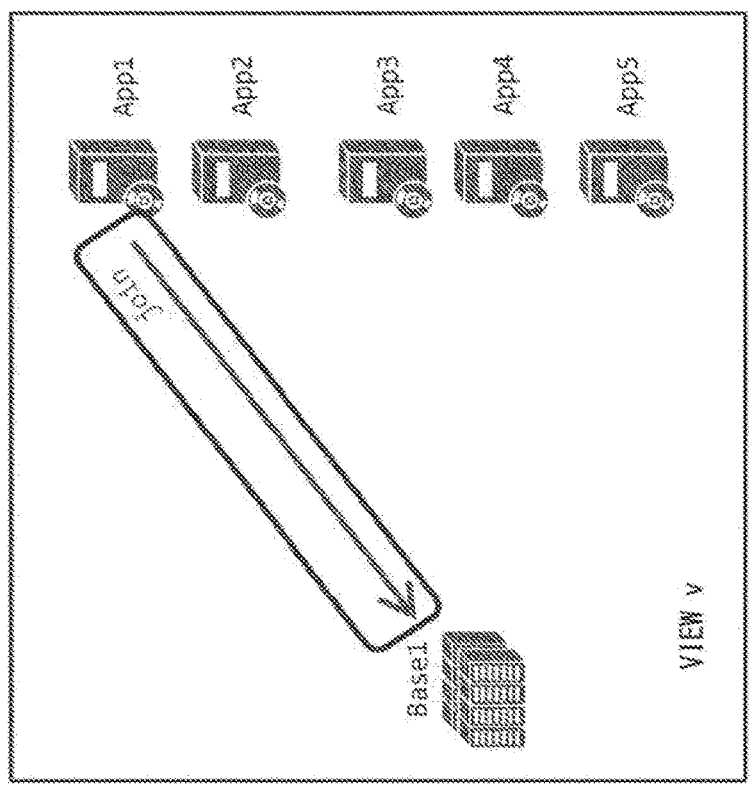
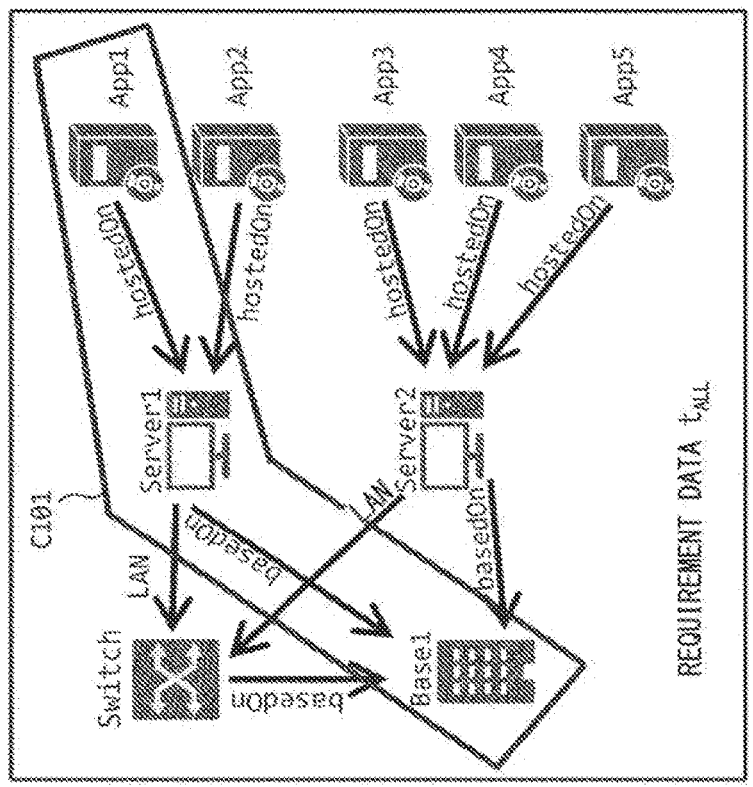
Fig. 29

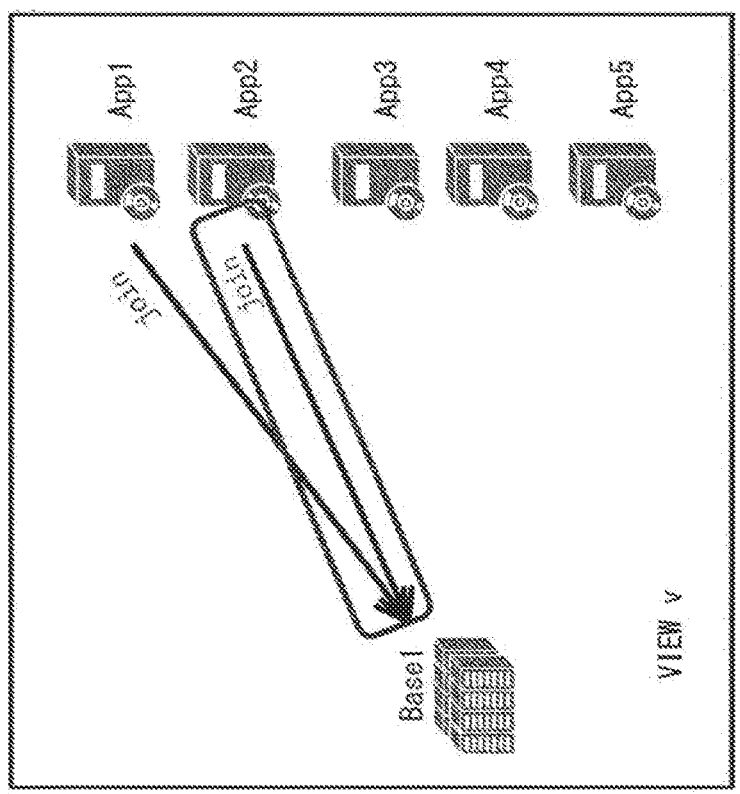
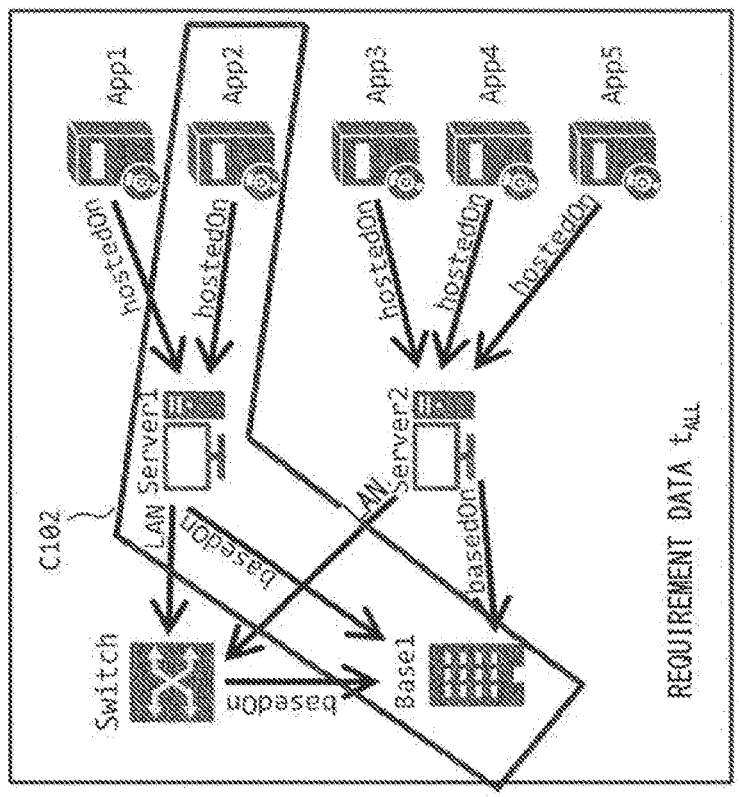
Fig. 30

Fig. 35

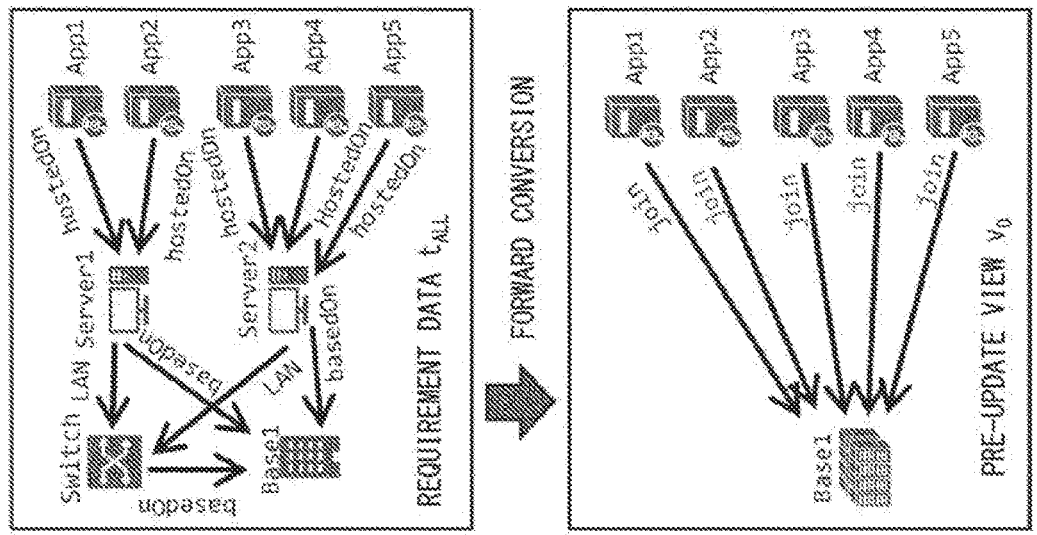

| MAPPING TABLE T | |
|---|---|
| MAPPING SOURCE | MAPPING DESTINATION |
| App1 | App1 |
| App2 | App2 |
| App3 | App3 |
| App4 | App4 |
| App5 | App5 |
| Server1 | App1 join Base1, App2 join Base1 |
| Server2 | App3 join Base1, App4 join Base1, App5 join Base1 |
| Base1 | Base1 |
| App1 hostedOn Server1 | App1 join Base1 |
| App2 hostedOn Server1 | App2 join Base1 |
| App3 hostedOn Server2 | App3 join Base1 |
| App4 hostedOn Server2 | App4 join Base1 |
| App5 hostedOn Server2 | App5 join Base1 |
| Server1 basedOn Base1 | App1 join Base1, App2 join Base1 |
| Server2 basedOn Base1 | App3 join Base1, App4 join Base1, App5 join Base1 |

Fig. 39

MAPPING TABLE T (BEFORE DELETION)

| MAPPING SOURCE | MAPPING DESTINATION |
|---|---|
| App1 | App1 |
| App2 | App2 |
| App3 | App3 |
| App4 | App4 |
| App5 | App5 |
| Server1 | App1 —join→ Base1, App2 —join→ Base1 |
| Server2 | App3 —join→ Base1, App4 —join→ Base1, App5 —join→ Base1 |
| Base1 | Base1 |
| App1 —hostedOn→ Server1 | App1 —join→ Base1 |
| App2 —hostedOn→ Server1 | App2 —join→ Base1 |
| App3 —hostedOn→ Server2 | App3 —join→ Base1 |
| App4 —hostedOn→ Server2 | App4 —join→ Base1 |
| App5 —hostedOn→ Server2 | App5 —join→ Base1 |
| Server1 —basedOn→ Base1 | App1 —join→ Base1, App2 —join→ Base1 |
| Server2 —basedOn→ Base1 | App3 —join→ Base1, App4 —join→ Base1, App5 —join→ Base1 |

Fig. 40

MAPPING TABLE T (AFTER DELETION)

| MAPPING SOURCE | MAPPING DESTINATION |
|---|---|
| App1 | |
| App2 | |
| App3 | App3 |
| App4 | App4 |
| App5 | App5 |
| Server1 | |
| Server2 | App4 $\xrightarrow{join}$ Base1, App5 $\xrightarrow{join}$ Base1 |
| Base1 | Base1 |
| App1 $\xrightarrow{hostedOn}$ Server1 | |
| App2 $\xrightarrow{hostedOn}$ Server1 | |
| App3 $\xrightarrow{hostedOn}$ Server2 | |
| App4 $\xrightarrow{hostedOn}$ Server2 | App4 $\xrightarrow{join}$ Base1 |
| App5 $\xrightarrow{hostedOn}$ Server2 | App5 $\xrightarrow{join}$ Base1 |
| Server1 $\xrightarrow{basedOn}$ Base1 | |
| Server2 $\xrightarrow{basedOn}$ Base1 | App4 $\xrightarrow{join}$ Base1, App5 $\xrightarrow{join}$ Base1 |

Fig. 42

MAPPING TABLE T

| MAPPING SOURCE | MAPPING DESTINATION |
|---|---|
| App3 | App3 |
| App4 | App4 |
| App5 | App5 |
| Server2 | App4 $\xrightarrow{join}$ Base1, App5 $\xrightarrow{join}$ Base1 |
| Base1 | Base1 |
| App4 $\xrightarrow{hostedOn}$ Server2 | App4 $\xrightarrow{join}$ Base1 |
| App5 $\xrightarrow{hostedOn}$ Server2 | App5 $\xrightarrow{join}$ Base1 |
| Server2 $\xrightarrow{basedOn}$ Base1 | App4 $\xrightarrow{join}$ Base1, App5 $\xrightarrow{join}$ Base1 |

SYSTEM AUTOMATIC DESIGN DEVICE, SYSTEM AUTOMATIC DESIGN METHOD, AND NON-TRANSITORY COMPUTER-READABLE MEDIUM

INCORPORATION BY REFERENCE

This application is based upon and claims the benefit of priority from Japanese patent application No. 2021-027222, filed on Feb. 24, 2021, the disclosure of which is incorporated herein in its entirety by reference.

TECHNICAL FIELD

The present disclosure relates to a system automatic design device, a system automatic design method, and a non-transitory computer-readable medium.

BACKGROUND ART

There is a technique for concretizing stepwisely abstract system requirements representing a computer system configuration, an IoT (Internet of Things) system configuration, and an ICT (Information and Communication Technology) system configuration and converting the abstract system requirements into concrete system configurations.

For example, a technique is disclosed in International Patent Publication No. WO 2019/216082 in which system requirements are represented by graph-like requirement data formed by nodes corresponding to components of a system and edges defining a relation between two nodes, and the graph-like requirement data is converted into a concrete system configuration using a concretization rule.

As described above, according to the related technique such as the technique disclosed in International Patent Publication No. WO 2019/216082, the graph-like requirement data is concretized stepwisely to generate a concrete system configuration. Here, the "graph-like requirement data" is data (data set) that is represented in the form of a graph (the same applies hereinafter) and forms system configuration requirements (system requirements). At this time, the requirements to be concretized in the related technique are represented in the form of a graph.

However, the graph-like requirement data has a problem that properties required for system requirements are not always represented as an entity of the graph. Specifically, since the properties are not directly described in any graph, even when such any graph indicates properties required for the system requirements, there may be requirements that cannot be represented by such any graph.

However, according to the related technique, the requirements not represented in the graph are not targets to be concretized, and thus may not be handled.

SUMMARY

Therefore, the present disclosure is to solve the above-described problem, and to provide a system automatic design device, a system automatic design method, and a non-transitory computer-readable medium that are capable of handling requirements not represented in graph-like requirement data.

An aspect of the present disclosure provides a system automatic design device including:
a view generation unit configured to input requirement data that is a graph representing system requirements, to input an aspect model that is a model defining a conversion method of converting into a graph in which alternative representation of the system requirements represented by the requirement data is given, to generate a view that is a graph obtained by converting the requirement data using the aspect model, and to output the generated view as a pre-update view;
a graph conversion unit configured to input the requirement data or the pre-update view, to input a graph conversion rule to the requirement data or the pre-update view, the graph conversion rule being data representing a rule for converting a substructure, which matches a specific structure, into a more concretized entity, and to convert the requirement data or the pre-update view using the graph conversion rule;
a requirement data update unit configured to input the requirement data, to input a post-update view that is a view obtained after the pre-update view is converted, and to reflect a content of the post-update view on the requirement data; and
a system requirement concretization unit configured to output system configuration data that is a graph in which the requirement data is concretized, wherein
the system requirement concretization unit being configured to obtain the system configuration data by repeatedly performing operations of:
converting the requirement data by the graph conversion unit, or
converting the pre-update view into the post-update view by the graph conversion unit, and converting the requirement data by reflecting the content of the post-update view on the requirement data by the requirement data update unit.

Another aspect of the present disclosure provides a system automatic design method performed by the system automatic design device, the method including:
a view generation step of inputting requirement data that is a graph representing system requirements, inputting an aspect model that is a model defining a conversion method of converting into a graph in which alternative representation of the system requirements represented by the requirement data is given, generating a view that is a graph obtained by converting the requirement data using the aspect model, and outputting the generated view as a pre-update view;
a graph conversion step of inputting the requirement data or the pre-update view, inputting a graph conversion rule to the requirement data or the pre-update view, the graph conversion rule being data representing a rule for converting a substructure, which matches a specific structure, into a more concretized entity, and converting the requirement data or the pre-update view using the graph conversion rule; and
a requirement data update step of inputting the requirement data, inputting a post-update view that is a view obtained after the pre-update view is converted, and reflecting a content of the post-update view on the requirement data, wherein
system configuration data being a graph in which the requirement data is concretized is obtained by repeatedly performing operations of:
converting the requirement data by the graph conversion step, or
converting the pre-update view into the post-update view by the graph conversion step, and converting the requirement data by reflecting the content of the post-update view on the requirement data by the requirement data update step.

Still another aspect of the present disclosure provides a non-transitory computer-readable medium in which a program is stored, the program causing a computer to execute:

a view generation function of inputting requirement data that is a graph representing system requirements, inputting an aspect model that is a model defining a conversion method of converting into a graph in which alternative representation of the system requirements represented by the requirement data is given, generating a view that is a graph obtained by converting the requirement data using the aspect model, and outputting the generated view as a pre-update view;

a graph conversion function of inputting the requirement data or the pre-update view, inputting a graph conversion rule to the requirement data or the pre-update view, the graph conversion rule being data representing a rule for converting a substructure, which matches a specific structure, into a more concretized entity, and converting the requirement data or the pre-update view using the graph conversion rule;

a requirement data update function of inputting the requirement data, to input a post-update view that is a view obtained after the pre-update view is converted, and reflecting a content of the post-update view on the requirement data; and a system requirement concretization function of outputting system configuration data that is a graph in which the requirement data is concretized, wherein in the system requirement concretization function, the system configuration data is obtained by repeatedly performing operations of:

converting the requirement data by the graph conversion function, or converting the pre-update view into the post-update view by the graph conversion function, and converting the requirement data by reflecting the content of the post-update view on the requirement data by the requirement data update function.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 4 is a view illustrating an example of a requirement data concretization pattern and a view concretization pattern according to the present disclosure;

FIG. 28 is a view illustrating a concrete example of operations of steps S304 to S306 shown in FIG. 24;

FIG. 29 is a view illustrating a concrete example of operations of steps S308 to S311 shown in FIG. 25;

FIG. 30 is a view illustrating a concrete example of operations of steps S308 to S311 shown in FIG. 25;

FIG. 35 is a view illustrating a concrete example of an operation of step S402 shown in FIG. 32;

FIG. 39 is a view illustrating a concrete example of operations of steps S407 and S408 shown in FIG. 33;

FIG. 40 is a view illustrating a concrete example of operations of steps S407, S408, and S410 shown in FIG. 33;

FIG. 42 is a view illustrating a concrete example of an operation of step S411 shown in FIG. 33;

EMBODIMENTS

Prior to a description of example embodiments of the present disclosure, details of a task of the present disclosure and an outline of the present disclosure will be described.

<Task and Outline of Present Disclosure>

First, an automatic design process will be described as a premise of the present disclosure.

In the automatic design process, concretization patterns are applied so that requirement data representing abstract system requirements is concretized stepwisely and is converted into a concrete system configuration. The requirement data is a graph representing system requirements, and is configured by an entity including nodes corresponding to components of the system and an edge defining a relation between two nodes.

Here, a plurality of applicable concretization patterns exist in general. Therefore, a plurality of concretization patterns are applied to the requirement data in the automatic design process, whereby processing (that is, concretization) proceeds by trial and error of multiple possibilities.

Figure 1:
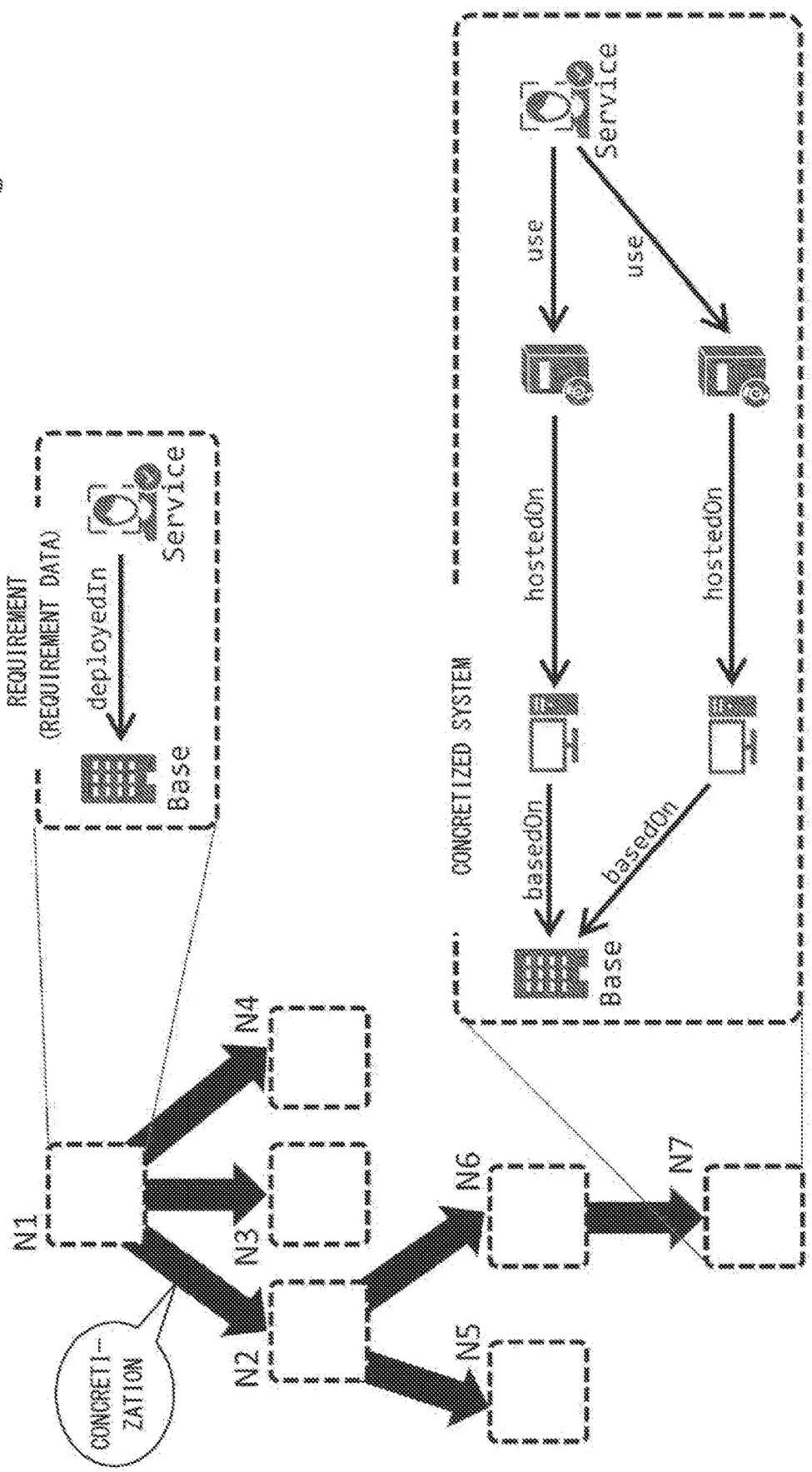
FIG. 1 is a view illustrating an image example of an existing automatic design process.

For this reason, the automatic design process proceeds in the form of a search tree as shown in FIG. 1. In FIG. 1, dotted quadrangles represent requirement data (the same applies to the following drawings). In the example of FIG. 1, a root of a search tree is a node N1, three concretization patterns are applied to requirement data of the node N1, two concretization patterns are applied to requirement data of a node N2, and one concretization pattern is applied to requirement data of a node N6. As a result, concrete system configuration data can be obtained in which the requirement data are concreted in a node N7.

However, requirements to be concretized in the existing automatic design process are requirements represented in the graph-like requirement data. Therefore, requirements directly not represented as entities in the requirement data are not be concretized, resulting in causing a problem that such requirements cannot be handled.

The above-described task will be described in detail below with reference to FIG. 2.

Figure 2:
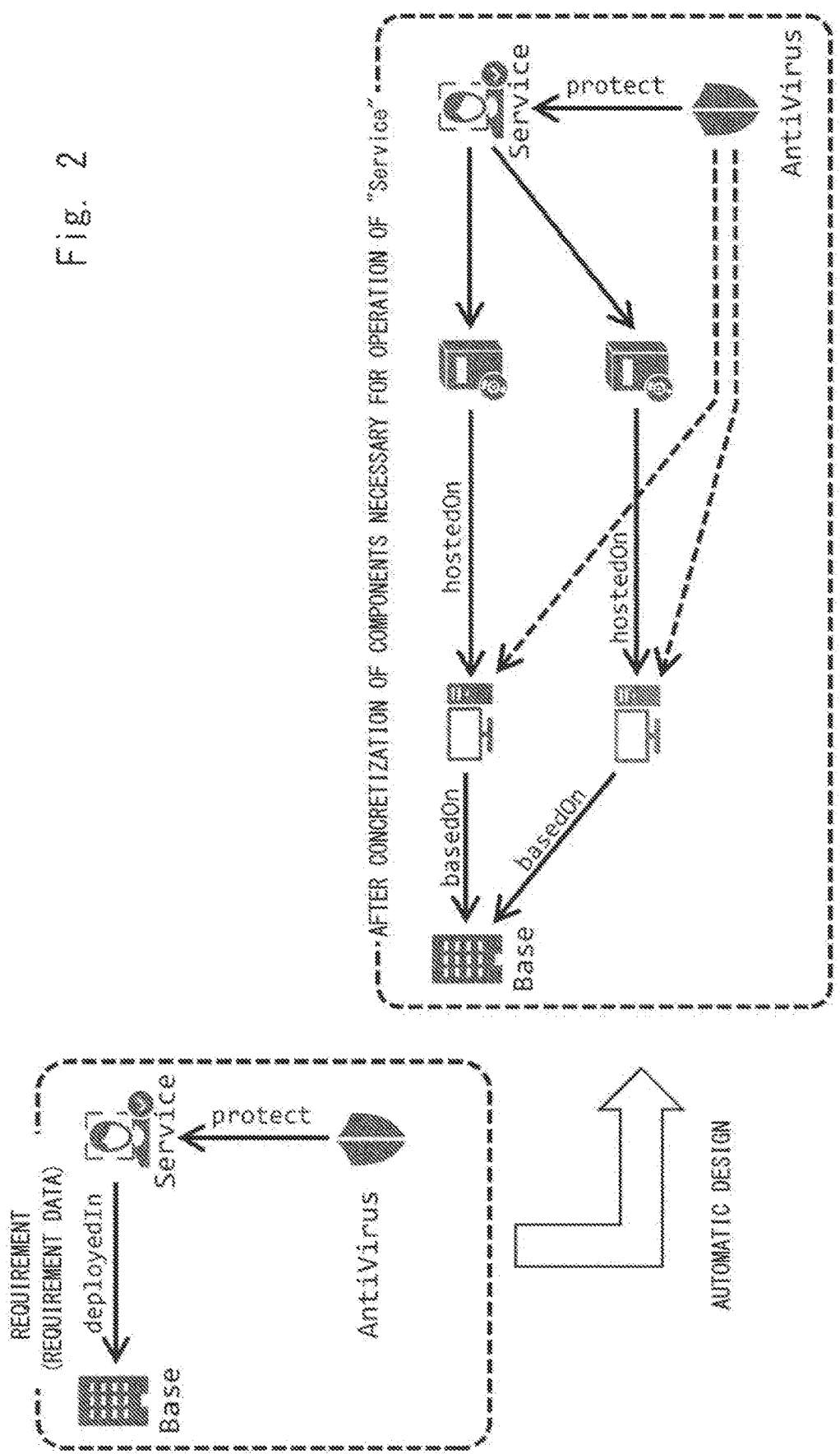
FIG. 2 is a view illustrating a problem of the existing automatic design process.

It is assumed that requirement data (requirement) shown in FIG. 2 is schematically a system requirement that "We want to install an antivirus software (AntiVirus) agent on all machines that operate a service".

Therefore, the requirement data shown in FIG. 2 contains a requirement that "AntiVirus needs to support these machines", although not directly being described.

In order to generate a configuration that satisfies the above-described requirement, first, an edge (a dotted arrow in the drawing) of "need to be installed" is required to be spread between the "machine that operates a service" and the AntiVirus. To achieve such a configuration with the existing automatic design process, the requirement data needs to represent an entity that directly links AntiVirus to the machine.

However, since the requirement that "AntiVirus needs to support these machines" is not represented in the requirement data, it is not a target for concretization, and as a result, the above-described edge of "need to be installed" cannot be spread.

Figure 3:
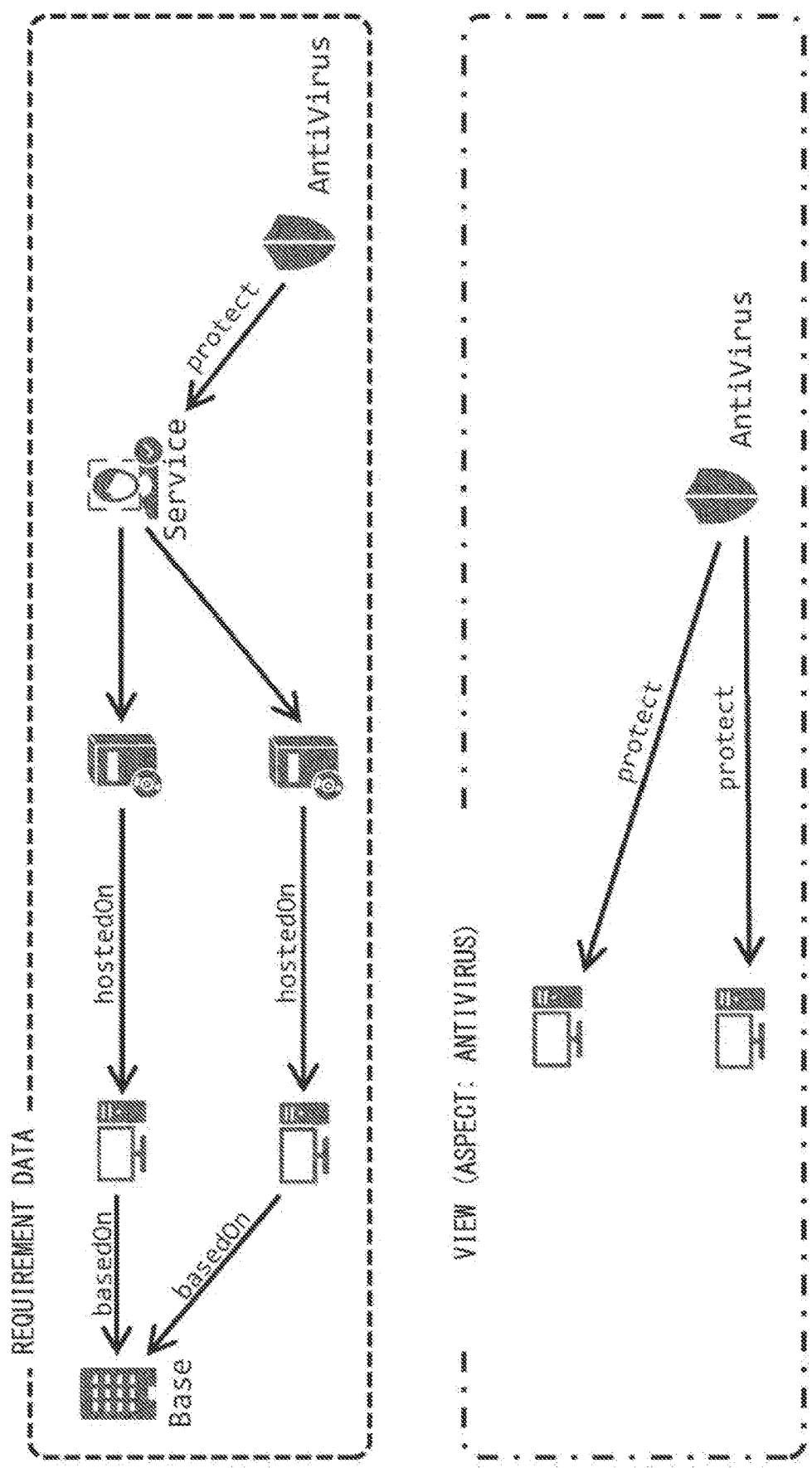
FIG. 3 is a view illustrating an example of a view according to the present disclosure.

Therefore, in the present disclosure, a view is generated from the requirement data to explicitly have a requirement not represented in the requirement data as an edge or a node as shown in FIG. 3. In FIG. 3, a quadrangle of an alternate long and short dash line indicates a view (the same applies to the following drawings). An aspect model is used to generate the view from the requirement data.

The aspect model is a model that defines a conversion method of converting the requirement data into a graph in which alternative representation of the system requirements represented by the requirement data is given. In other words, the aspect model is a model that defines a conversion method of converting a substructure in the requirement data into an entity. In addition, the view is a graph obtained by converting the requirement data using the aspect model.

In the example of FIG. 3, a view is generated from the requirement data using an aspect model called an antivirus. In the generated view, an edge "protect" indicating "need to be installed" is spread toward two nodes, which represent machines that operate a service, from a node "AntiVirus".

As shown in FIG. 4, the present disclosure includes not only an existing concretization pattern (hereinafter, referred to as a requirement data concretization pattern) for concretizing the requirement data but also a concretization pattern (hereinafter, referred to as a view concretization pattern) for concretizing the view. Therefore, not only requirements contained in the requirement data but also requirements contained in the view can be concretized.

An application example of the view concretization pattern will be described herein with reference to FIG. 5.

Figure 5:
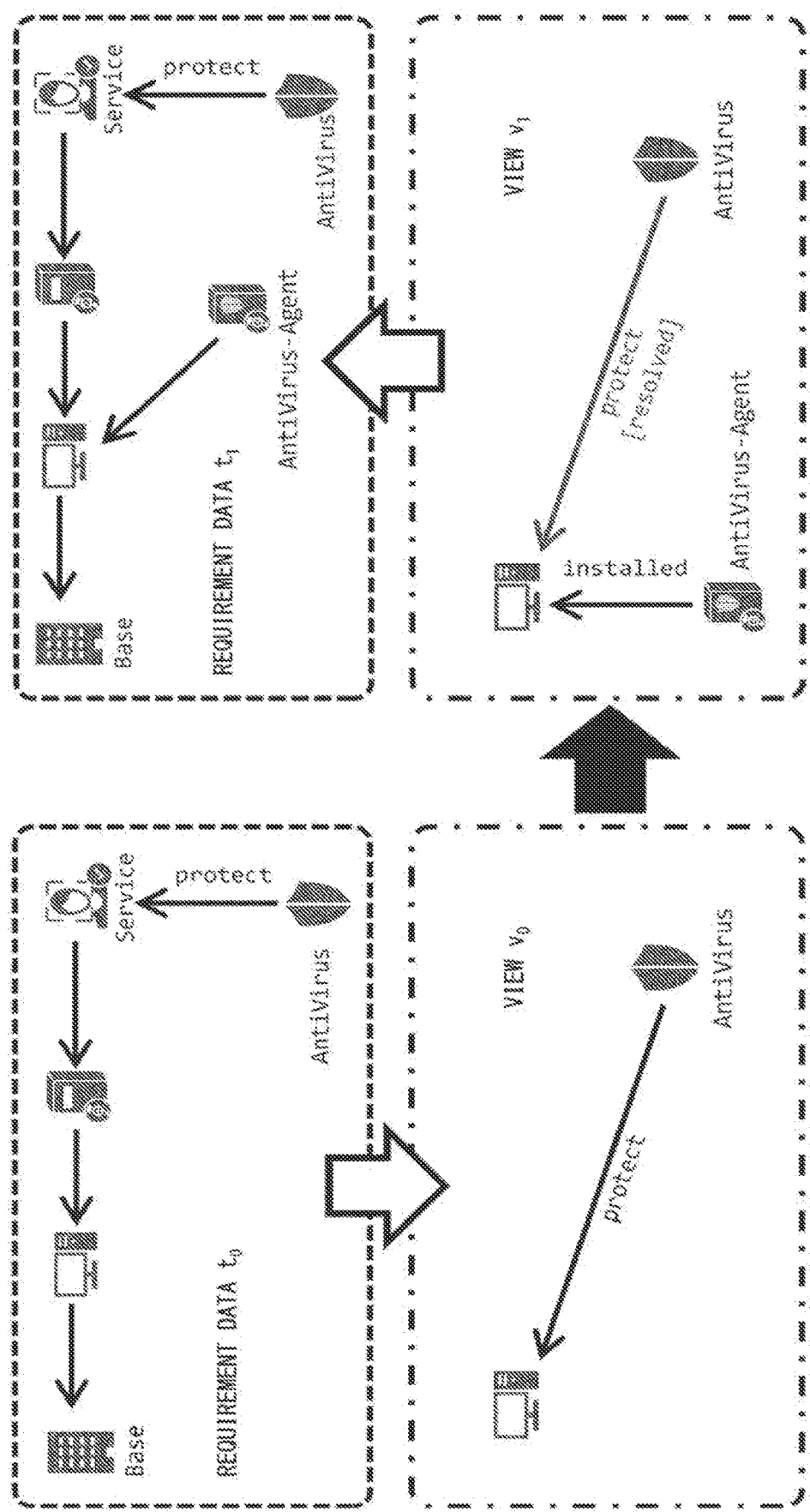
FIG. 5 is a view illustrating an application example of the view concretization pattern according to the present disclosure.

As shown in FIG. 5, first, a view $v_0$ is generated from requirement data $t_0$ using an aspect model. Next, a view $v_1$ is obtained by concretization of the view $v_0$ using the view concretization pattern. Then, a content of the view $v_1$ is reflected in the requirement data $t_0$ to obtain requirement data $t_1$. In other words, the view $v_1$ is converted into the requirement data $t_1$. As a result, in this application example, when the view $v_0$ is converted into the view $v_1$ by concretization, the requirement data $t_0$ can be converted into the requirement data $t_1$ by concretization.

An image example of the automatic design process according to the present disclosure will be described herein with reference to FIG. 6.

Figure 6:
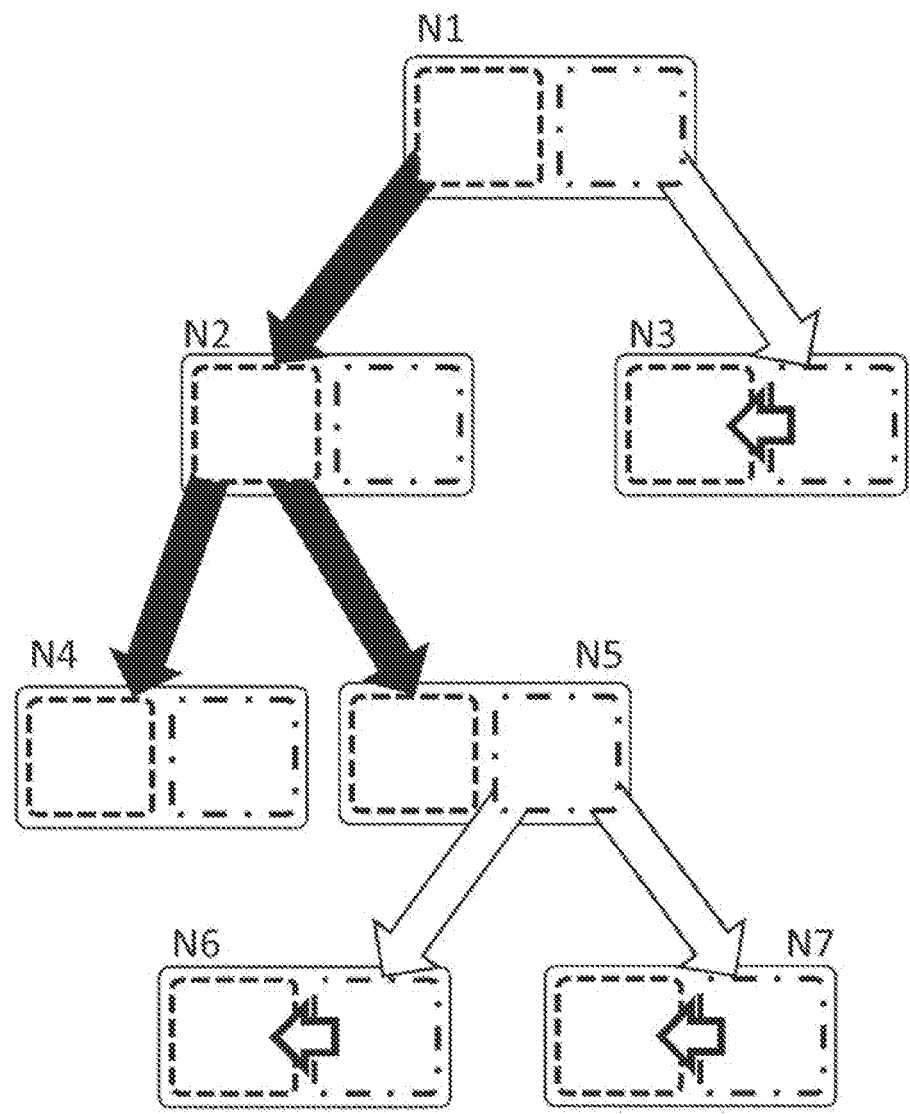
FIG. 6 is a view illustrating an image example of the automatic design process according to the present disclosure.

In the automatic design process according to the present disclosure, as shown in FIG. 6, each of nodes of a search tree includes requirement data and a view.

A conversion into a node N2 from a node N1 and a conversion into each of nodes N4 and N5 from the node N2 are the same conversions as in the existing automatic design process shown in FIG. 1. In other words, requirement data is converted using a requirement data concretization pattern in these conversions.

On the other hand, a conversion into a node N3 from the node N1 and a conversion into each of nodes N6 and N7 from the node N5 are conversions peculiar to the automatic design process according to the present disclosure. In other words, a view is converted using a view concretization pattern and a content of the converted view is reflected in the requirement data in these conversions.

As described above, according to the present disclosure, a mechanism is added to make concrete not only the requirements contained in the requirement data but also the requirements contained in the view. This makes it possible to handle requirements that cannot be represented in the requirement data.

Hereinafter, example embodiments according to the present disclosure will be described with reference to the drawings. Note that the following description and the drawings are omitted and simplified as appropriate for clarifying the description. Further, in each of the following drawings, the same components are designated by the same reference numerals, and are not described repeatedly as necessary.

First Example Embodiment

Configuration of First Example Embodiment

Figure 7:
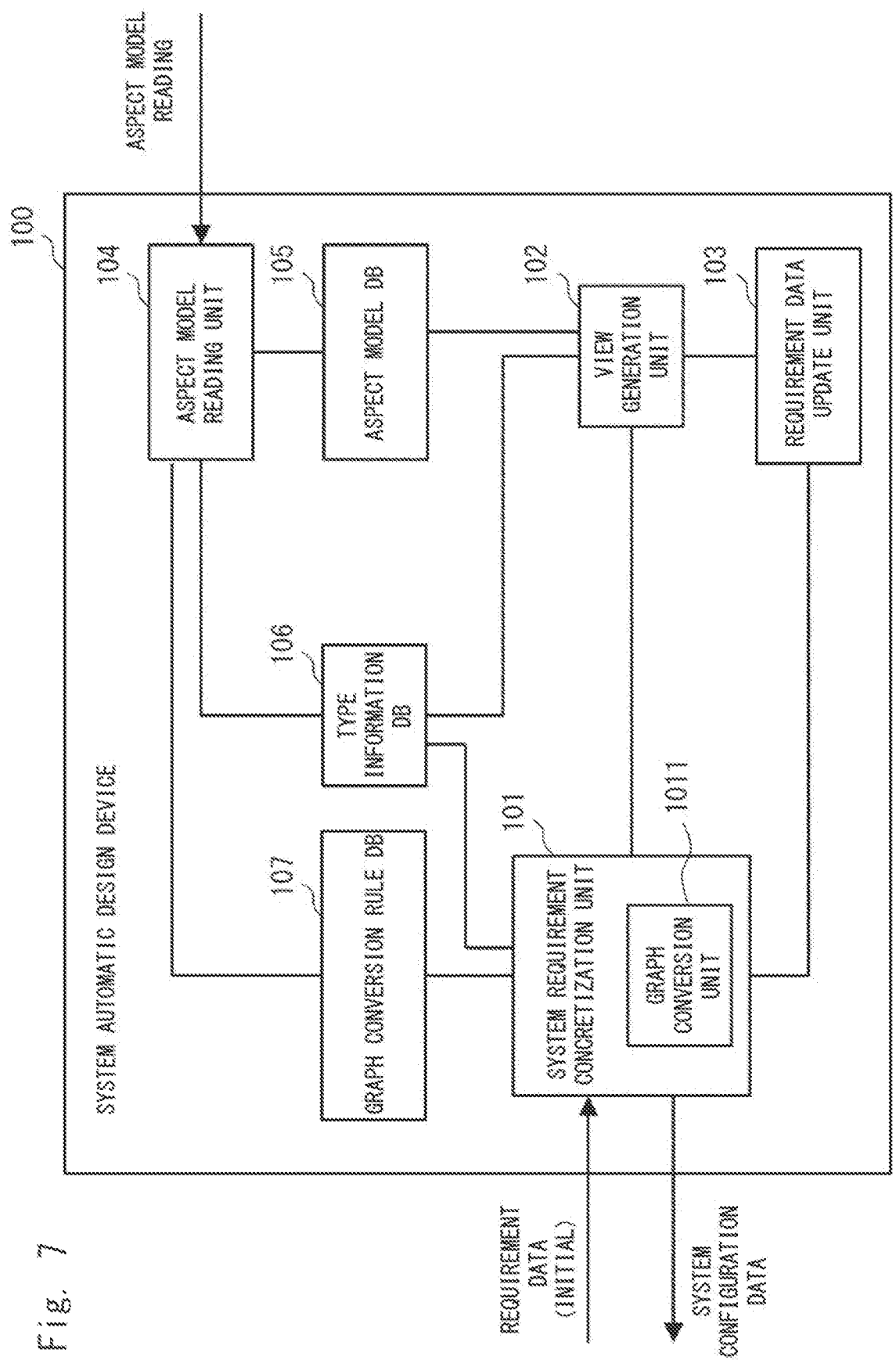
FIG. 7 is a block diagram showing a configuration example of a system automatic design device according to a first example embodiment.

First, a configuration of a system automatic design device 100 according to a first example embodiment will be described with reference to FIG. 7. As shown in FIG. 7, the system automatic design device 100 according to the first example embodiment includes a system requirement concretization unit 101, a view generation unit 102, a requirement data update unit 103, an aspect model reading unit 104, an aspect model DB (Data Base) 105, a type information DB 106, and a graph conversion rule DB 107.

The system requirement concretization unit 101 inputs initial requirement data from an input/output device (not shown), inputs a graph conversion rule from the graph conversion rule DB 107, inputs type information (data containing an "abstract type stub(t)" to be described below and representing a type of entity) from the type information DB 106, and inputs a view (pre-update view) from the view generation unit 102. The requirement data and the view are as described above. The graph conversion rule is data representing a rule for converting a substructure, which matches a specific structure, into a more concretized entity for the requirement data or the view. The graph conversion rule includes the requirement data concretization pattern for converting the requirement data and the view concretization pattern for converting the view. The type information will be described below.

Further, the system requirement concretization unit 101 includes a graph conversion unit 1011. The graph conversion unit 1011 converts the requirement data using the requirement data concretization pattern, or converts the pre-update view using the view concretization pattern.

The system requirement concretization unit 101 converts the initial requirement data stepwisely to make sufficiently concrete, and outputs the sufficiently concrete requirement data as system configuration data to the input/output device (not shown). The system configuration data is a graph representing a concrete system configuration.

Here, according to the first example embodiment, there are two kinds of conversion methods for converting the requirement data as follows:

(1) First Conversion Method

A first conversion method is a method of converting the requirement data by applying the requirement data concretization pattern using the graph conversion unit 1011. The conversion by the first conversion method is the same conversion as in the existing automatic design process.

(2) Second Conversion Method

A second conversion method is a method of converting the view (pre-update view) by applying the view concretization pattern using the graph conversion unit 1011, and of converting the requirement data by reflecting the content of a view (post-update view), which is obtained after the pre-update view is converted, on the requirement data using the requirement data update unit 103. The conversion by the second conversion method is a conversion peculiar to the automatic design process according to the first example embodiment.

Operations of the view generation unit 102 and the requirement data update unit 103 to be described below are operations for realizing the second conversion method described above.

The view generation unit 102 inputs requirement data from the system requirement concretization unit 101, inputs an aspect model from the aspect model DB 105, and inputs type information from the type information DB 106. The aspect model is as described above. Here, the view generation unit 102 is notified of a desired aspect model (hereinafter, referred to as a "selected aspect model") selected by the system requirement concretization unit 101. For this reason, the view generation unit 102 inputs the selected aspect model from the aspect model DB 105.

The view generation unit 102 generates a view from the requirement data using the selected aspect model. In addition, the view generation unit 102 outputs, as a pre-update view, the generated view to the system requirement concretization unit 101.

The requirement data update unit 103 inputs the requirement data and the post-update view from the system requirement concretization unit 101. The post-update view is a view obtained after the pre-update view is converted by the graph conversion unit 1011 of the system requirement concretization unit 101. Then, the requirement data update unit 103 reflects the content of the post-update view on the requirement data. In other words, the requirement data update unit 103 converts the post-update view into requirement data. Then, the requirement data update unit 103 outputs the requirement data, which is converted from the post-update view, to the system requirement concretization unit 101.

Details of the aspect model reading unit 104, the aspect model DB 105, the type information DB 106, and the graph conversion rule DB 107 will be described below.

Schematic Operation of First Example Embodiment

Subsequently, a description will be given with reference to FIG. 8 with respect to a flow of a schematic operation of the system automatic design device 100 according to the first example embodiment.

Figure 8:
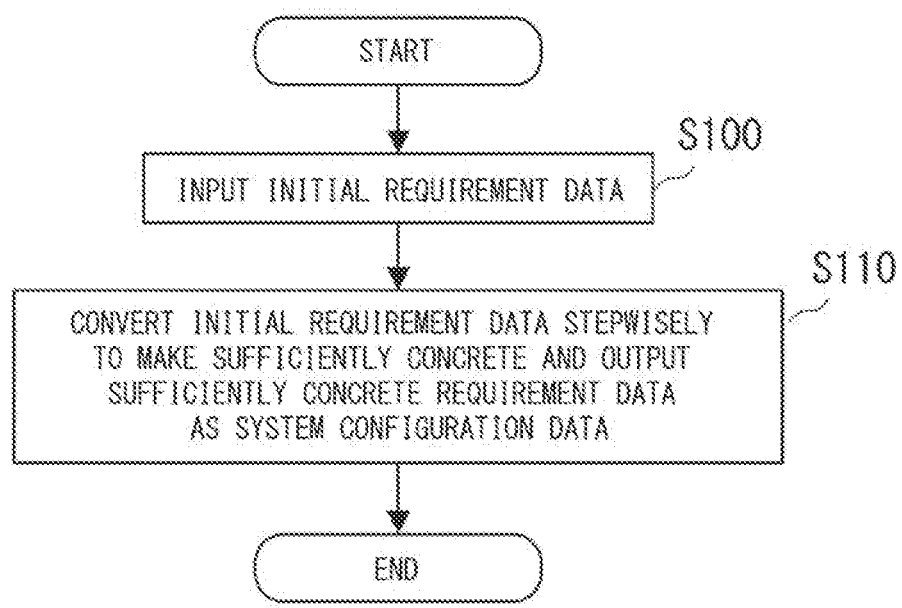
FIG. 8 is a flowchart illustrating an example of a flow of a schematic operation of the system automatic design device according to the first example embodiment.

As shown in FIG. 8, first, the system requirement concretization unit 101 inputs initial requirement data from the input/output device (not shown) (step S100). Thereafter, the system requirement concretization unit 101 converts the initial requirement data stepwisely to make sufficiently concrete, and outputs the sufficiently concrete requirement data as concrete system configuration data to the input/output device (not shown) (step S110). At this time, as the conversion method of the requirement data, either the first conversion method or the second conversion method described above is used.

Subsequently, a description will be given with reference to FIG. 9 with respect to a flow of a schematic operation in which the requirement data is converted using the second conversion method in the system automatic design device 100 according to the first example embodiment.

Figure 9:
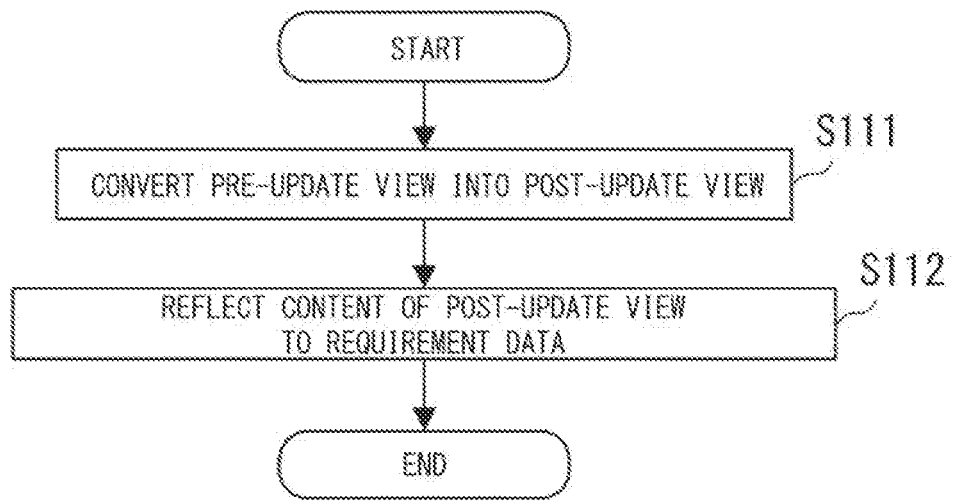
FIG. 9 is a flowchart illustrating an example of a flow of a schematic operation at the time of converting requirement data using a second conversion method in the system automatic design device according to the first example embodiment.

As shown in FIG. 9, first, the system requirement concretization unit 101 converts the pre-update view into the post-update view by applying the view concretization pattern using the graph conversion unit 1011, and outputs the converted post-update view to the requirement data update unit 103 together with the requirement data (step S111).

Thereafter, the requirement data update unit 103 reflects the content of the post-update view on the requirement data, and outputs the requirement data, on which the content of the post-update view is reflected, to the system requirement concretization unit 101 (step S112). Thereby, the requirement data is converted.

Hereinafter, the system automatic design device 100 according to the first example embodiment will be described in detail.

<Aspect Model>

First, a plurality of aspect models prepared in advance in the aspect model DB 202 will be described.

As described above, the aspect model is a model that defines a conversion method of converting the requirement data into a graph in which alternative representation of the system requirements represented by the requirement data is given. In other words, the aspect model is a model that indicates information on how to convert and display the requirement data.

The aspect model is manually generated according to the purpose such as "antivirus", "application deployment", "NW (Network) continuity", and "inter-service cooperation", and is registered in advance in the aspect model DB 105. The aspect model may be customized as necessary even after being registered in the aspect model DB 105.

The aspect model (that is, the "selected aspect model" described above) referenced for view generation is selected by the system requirement concretization unit 101. The aspect model selected by the system requirement concretization unit 101 is given as an input to the view generation unit 102 from the aspect model DB 105.

Among the plurality of aspect models, any aspect model includes node conversion mapping and edge conversion mapping. Both the node conversion mapping and the edge conversion mapping are to convert a substructure in the requirement data into an entity that is a node or an edge.

Figure 10:
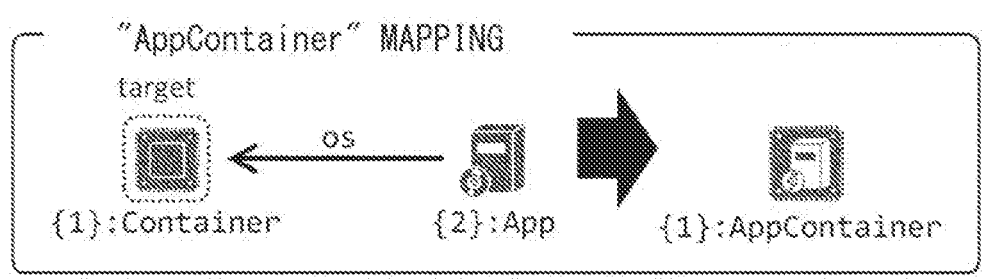
FIG. 10 is a view illustrating an example of node conversion mapping.

The node conversion mapping is to convert the substructure in the requirement data into a node. An example of "AppContainer" mapping, which is an example of the node conversion mapping, will be described with reference to FIG. 10. In the example of FIG. 10, a substructure (hereinafter, referred to as a conversion structure as appropriate) on a left side of an arrow in the requirement data is converted into a node "AppContainer" by "AppContainer" mapping. Note that the node conversion mapping is performed under a condition that only one node is designated as a "target". In addition, one node having the same ID (Identity) as "target" is generated by the node conversion mapping.

Figure 11:
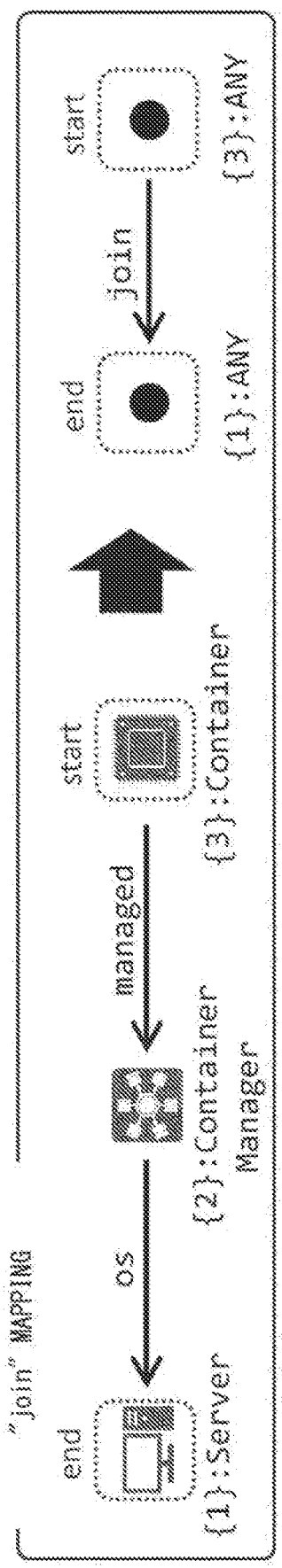
FIG. 11 is a view illustrating an example of edge conversion mapping.

In addition, the edge conversion mapping is to convert a substructure in the requirement data into an edge. An example of "join" mapping, which is an example of the edge conversion mapping, will be described with reference to FIG. 11. In the example of FIG. 11, a conversion structure on the left side of the arrow contained in the requirement data is converted into an edge $$\text{ANY} \xrightarrow{\text{join}} \text{ANY}$$

by "join" mapping. The edge conversion mapping is performed under a condition that one node is specified by "start" and one node is specified by "end". Further, the edge conversion mapping causes the edge to spread from the node specified by "start" to the node specified by "end".

Thereafter, a type generated as a result of mapping is referred to as a mapping generation type. In the example of FIG. 10, the node "AppContainer" is a generation type, and the edge $$\text{ANY} \xrightarrow{\text{join}} \text{ANY}$$

is a generation type in the example of FIG. 11. These generation types will be added to the view as entities.

Figure 12:
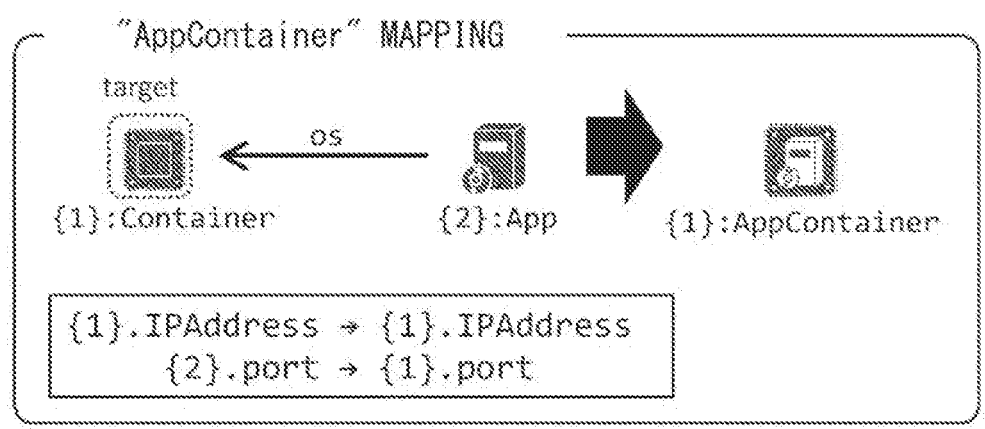
FIG. 12 is a view illustrating an example of a property of the node conversion mapping.

In addition, the mapping can have property mapping information indicating a correspondence relation between a property associated with the entity in the requirement data and a property associated with the entity in the view. An example of a property of the "AppContainer" mapping will be described with reference to FIG. 12. A property associated with an entity on a left side of an arrow in the requirement data corresponds to a property associated with an entity on a right side of an arrow in the view one-to-one. In the example of FIG. 12, a property "IPAddress" of a node "Container" on the left side of the arrow corresponds one-to-one to a property "IPAddress" of a node "AppContainer" on the right side of the arrow. In addition, a property "port" of a node "App" on the left side of the arrow corresponds one-to-one to a property "port" of the node "AppContainer" on the right side of the arrow.

<Operation During Reading of Aspect Model>

Subsequently, an operation during reading of the aspect model will be described.

First, an example of a flow of the operation during reading of the aspect model will be described with reference to FIG. 13.

Figure 13:
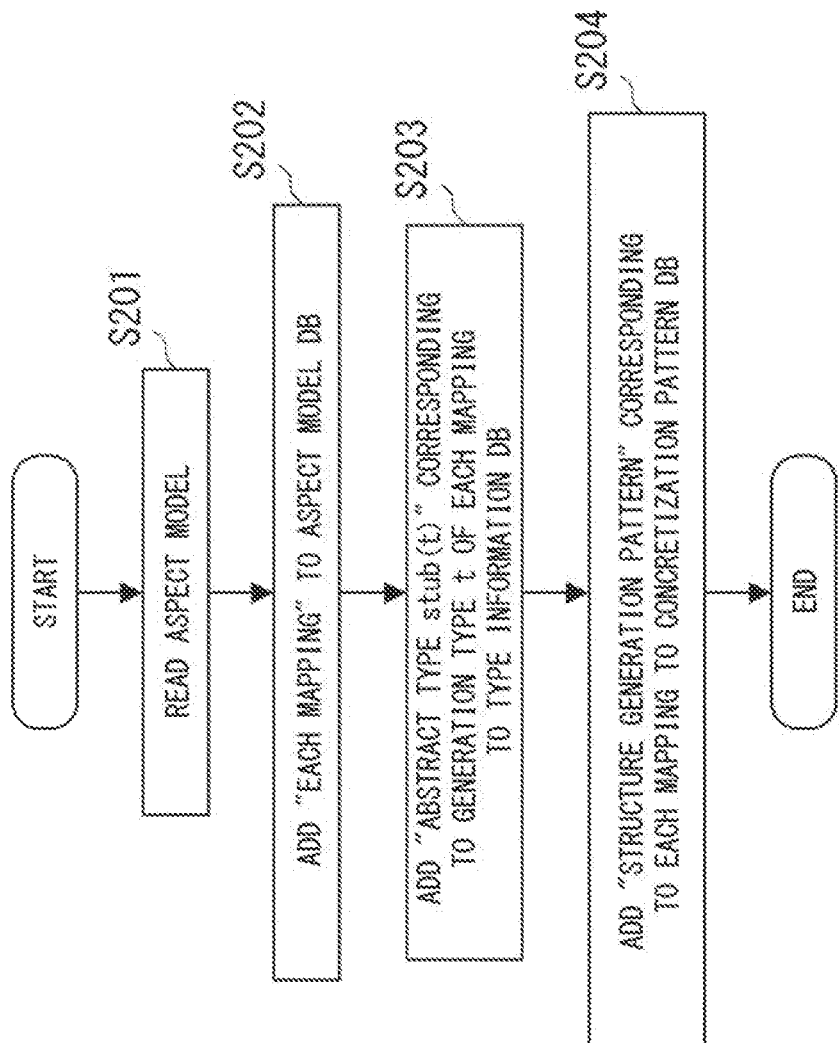
FIG. 13 is a flowchart illustrating an example of a flow of an operation during reading of an aspect model.

As shown in FIG. 13, first, the aspect model reading unit 104 reads the aspect model which is manually generated (step S201), and adds each of the node conversion mapping and the edge conversion mapping included in the read aspect model to the aspect model DB 105 (step S202).

Next, the aspect model reading unit 104 adds an "abstract type stub(t)" corresponding to a generation type t of each mapping to the type information DB 106 (step S203).

Thereafter, the aspect model reading unit 104 adds a "structure generation pattern" as a requirement data concretization pattern corresponding to each mapping to the graph conversion rule DB 107 (step S204).

Subsequently, the "abstract type stub(t)" added to the type information DB 106 will be described.

Figure 14:
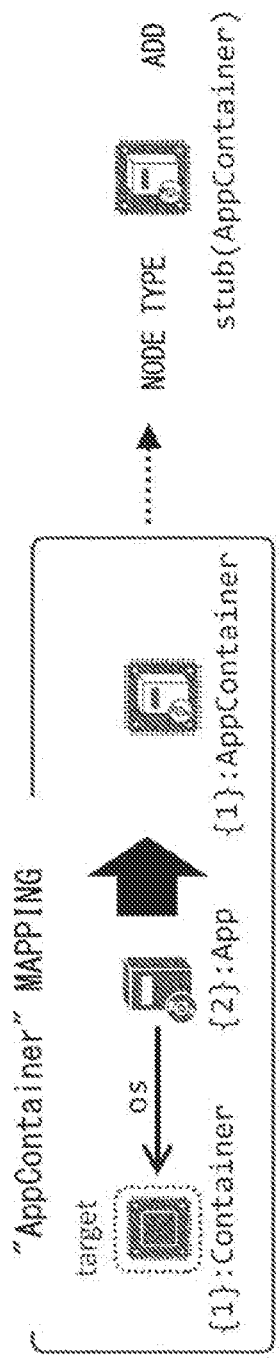
FIG. 14 is a view illustrating an example of an abstract type stub(t) corresponding to a generation type t of the node conversion mapping.

First, an example of an "abstract type stub(t)" corresponding to a generation type t of "AppContainer" mapping will be described with reference to FIG. 14. In the example of FIG. 14, the generation type t of the "AppContainer" mapping is a node type "AppContainer". The abstract type stub(t) corresponding to the generation type t is an abstract type stub(AppContainer) of a node type.

Figure 15:
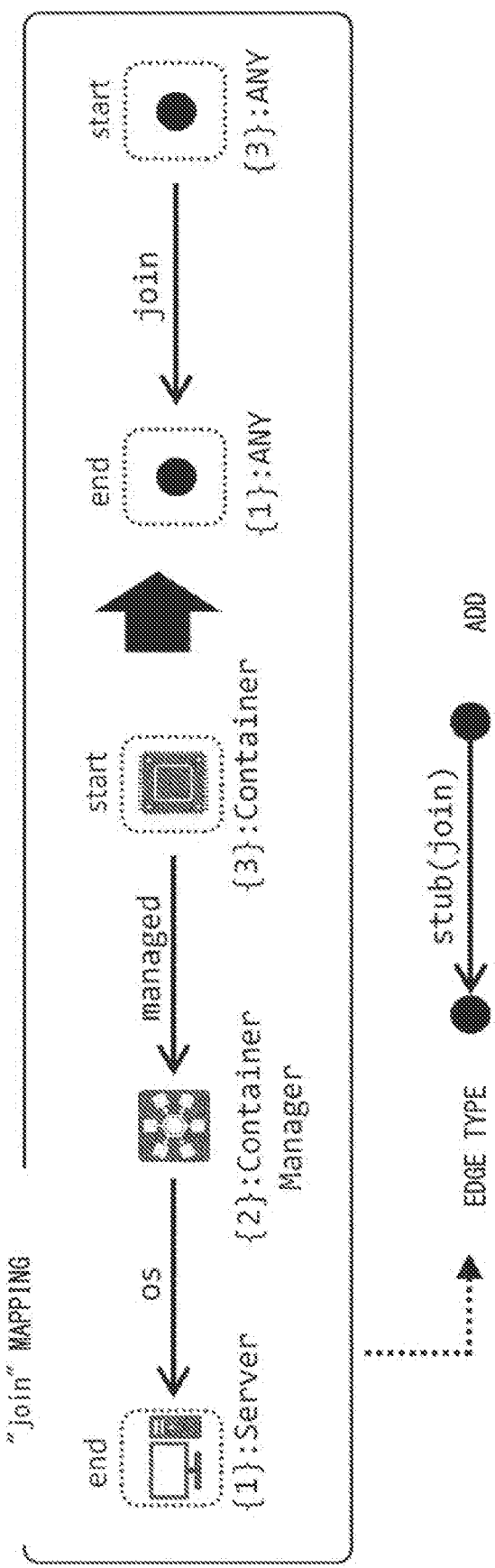
FIG. 15 is a view illustrating an example of an abstract type stub(t) corresponding to a generation type t of the edge conversion mapping.

Next, an example of an "abstract type stub(t)" corresponding to a generation type t of "join" mapping will be described with reference to FIG. 15. In the example of FIG. 15, the generation type t of the "join" mapping is an edge type "join". An abstract type stub(t) corresponding to the generation type t is an abstract type stub(join) of an edge type.

Subsequently, a special example of the "abstract type stub(t)" will be described with reference to FIGS. 16 and 17.

The "AppContainer" mapping in FIG. 10 and the "join" mapping in FIG. 11 are not one-to-one mappings in which entities before and after the conversion correspond one-to-one to each other.

Figure 16:
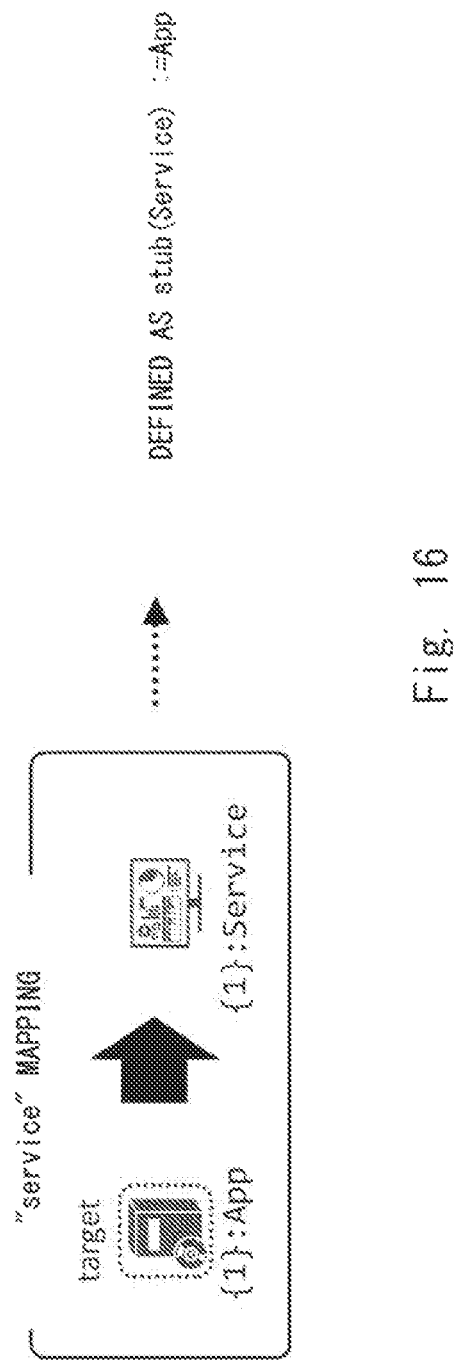
FIG. 16 is a view illustrating a special example of an abstract type stub(t)
Figure 17:
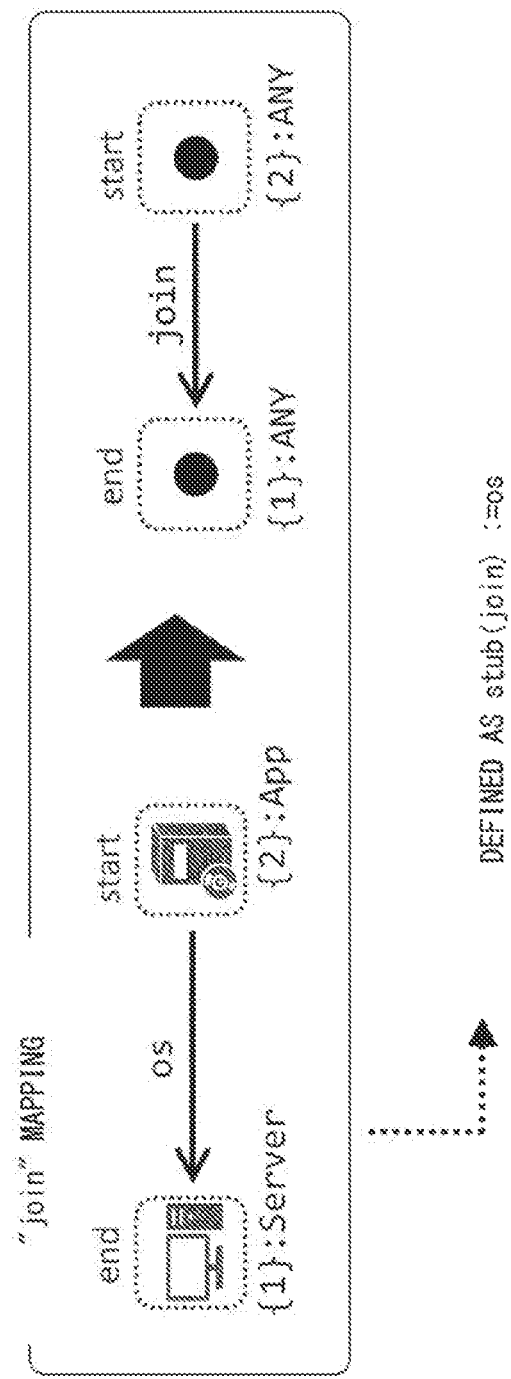
FIG. 17 is a view illustrating a special example of an abstract type stub(t)

On the other hand, "Service" mapping in FIG. 16 and "join" mapping in FIG. 17 are one-to-one mappings.

In the case of one-to-one mapping, the aspect model reading unit 104 does not add the abstract type stub(t) to the type information DB 106, but may define the abstract type stub(t) as a "stub(t):=$t_{orig}$" using a corresponding original generation type $t_{orig}$. The abstract type stub(t) is defined as stub(Service):=App in the example of FIG. 16, and is defined as stub(join):=os in the example of FIG. 17. In this case, the aspect model reading unit 104 does not perform an operation of adding the "stub(t):=$t_{orig}$" to the type information DB 106. However, when another mapping is defined for the same generation type, the aspect model reading unit 104 cannot make the above definition.

Subsequently, a description will be given with respect to the "structure generation pattern" added to the graph conversion rule DB 107 as the requirement data concretization pattern.

Figure 18:
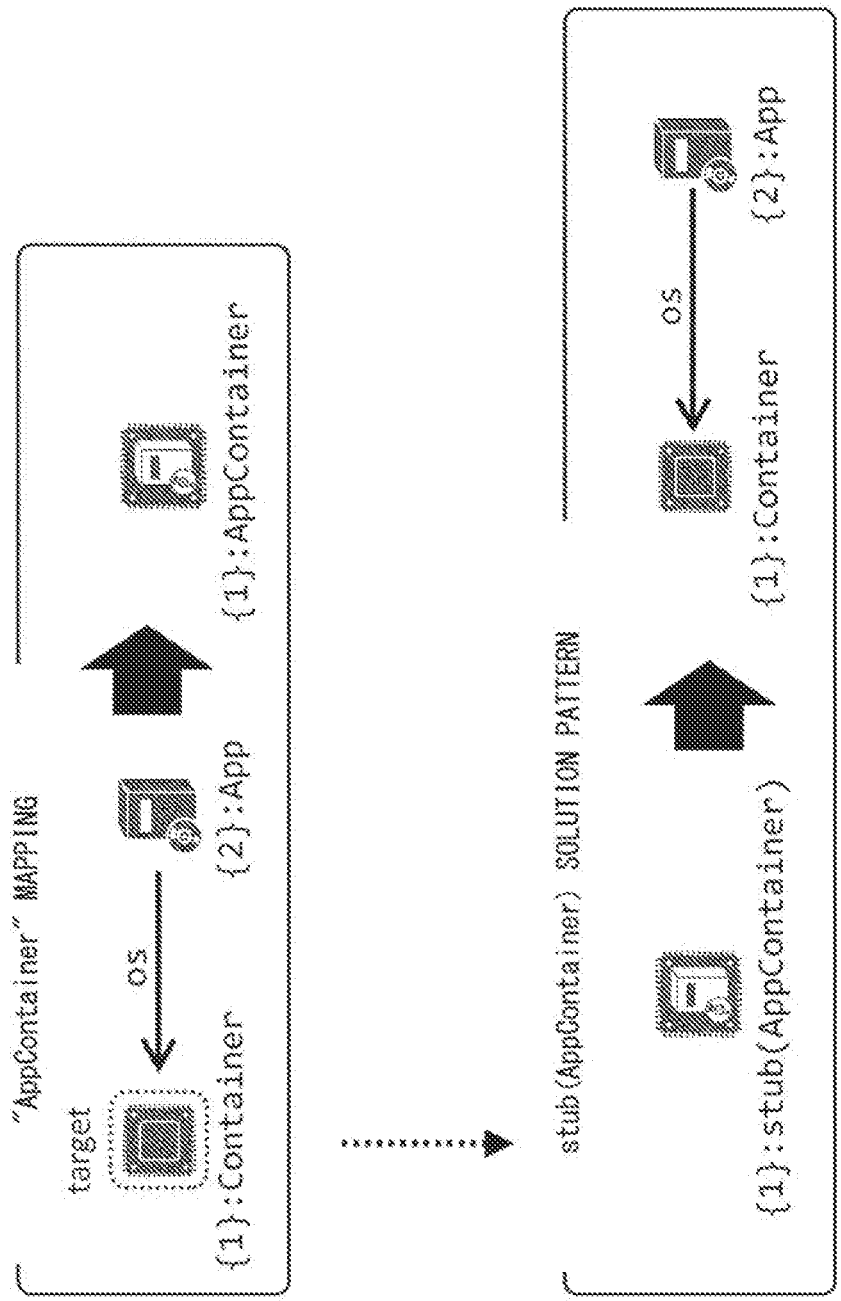
FIG. 18 is a view illustrating an example of a structure generation pattern corresponding to the node conversion mapping.

First, an example of a structure generation pattern corresponding to "AppContainer" mapping will be described with reference to FIG. 18. As shown in FIG. 18, the structure generation pattern is a stub(AppContainer) solution pattern corresponding to a pattern in which a conversion direction of the "AppContainer" mapping is reversed.

Figure 19:
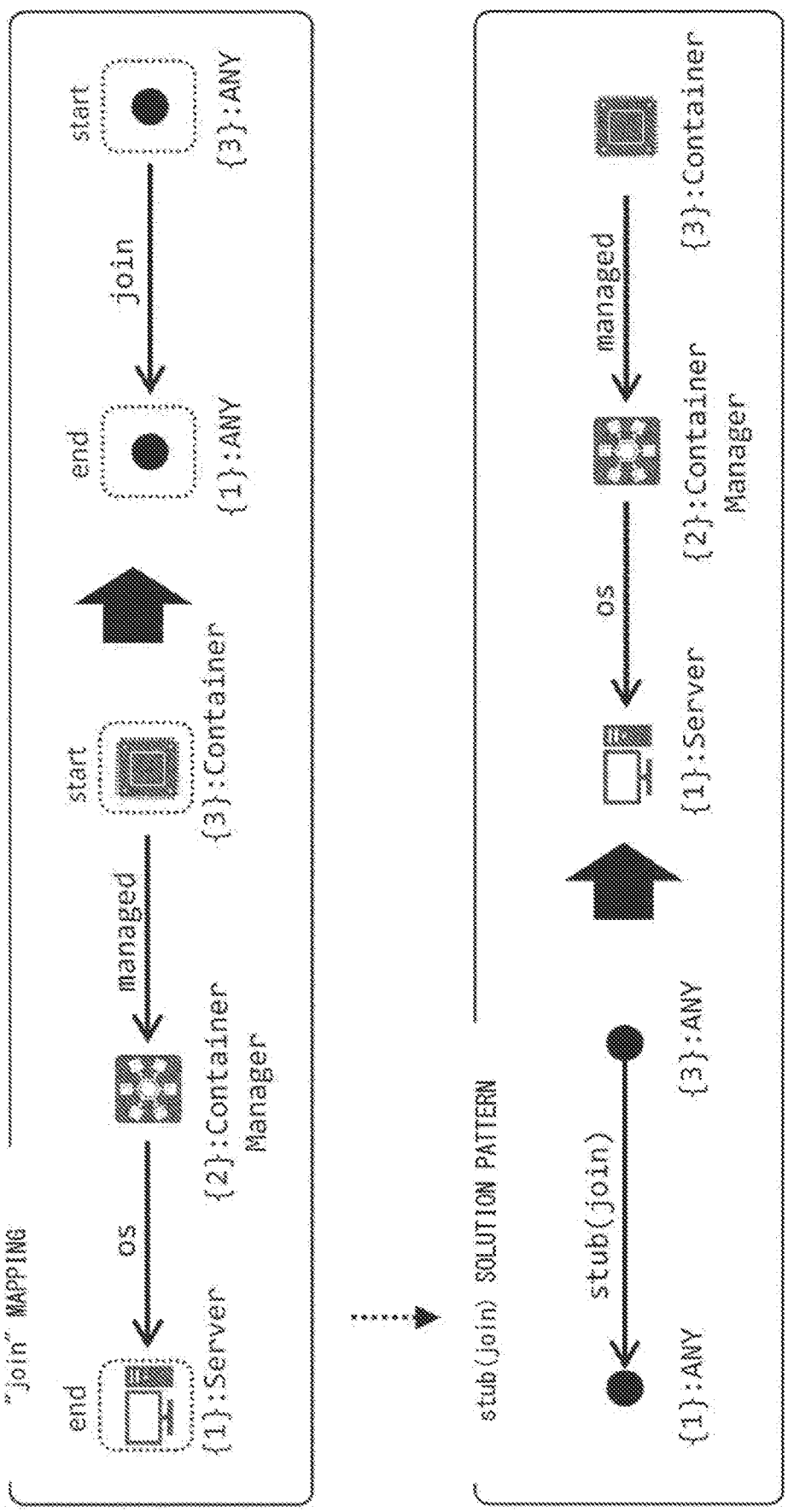
FIG. 19 is a view illustrating an example of a structure generation pattern corresponding to the edge conversion mapping.

Next, an example of a structure generation pattern corresponding to "join" mapping will be described with reference to FIG. 19. As shown in FIG. 19, the structure generation pattern is a stub(join) solution pattern corresponding to a pattern in which a conversion direction of the "join" mapping is reversed.

Figure 20:
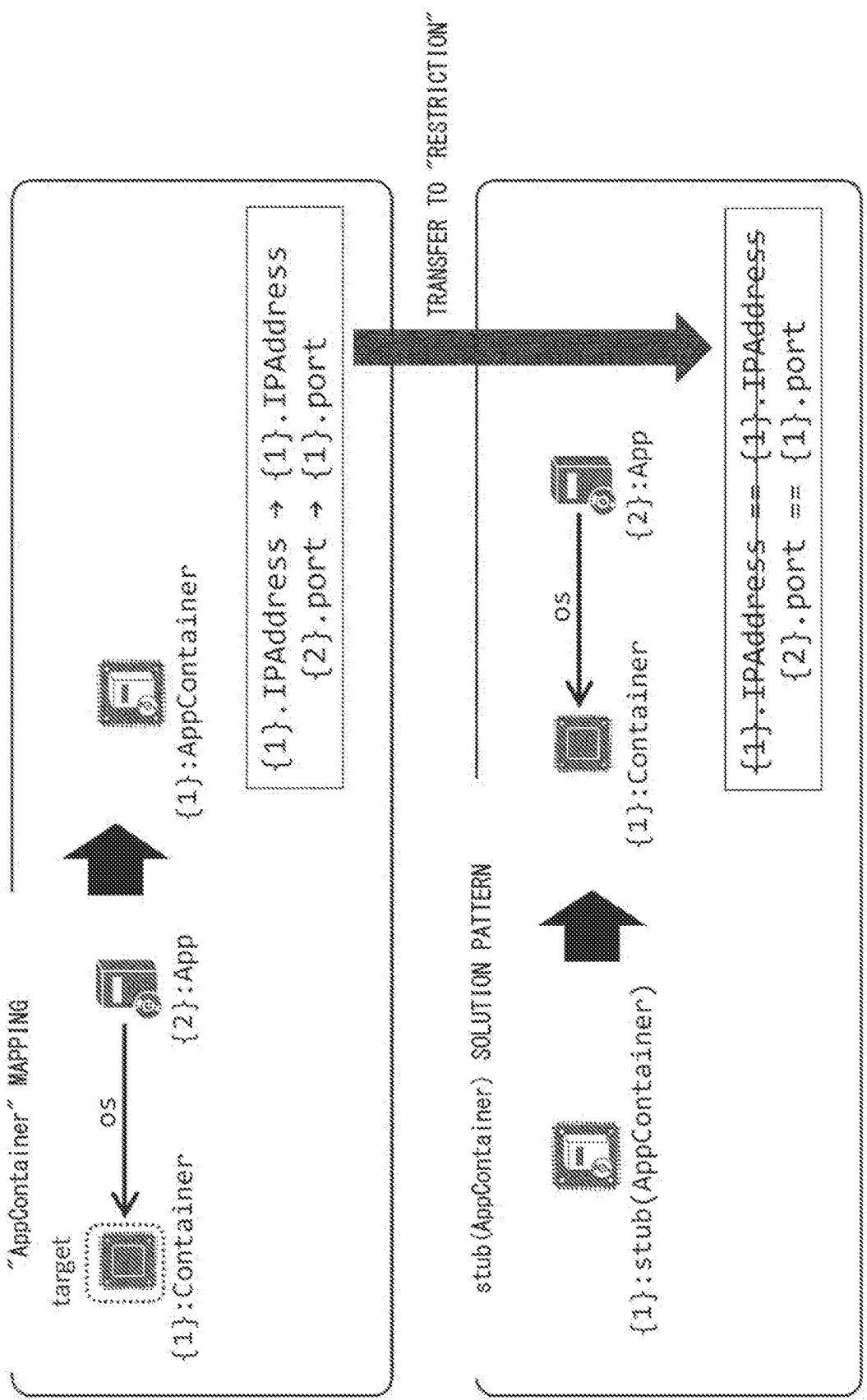
FIG. 20 is a view illustrating an example of dealing with property mapping information possessed by the node conversion mapping.

Subsequently, an example of dealing with property mapping information possessed by the mapping will be described with reference to FIG. 20. In the example of FIG. 20, "AppContainer" mapping has the property mapping information shown in FIG. 12. A structure generation pattern corresponding to the "AppContainer" mapping is the same pattern as the stub(AppContainer) solution pattern shown in FIG. 18. Therefore, the aspect model reading unit 104 transfers the property mapping information of the "AppContainer" mapping to a "restriction" of a stub(AppContainer) solution pattern. At this time, the aspect model reading unit 104 converts an arrow (→) representing the mapping into an equal sign (==). Further, the aspect model reading unit 104 eliminates meaningless restrictions. In the example of FIG. 20, a restriction called "{1}.IPAddress=={1}.IPAddress" is eliminated.

Subsequently, a description will be given with reference to FIGS. 21 to 23 with respect to an example of a combination of mapping, an "abstract type stub(t)" corresponding to a generation type t of the mapping, and a "structure generation pattern" corresponding to the mapping.

Figure 21:
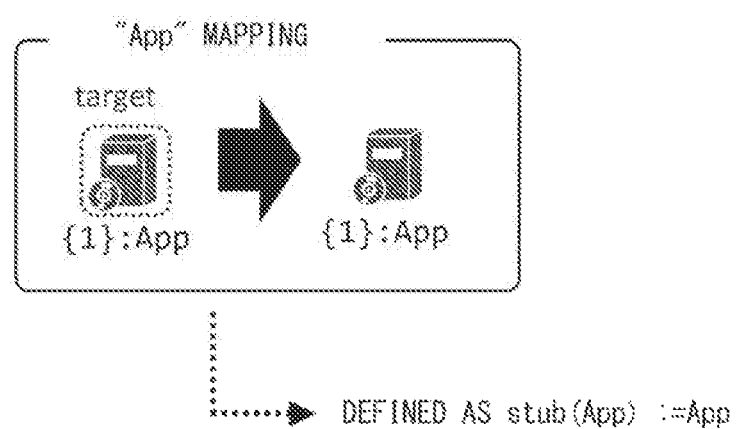
FIG. 21 is a view illustrating an example of node conversion mapping and an abstract type stub(t) corresponding to a generation type t of the node conversion mapping.

FIG. 21 shows an example of one-to-one mapping. In the example of FIG. 21, "App" mapping is one-to-one mapping. Therefore, the aspect model reading unit 104 defines "stub(App):=App", but does not add the "stub(App):=App" to the type information DB 106, as an abstract type stub(t). In addition, since the aspect model reading unit 104 does not add the abstract type stub(t), the aspect model reading unit 104 does not also add a structure generation pattern to the graph conversion rule DB 107.

Figure 22:
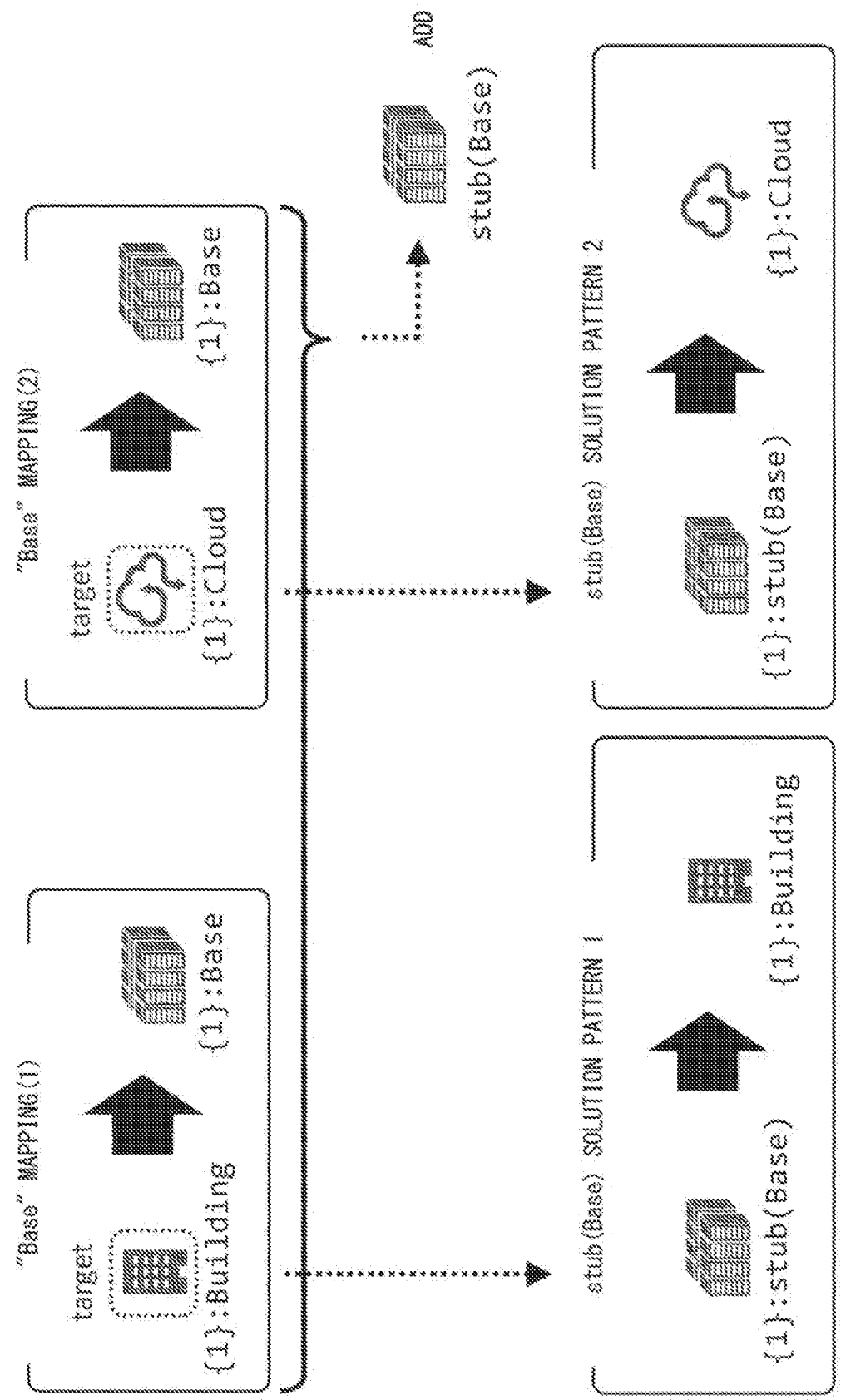
FIG. 22 is a view illustrating an example of a combination of node conversion mapping, an abstract type stub(t) corresponding to a generation type t of the node conversion mapping, and a structure generation pattern corresponding to the node conversion mapping.

FIG. 22 shows an example in which a plurality of mappings exist in one generation type. In the example of FIG. 22, two mappings of "Base" mapping(1) and "Base" mapping(2) exist in a node "Base" which is a generation type. Therefore, the aspect model reading unit 104 adds an abstract type stub(Base) corresponding to the node "Base" to the type information DB 106. In addition, the aspect model reading unit 104 adds a structure generation pattern including a stub(Base) solution pattern 1 corresponding to the "Base" mapping(1) and a stub(Base) solution pattern 2 corresponding to the "Base" mapping(2) to the graph conversion rule DB 107, as requirement data concretization patterns.

Figure 23:
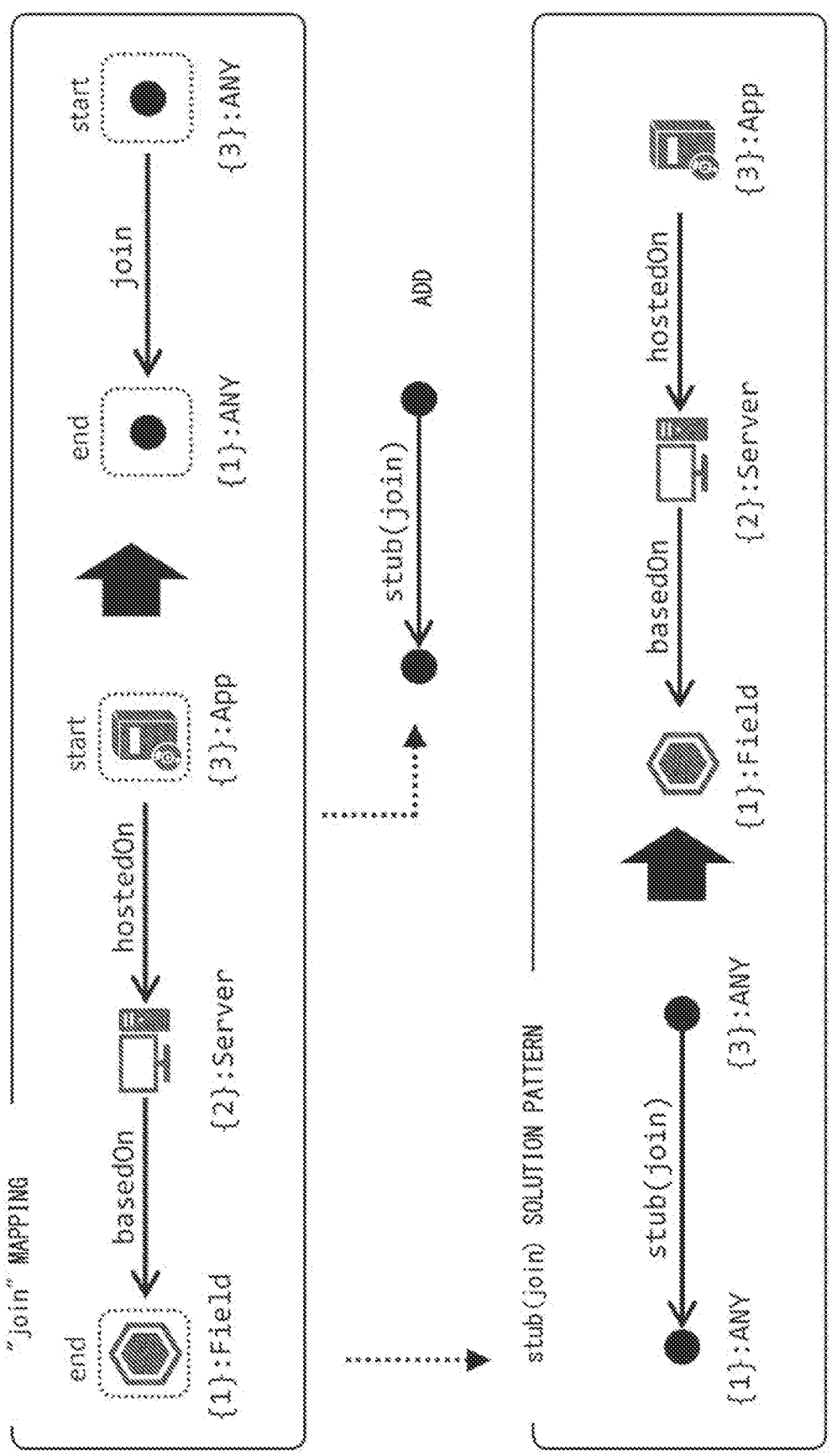
FIG. 23 is a view illustrating an example of a combination of edge conversion mapping, an abstract type stub(t) corresponding to a generation type t of the edge conversion mapping, and a structure generation pattern corresponding to the edge conversion mapping.

FIG. 23 shows an example of mapping including a node corresponding to a parent class of any node. In the example of FIG. 23, a node "Field" included in "join" mapping corresponds to a parent class of a node "Building" and a node "Cloud". The aspect model reading unit 104 adds an abstract type stub(join) corresponding to a generation type of the "join" mapping to the type information DB 106. In addition, the aspect model reading unit 104 adds a structure generation pattern, which is a stub(join) solution pattern corresponding to the "join" mapping, to the graph conversion rule DB 107, as a requirement data concretization pattern.

<Forward Conversion>

Subsequently, a description will be given with respect to a conversion operation in which the view generation unit 102 converts the requirement data into a view (pre-update view). Hereinafter, such a conversion is appropriately referred to as a forward conversion.

First, a description will be given with reference to FIGS. 24 and 25 with respect to an example of a flow of the forward conversion operation by the view generation unit 102. Here, it is assumed that the aspect model has already been selected by the system requirement concretization unit 101 and the selected aspect model has been notified to the view generation unit 102.

Figure 24:
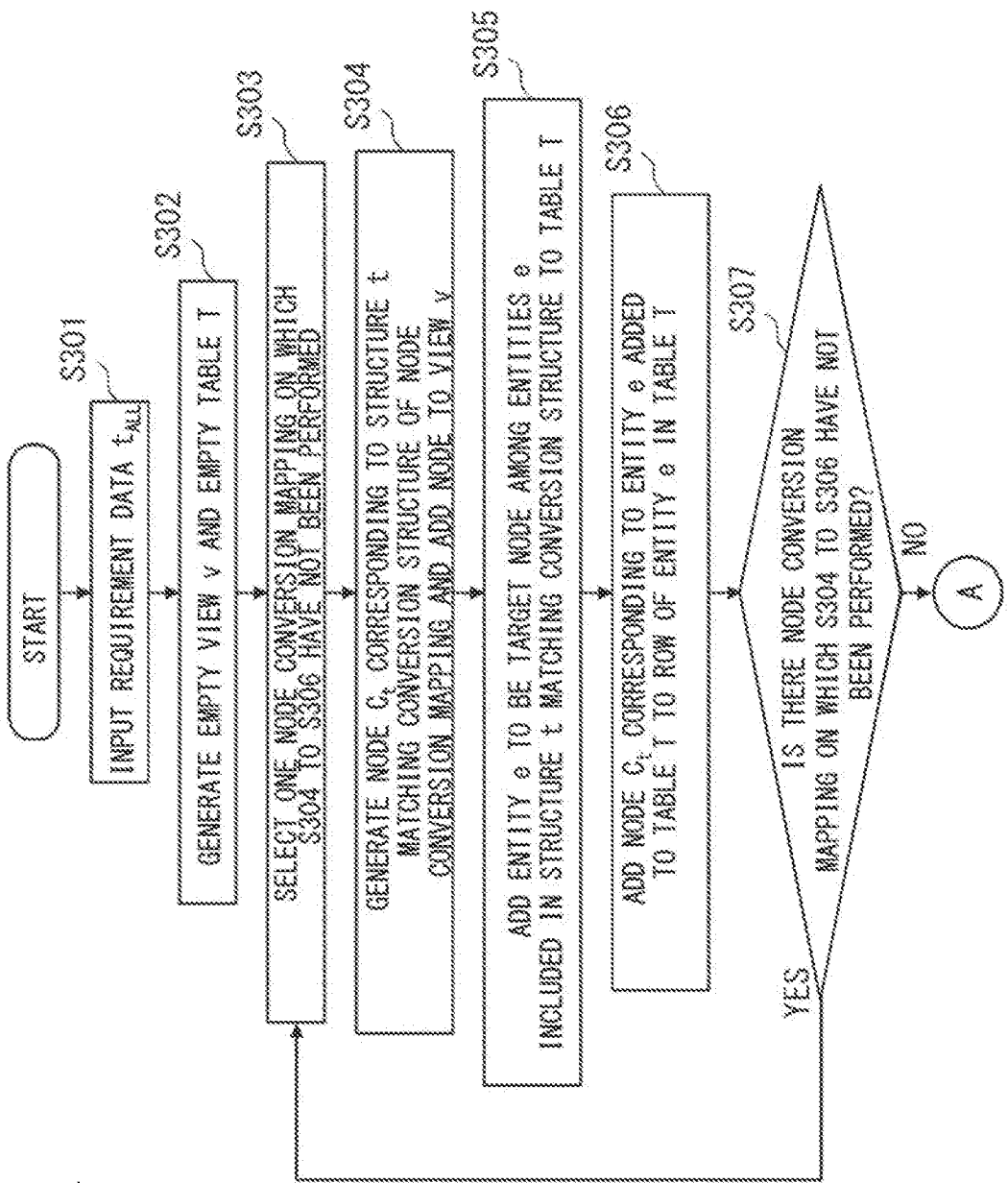
FIG. 24 is a flowchart illustrating an example of a flow of forward conversion by a view generation unit according to the first example embodiment.
Figure 25:
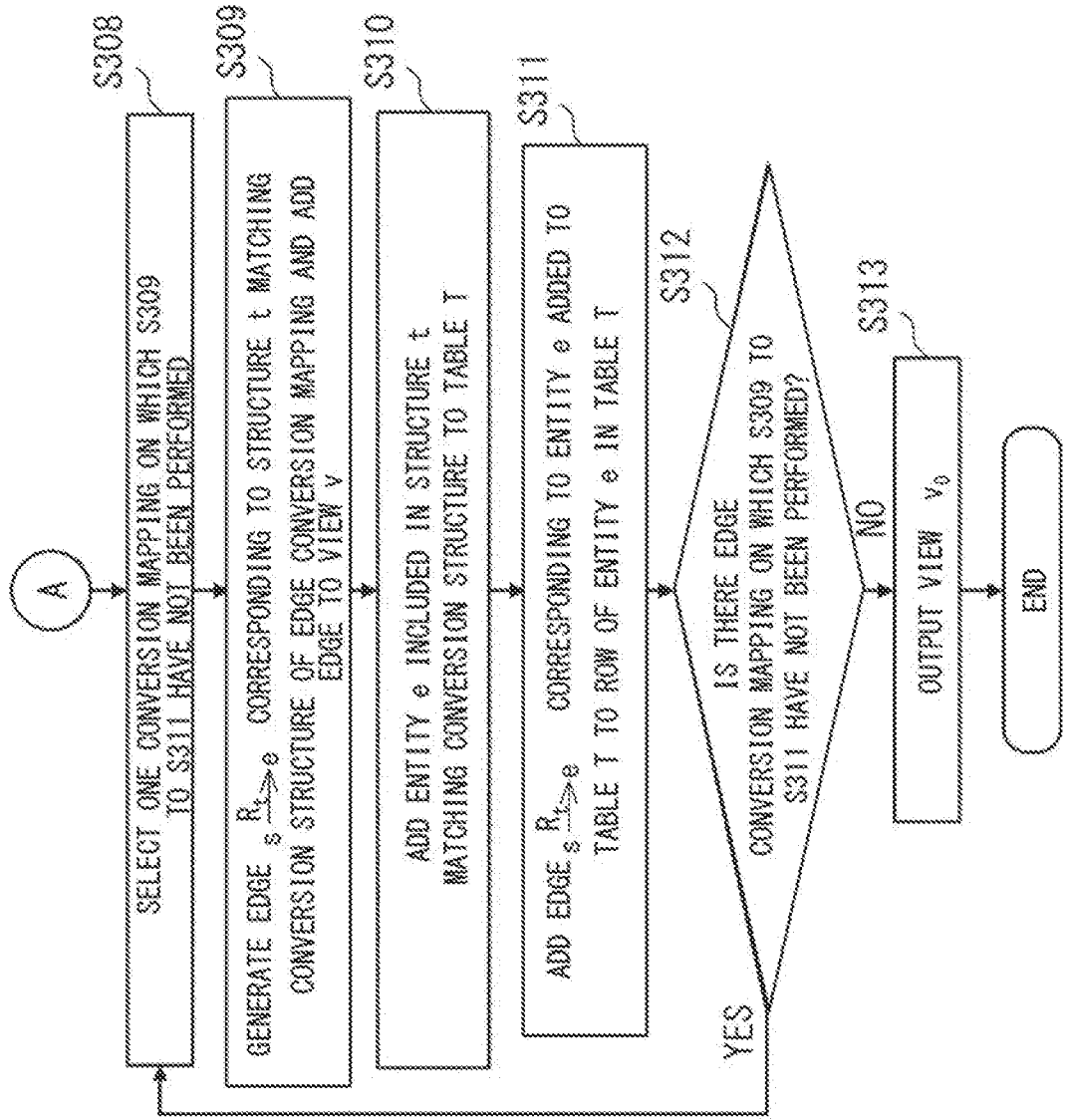
FIG. 25 is a flowchart illustrating an example of a flow of forward conversion by the view generation unit according to the first example embodiment.

As shown in FIGS. 24 and 25, first, the view generation unit 102 inputs requirement data $t_{ALL}$ from the system requirement concretization unit 101 (step S301).

Next, the view generation unit 102 generates an empty view v and an empty mapping table T (step S302). The mapping table T is a table that entities in the requirement data $t_{ALL}$ are shown in a mapping source column and entities in a view corresponding to the entities in the requirement data $t_{ALL}$ are shown in the mapping destination column in the same row.

Next, the view generation unit 102 selects one node conversion mapping, on which the following steps S304 to S306 have not been performed, from the aspect model selected by the system requirement concretization unit 101 (step S303). Then, the view generation unit 102 performs the following steps S304 to S306 on the node conversion mapping selected in step S303.

In other words, the view generation unit 102 extracts all structures t, which match the conversion structure (the structure on the left side of the arrow of the node conversion mapping) of the node conversion mapping selected in step S303, from the requirement data $t_{ALL}$ input in step S301. Then, the view generation unit 102 generates a node $C_t$ corresponding to each of all the extracted structures t, and adds the generated node $C_t$ to the view v (step S304). For example, when the structure t matches the conversion structure on the left side of the arrow of any node conversion mapping, a node on the right side of the arrow of such node conversion mapping is a node $C_t$ corresponding to the structure t.

Next, the view generation unit 102 selects an entity e to be a target node from the entities e included in the structure t for each structure t that matches the conversion structure in step S304. Then, the view generation unit 102 adds the selected entity e to the mapping source column of the mapping table T (step S305).

Next, the view generation unit 102 adds the node $C_t$, which is generated in step S304, in the mapping destination column of the mapping table T and to the same row as the entity e in the table, corresponding to the structure t including the entity e for each the entity e added to the mapping source column of the mapping table T in step S305 (step S306).

Next, the view generation unit 102 determines whether there is the node conversion mapping, on which steps S304 to S306 have not been performed, in the aspect model selected by the system requirement concretization unit 101 (step S307). When there is the node conversion mapping on which steps S304 to S306 have not been performed (YES in step S307), the process returns to step S303.

On the other hand, when there is no node conversion mapping on which steps S304 to S306 have not been performed (NO in step S307), the view generation unit 102 selects one edge conversion mapping, on which the following steps S309 to S311 have not been performed, from the aspect model selected by the system requirement concretization unit 101 (step S308). Then, the view generation unit 102 performs the following steps S309 to S311 on the edge conversion mapping selected in step S308.

In other words, the view generation unit 102 extracts all structures t, which match the conversion structure (the structure on the left side of the arrow of the edge conversion mapping) of the edge conversion mapping selected in step S308, from the requirement data $t_{ALL}$ input in step S301. Then, the view generation unit 102 generates an edge $$s \xrightarrow{R_t} e$$

corresponding to each of all the extracted structures t, and adds the generated edge $$s \xrightarrow{R_t} e$$

to the view v (step S309). For example, when the structure t matches the conversion structure on the left side of the arrow of any edge conversion mapping, an edge on the right side of the arrow of such edge conversion mapping is the edge $$s \xrightarrow{R_t} e$$

corresponding to the structure t.

Next, the view generation unit 102 adds the entity e included in the structure t for each structure t that matches the conversion structure in step S309 to the mapping source column of the mapping table T (step S310).

Next, the view generation unit 102 adds the edge $$s \xrightarrow{R_t} e,$$

which is generated in step S304, in the mapping destination column of the mapping table T and to the same row as the entity e in the table, corresponding to the structure t including the entity e for each the entity e added to the mapping source column of the mapping table T in step S310 (step S311).

Next, the view generation unit 102 determines whether there is the edge conversion mapping, on which steps S309 to S311 have not been performed, in the aspect model selected by the system requirement concretization unit 101 (step S312). When there is the edge conversion mapping on which steps S309 to S311 have not been performed (YES in step S312), the process returns to step S308.

On the other hand, when there is no edge conversion mapping on which steps S309 to S311 have not been performed (NO in step S312), the view generation unit 102 decides the view v and the mapping table T, and outputs the decided view v to the system requirement concretization unit 101, as a pre-update view $v_0$ (step S313).

Subsequently, a concrete example of the forward conversion operations shown in FIGS. 24 and 25 will be described with reference to FIGS. 26 to 31.

First, a concrete example of the operations of steps S301 and S302 shown in FIG. 24 will be described with reference to FIG. 26.

Figure 26:
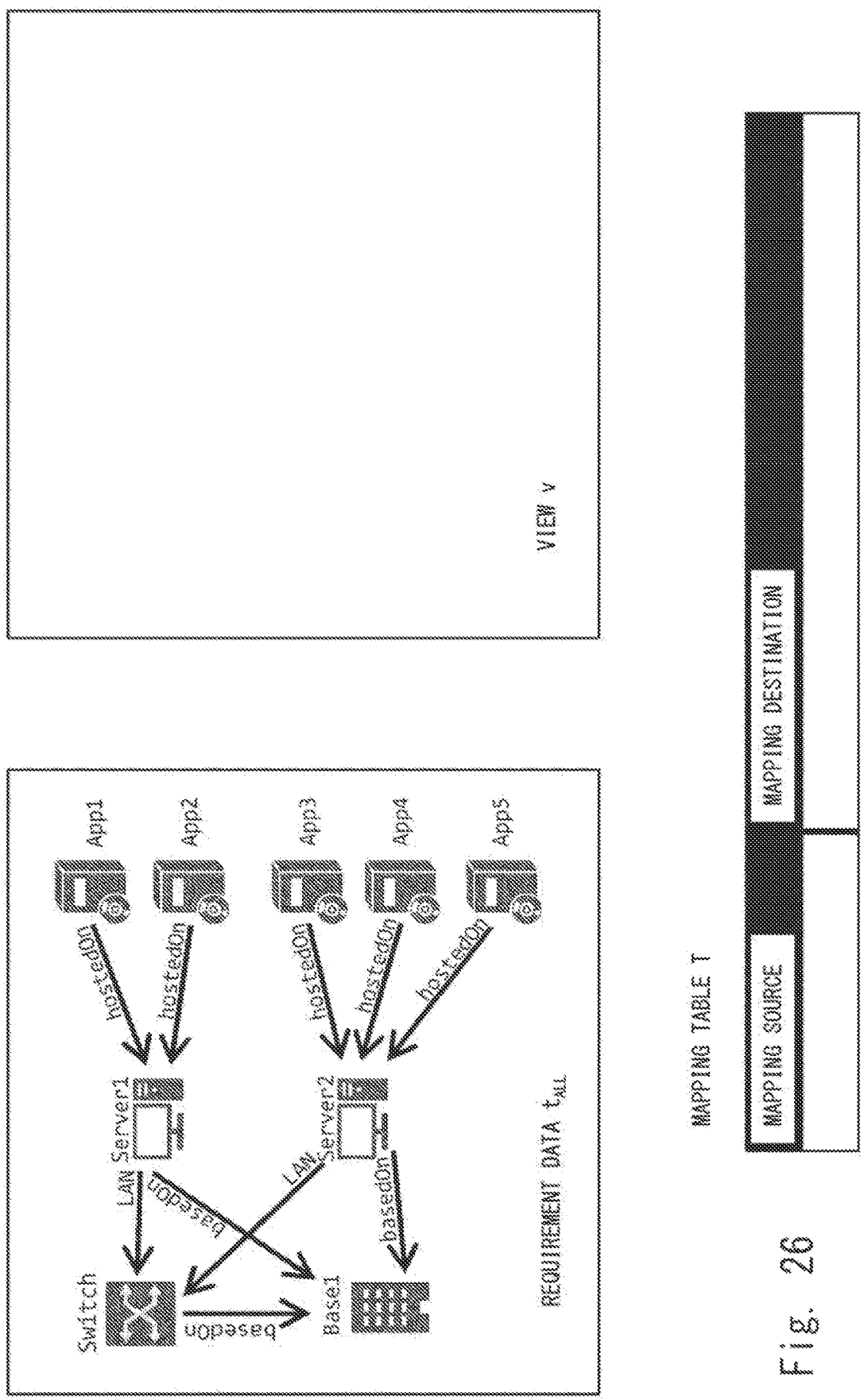
FIG. 26 is a view illustrating a concrete example of operations of steps S301 and S302 shown in FIG. 24.

In step S301, the view generation unit 102 inputs requirement data $t_{ALL}$ as shown in, for example, FIG. 26 from the system requirement concretization unit 101.

Further, in step S302, the view generation unit 102 generates an empty view v and an empty mapping table T as shown in FIG. 26.

Figure 27:
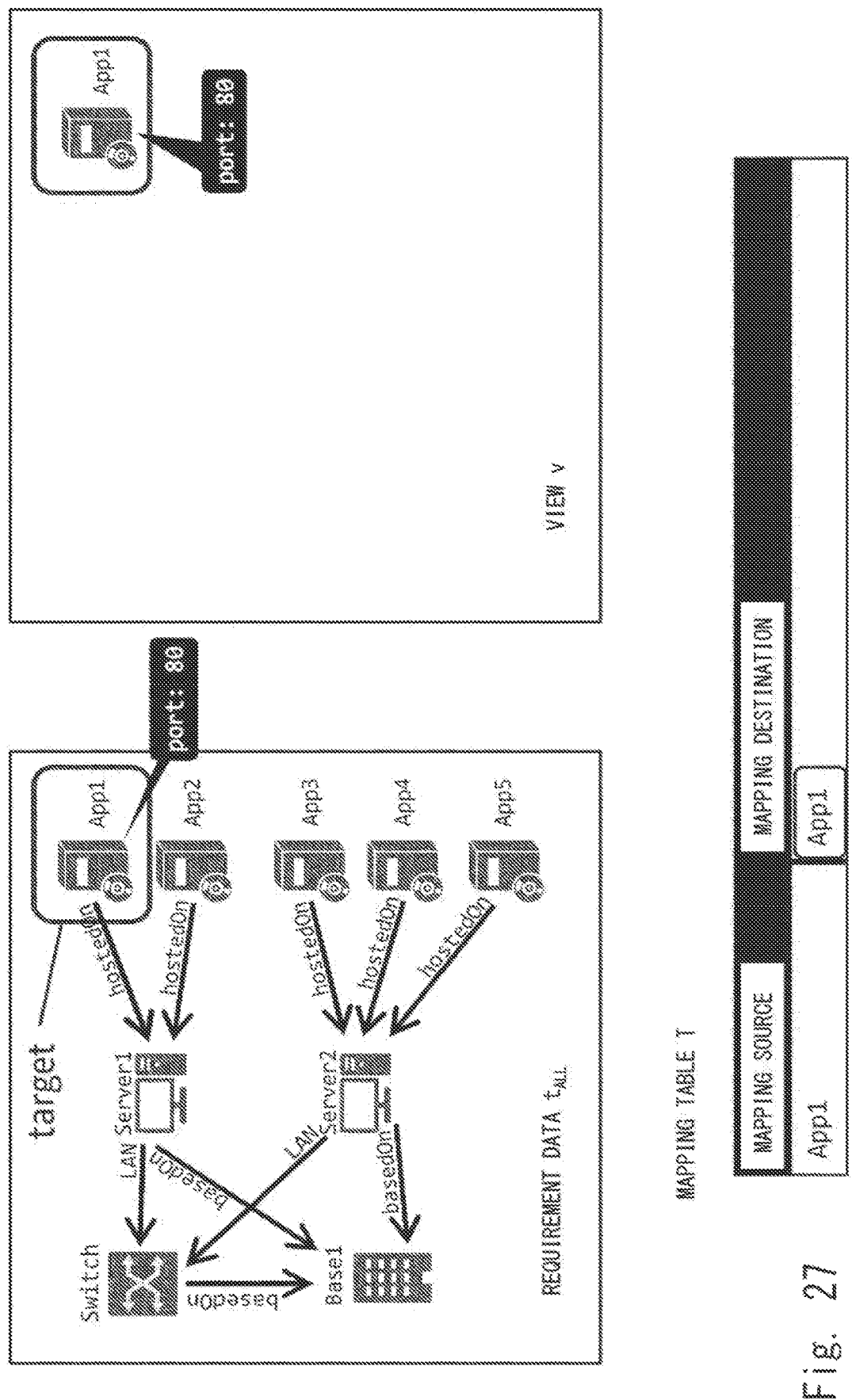
FIG. 27 is a view illustrating a concrete example of operations of steps S303 to S306 shown in FIG. 24.

Next, a concrete example of operations of steps S303 to S306 shown in FIG. 24 will be described with reference to FIGS. 27 and 28.

In step S303, the view generation unit 102 selects one node conversion mapping, on which steps S304 to S306 have not been performed, from the aspect model selected by the system requirement concretization unit 101. In the example of FIG. 27, a node "App1" in the requirement data $t_{ALL}$ matches the conversion structure of the node conversion mapping selected in step S303. The node "App1" in the requirement data $t_{ALL}$ is the target node in the conversion structure of the node conversion mapping.

Therefore, the view generation unit 102 generates a node "App1" corresponding to the node "App1" in the requirement data $t_{ALL}$ in step S304, and adds the generated node "App1" to the view v. At this time, the view generation unit 102 makes an ID of the node "App1" in the view v to be equal to an ID (here, "App1") of the target node "App1" in the requirement data $t_{ALL}$. In addition, the view generation unit 102 sets a property (here, "port:80") of the node "App1" in the requirement data $t_{ALL}$ to a property of the node "App1" in the view v, based on the property mapping information of the node conversion mapping.

Further, the view generation unit 102 adds, as an entity e, the target node "App1" in the requirement data $t_{ALL}$ to the mapping source column of the mapping table T in step S305.

In addition, the view generation unit 102 adds the node "App1" in the view v corresponding to the node "App1" in the requirement data $t_{ALL}$ in the mapping destination column of the mapping table T and to the same row as the entity e, which is the node "App1" in the requirement data $t_{ALL}$, in step S306.

FIG. 28 shows an example of the view v and the mapping table T after steps S304 to S306 are performed on all the node conversion mappings included in the aspect model.

Next, a concrete example of the operations of steps S308 to S311 shown in FIG. 25 will be described with reference to FIGS. 29 and 30.

In step S308, the view generation unit 102 selects one edge conversion mapping, on which steps S309 to S311 have not been performed, from the aspect model selected by the system requirement concretization unit 101. In the example of FIG. 29, a structure C101 in the requirement data $t_{ALL}$ matches the conversion structure of the edge conversion mapping selected in step S308.

In step S309, therefore, the view generation unit 102 generates an edge

corresponding to the structure C101 in the requirement data $t_{ALL}$, and adds the generated edge

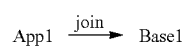

to the view v. At this time, when the edge conversion mapping has property mapping information, property processing is performed in the same manner as that described with reference to FIG. 27.

In step S310, the view generation unit 102 adds entities e included in the structure C101 in the requirement data $t_{ALL}$ to the mapping source column of the mapping table T.

In step S311, the view generation unit 102 adds the edge

in the view v, corresponding to each of the entities e included in the structure C101 in the requirement data $t_{ALL}$, in the mapping destination column of the mapping table T and to the same row as each of the entities e included in the structure C101 in the requirement data $t_{ALL}$.

An example of FIG. 30 different from the example of FIG. 29 will be described. In the example of FIG. 30, a structure C102 in requirement data $t_{ALL}$ matches the conversion structure of the edge conversion mapping selected in step S308.

In step S309, therefore, the view generation unit 102 generates an edge

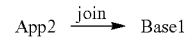

corresponding to the structure C102 in the requirement data $t_{ALL}$, and adds the generated edge

to the view v.

In step S310, the view generation unit 102 adds entities e included in the structure C102 in the requirement data $t_{ALL}$ to the mapping source column of the mapping table T.

In step S311, the view generation unit 102 adds the edge

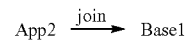

in the view v, corresponding to each of the entities e included in the structure C102, in the mapping destination column of the mapping table T and to the same row as each of the entities e included in the structure C102 in the requirement data $t_{ALL}$.

In the mapping table T shown in FIG. 30, the edge

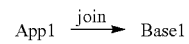

of the mapping destination of the entity

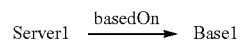

included in the structure C102 in the requirement data $t_{ALL}$ has already been added.

Figure 31:
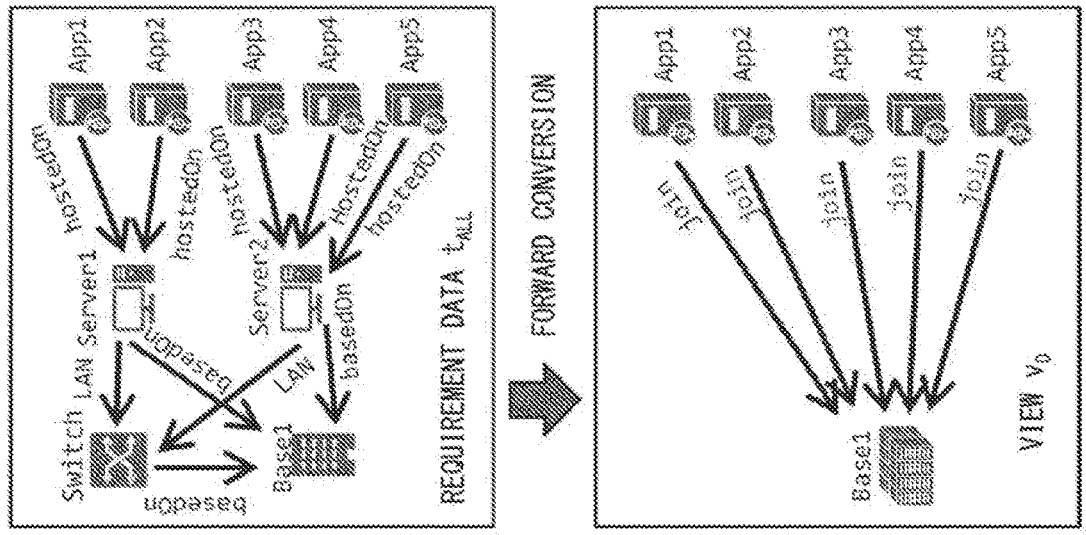
FIG. 31 is a view illustrating an example of a view and a mapping table after the forward conversion operation shown in FIGS. 24 and 25 is completed.

FIG. 31 shows an example of a view v and a mapping table T after the forward conversion operation shown in FIGS. 24 and 25 is completed. The view v shown in FIG. 31 is output to the system requirement concretization unit 101 as a pre-update view $v_0$.

<Backward Conversion>

Subsequently, a conversion operation will be described in which the requirement data update unit 103 converts a view (post-update view) into requirement data. Hereinafter, such conversion is appropriately referred to as a backward conversion.

First, an example of a flow of a forward conversion operation by the requirement data update unit 103 will be described with reference to FIGS. 32 and 33.

Figure 32:
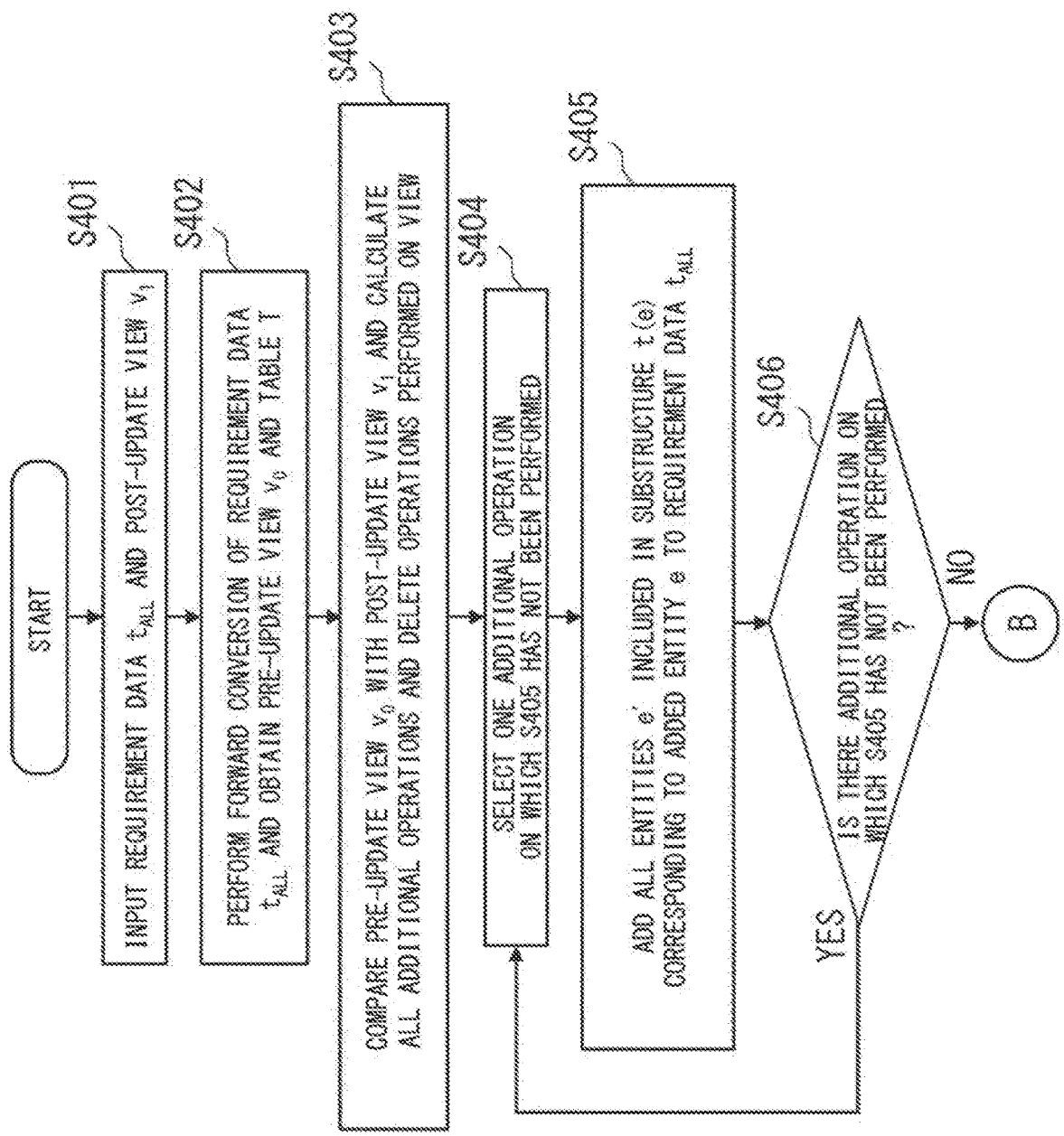
FIG. 32 is a view illustrating an example of a flow of a backward conversion operation by a requirement data update unit according to the first example embodiment.
Figure 33:
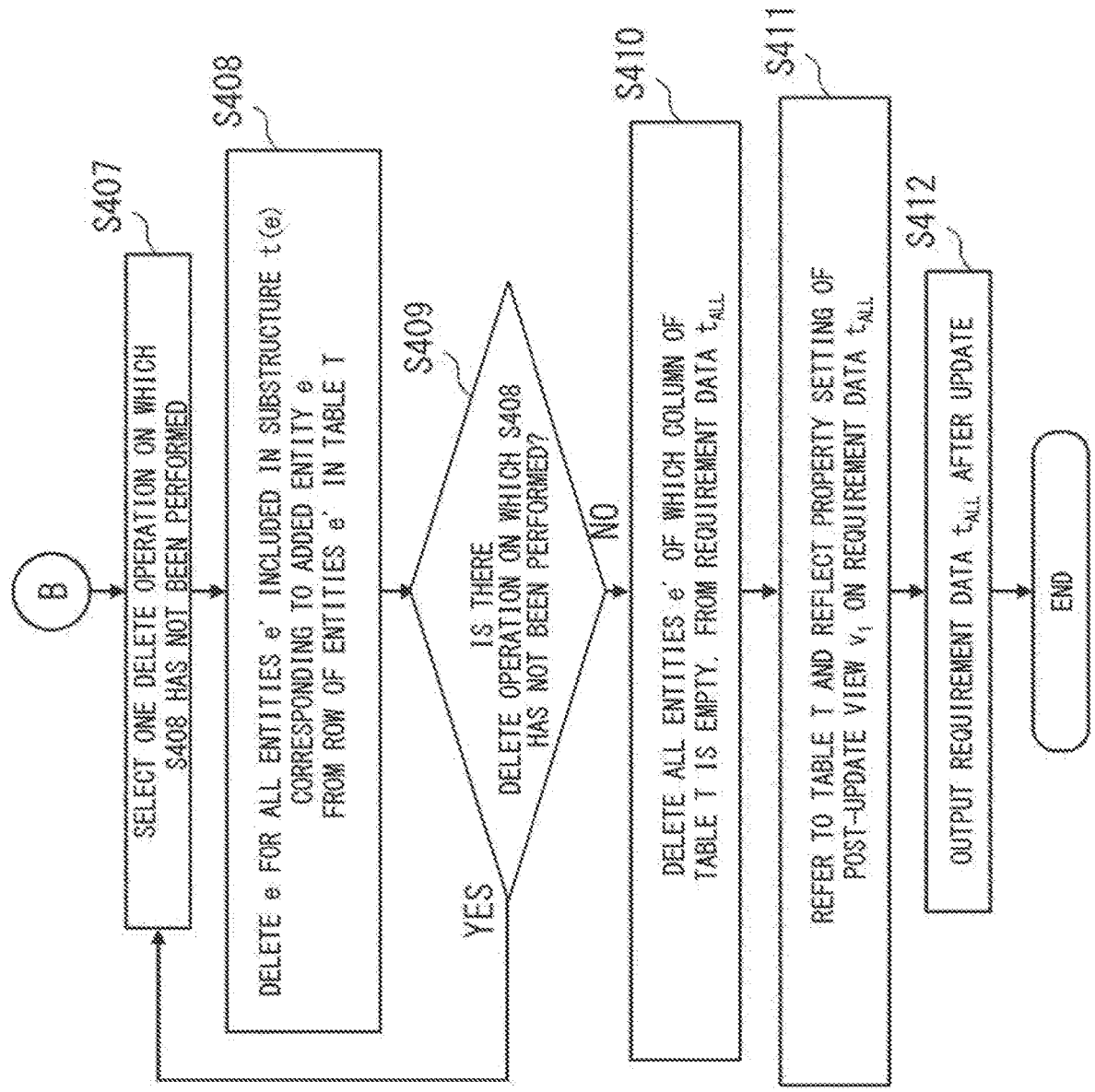
FIG. 33 is a flowchart illustrating an example of a flow of the backward conversion operation by the requirement data update unit according to the first example embodiment.

As shown in FIGS. 32 and 33, first, the requirement data update unit 103 inputs a post-update view $v_1$ updated by the system requirement concretization unit 101 from the system requirement concretization unit 101, and inputs requirement data $t_{ALL}$ from the system requirement concretization unit 101 (step S401).

Next, the requirement data update unit 103 performs forward conversion of the requirement data $t_{ALL}$, and acquires a pre-update view $v_0$ and a mapping table T (step S402). Here, it is assumed that the aspect model has already been selected by the system requirement concretization unit 101 and the selected aspect model has been notified to the requirement data update unit 103. The forward conversion of the requirement data $t_{ALL}$ has already been performed by the view generation unit 102. Therefore, step S402 may be replaced with an operation of acquiring the pre-update view $v_0$ and the mapping table T from the view generation unit 102.

Next, the requirement data update unit 103 compares the pre-update view $v_0$ with the post-update view $v_1$, and calculates all additional operations (ADD $e_1:t_1$, ADD $e_2:t_2$, . . . ) and all delete operations (DEL $e_1:t_1$, DEL $e_2:t_2$, . . . ) performed on the pre-update view $v_0$ (step S403). The additional operation is an operation of adding the entity e to the pre-update view $v_0$, and the delete operation is an operation of deleting entity e to the pre-update view $v_0$.

Next, the requirement data update unit 103 selects one additional operation, on which the following step S405 has not been performed, from the additional operations calculated in step S403 (step S404). Then, the requirement data update unit 103 performs the following step S405 on the additional operation selected in step S404.

In other words, the requirement data update unit 103 adds all entities e' included in a substructure t(e) corresponding to the entity e added by the additional operation selected in step S404 to the requirement data $t_{ALL}$ (step S405). For example, when the entity e is the entity on the right side of the arrow in any mapping, a structure on the left side of the arrow in such mapping is a substructure t(e) corresponding to the entity e. In other words, when the entity e is the entity on the left side of the arrow in any structure generation pattern, a structure on the right side of the arrow in such a structure generation pattern is a substructure t(e) corresponding to the entity e.

Next, the requirement data update unit 103 determines whether there is an additional operation, on which step S405 has not been performed, among the additional operations calculated in step S403 (step S406). When there is the additional operation on which step S405 has not been performed (YES in step S406), the process returns to step S404.

On the other hand, when there is no additional operation on which step S405 has not been performed (NO in step S406), the requirement data update unit 103 selects one delete operation, on which the following step S408 has not been performed, from the delete operations calculated in step S403 (step S407). Then, the requirement data update unit 103 performs the following step S408 on the delete operation selected in step S407.

In other words, the requirement data update unit 103 confirms all entities e' included in the substructure t(e) corresponding to the entity e, which is deleted by the delete operation selected in step S407, in the mapping source column of the mapping table T. For example, when the entity e is the entity on the right side of the arrow in any mapping, a structure on the left side of the arrow in such mapping is a substructure t(e) corresponding to the entity e. In other words, when the entity e is the entity on the left side of the arrow in any structure generation pattern, a structure on the right side of the arrow in such a structure generation pattern is a substructure t(e) corresponding to the entity e. Then, the requirement data update unit 103 deletes, for each of all the confirmed entities e', the entity e in the mapping destination column of the mapping table T and from the same row as the entity e' in the table (step S408).

Next, the requirement data update unit 103 determines whether there is a delete operation, on which step S408 has not been performed, among the delete operations calculated in step S403 (step S409). When there is the delete operation on which step S408 has not been performed (YES in step S409), the process returns to step S407.

On the other hand, when there is no delete operation on which step S408 has not been performed (NO in step S409), the requirement data update unit 103 confirms entities e' of which the mapping destination column of the mapping table T is empty. Then, the requirement data update unit 103 deletes all the confirmed entities e' from the requirement data $t_{ALL}$ (step S410).

Next, the requirement data update unit 103 refers to the mapping table T, and reflects property setting of the post-update view $v_1$ on the requirement data $t_{ALL}$ (step S411).

Thereafter, the requirement data update unit 103 decides the requirement data $t_{ALL}$, and outputs the decided requirement data $t_{ALL}$ to the system requirement concretization unit 101, as updated requirement data $t_{ALL}$ (step 412).

Subsequently, a concrete example of the backward conversion operation shown in FIGS. 32 and 33 will be described with reference to FIGS. 34 to 43.

First, a concrete example of the operation step S401 shown in FIG. 32 will be described with reference to FIG. 34.

Figure 34:
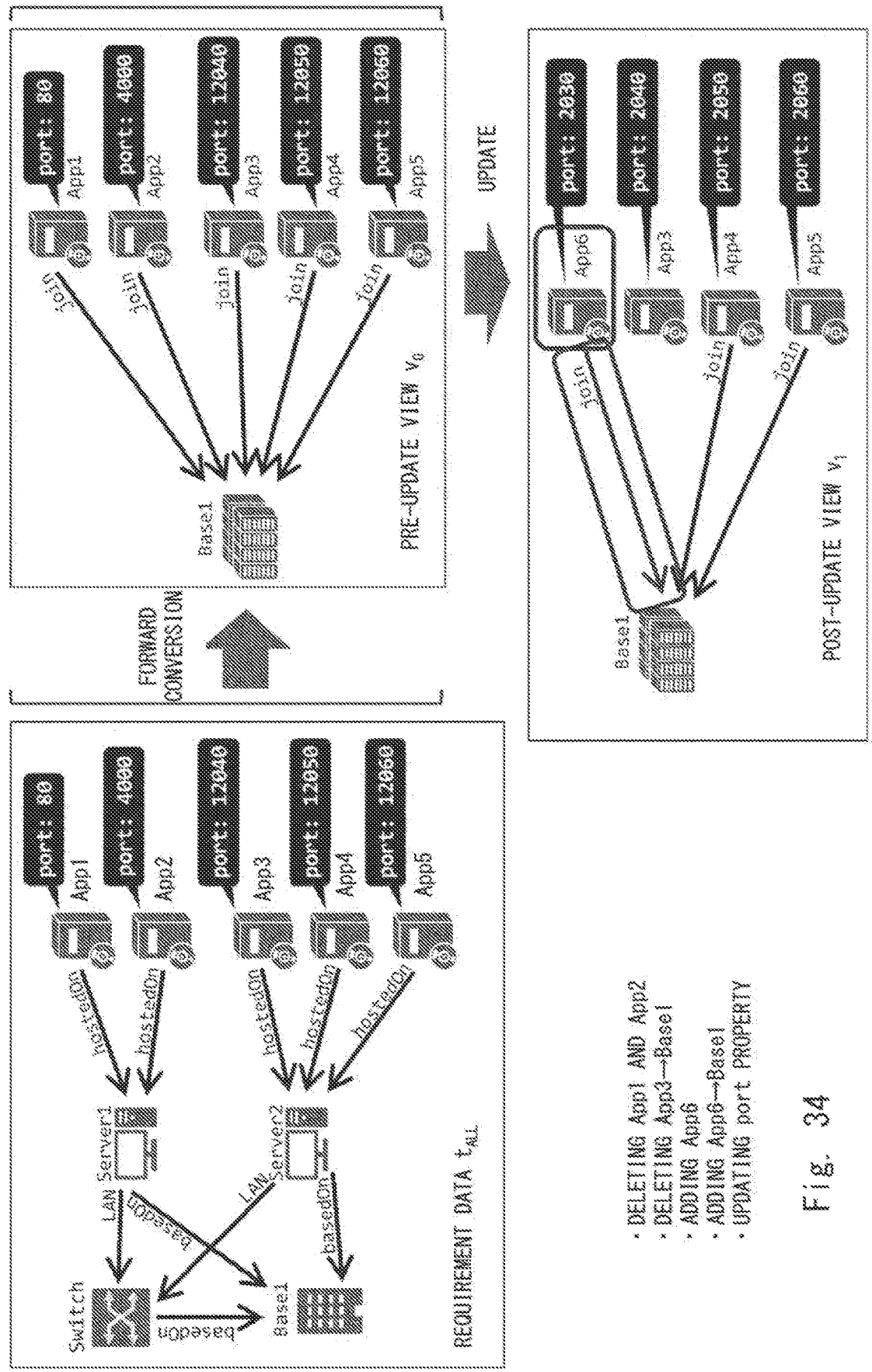
FIG. 34 is a view illustrating a concrete example of an operation of step S401 shown in FIG. 32.

In step S401, the requirement data update unit 103 inputs requirement data $t_{ALL}$ as shown in, for example, FIG. 34 from the system requirement concretization unit 101.

Further, the requirement data update unit 103 inputs a post-update view $v_1$ as shown in, for example, FIG. 34 from the system requirement concretization unit 101. In the post-update view $v_1$, the following operations are performed on a pre-update view $v_0$:

deleting node "App1" and "App2";
deleting an edge $$App3 \xrightarrow{join} Base1;$$

adding a node "App6";
adding an edge $$App6 \xrightarrow{join} Base1;$$

and
updating a port property.

Next, a concrete example of the operation of step S402 shown in FIG. 32 will be described with reference to FIG. 35.

In step S402, the requirement data update unit 103 performs forward conversion of the requirement data $t_{ALL}$. As a result, the requirement data update unit 103 obtains a pre-update view $v_0$ and a mapping table T as shown in FIG. 35, for example.

Next, a concrete example of the operation of step S403 shown in FIG. 32 will be described with reference to FIG. 36.

Figure 36:
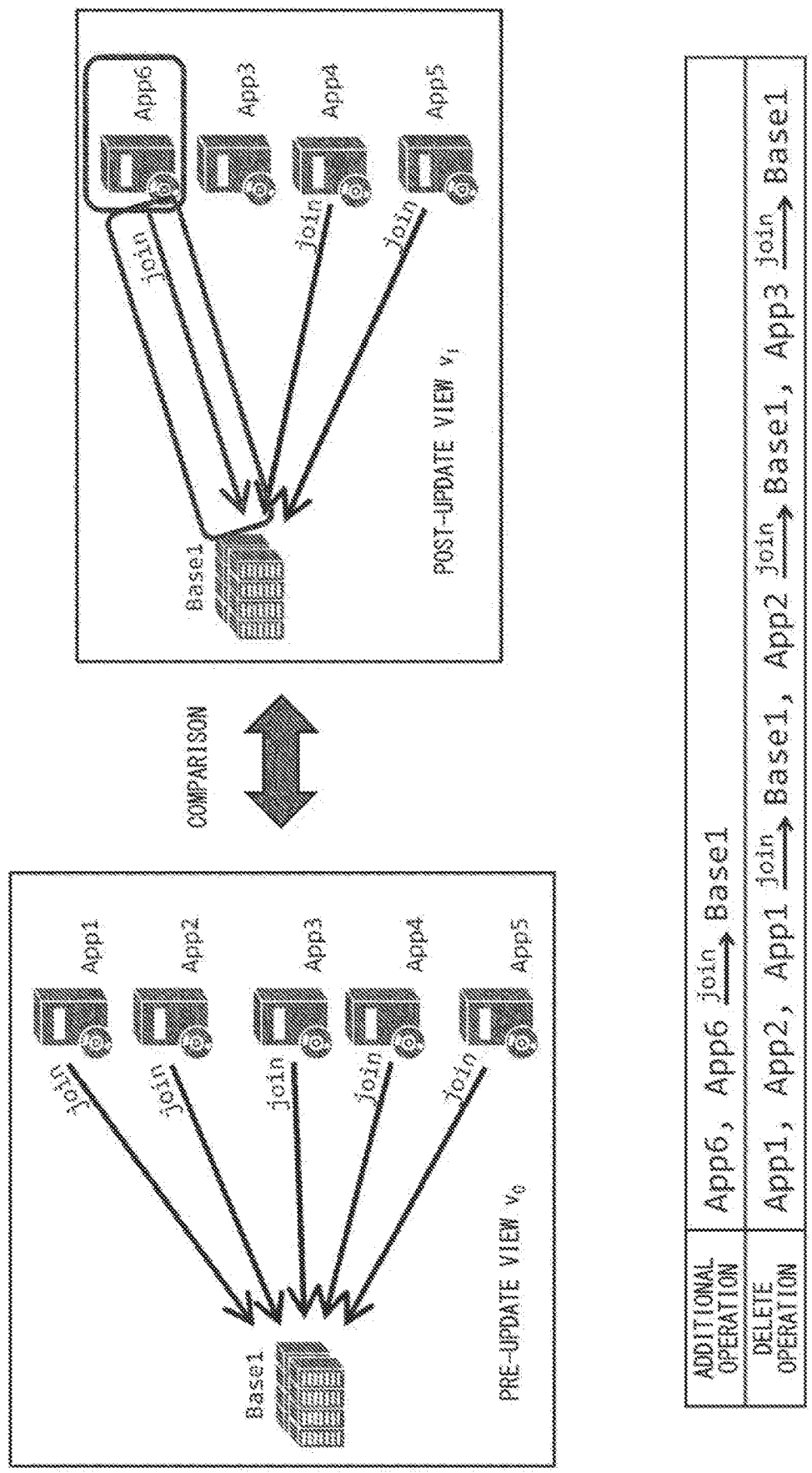
FIG. 36 is a view illustrating a concrete example of an operation of step S403 shown in FIG. 32.

In step S403, the requirement data update unit 103 compares a pre-update view $v_0$ and a post-update view $v_1$ with each other as shown in FIG. 36, for example. Then, the requirement data update unit 103 calculates, based on the comparison result, all additional operations (ADD $e_1:t_1$, ADD $e_2:t_2$, ...) and all delete operations (DEL $e_1:t_1$, DEL $e_2:t_2$, ...) performed on the pre-update view $v_0$. As a result, the requirement data update unit 103 obtains an additional operation and a delete operation as shown in FIG. 36, for example.

Figure 37:
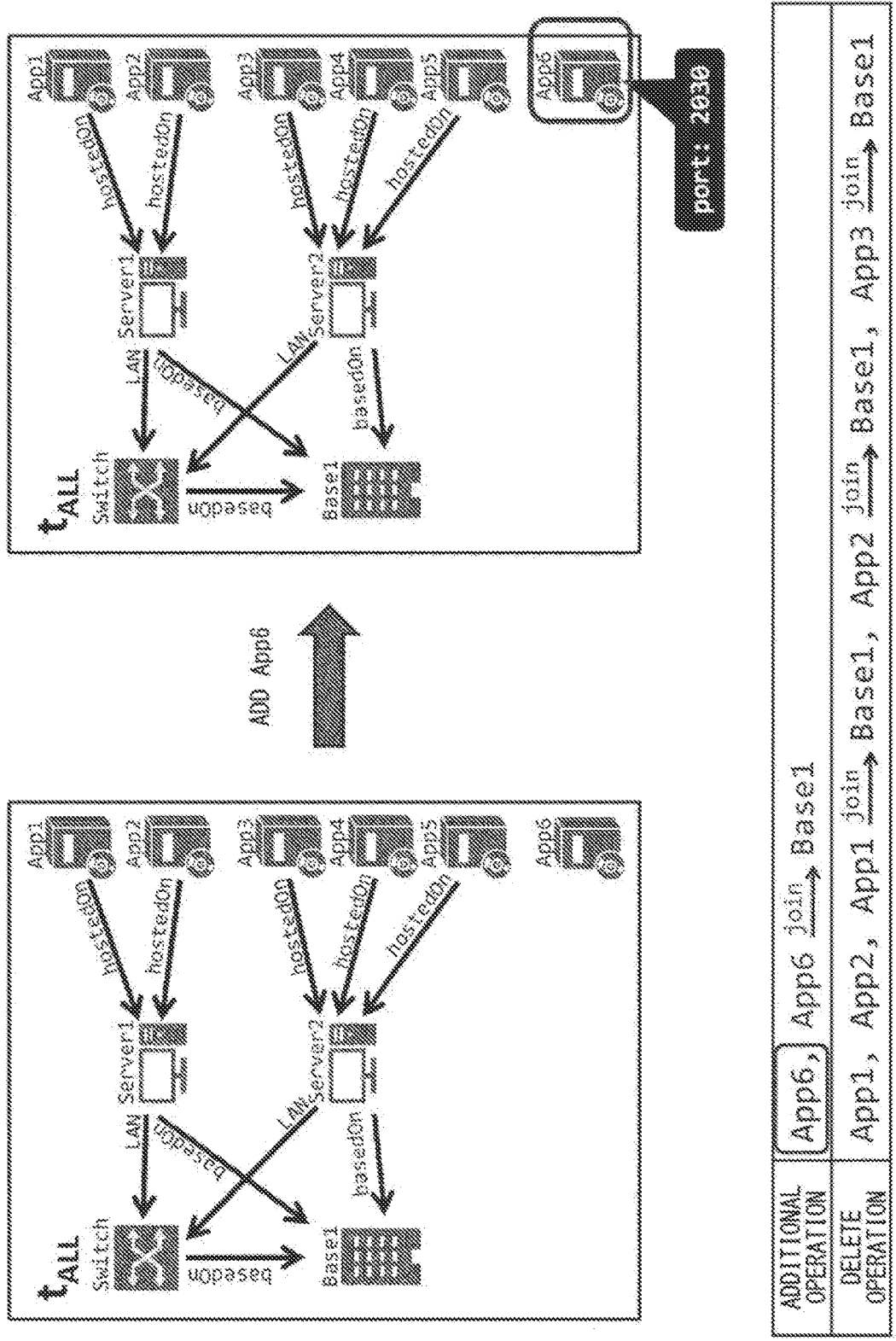
FIG. 37 is a view illustrating a concrete example of operations of steps S404 and S405 shown in FIG. 32.
Figure 38:
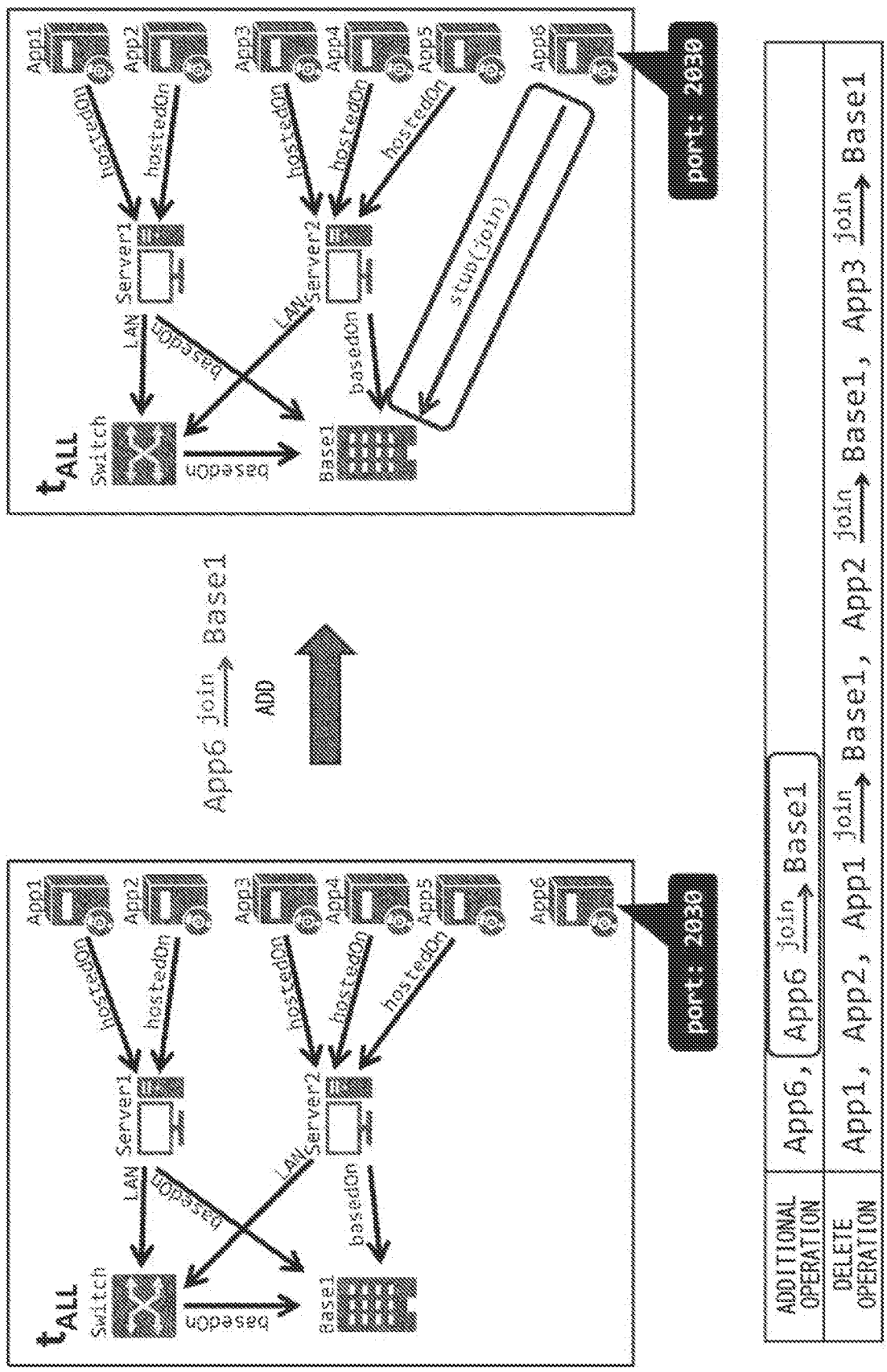
FIG. 38 is a view illustrating a concrete example of operations of steps S404 and S405 shown in FIG. 32.

Next, a concrete example of the operations of steps S404 and S405 shown in FIG. 32 will be described with reference to FIGS. 37 and 38.

In step S404, the requirement data update unit 103 selects the additional operation, on which step S405 has not been performed, from the additional operations calculated in step S403. In the example of FIG. 37, the following additional operation is selected:

adding a node "App6".

In this case, the requirement data update unit 103 adds the node "App6", which is an entity e' included in a substructure t(e) corresponding to the node "App6" to the requirement data $t_{ALL}$ in the subsequent step S405.

At this time, the requirement data update unit 103 sets, based on property mapping information possessed by the mapping, a property (here, port: 2030) to the node "App6" added to the requirement data $t_{ALL}$.

Thereafter, it is assumed that the process returns to step S404 again. In this case, in step S404, the requirement data update unit 103 selects another additional operation, on which step S405 has not been performed, from the additional operations calculated in step S403. In the example of FIG. 38, the following additional operation is selected:

adding an edge

In this case, in the subsequent step S404, the requirement data update unit 103 adds an edge

which is an entity e' included in a substructure t(e) corresponding to the edge

to the requirement data $t_{ALL}$.

Next, a concrete example of the operations of steps S407 and S408 shown in FIG. 33 will be described with reference to FIGS. 39 and 40.

In step S407, the requirement data update unit 103 selects one delete operation, on which step S408 has not been performed, from the delete operations calculated in step S403.

In step S408, the requirement data update unit 103 confirms all entities e' included in the substructure t(e) corresponding to the entity e, which is deleted by the delete operation selected in step S407, in the mapping source column of the mapping table T. Then, the requirement data update unit 103 deletes the entity e in the mapping destination column of the mapping table T and from the same row as the entity e' in the table for each of all the confirmed entities e'.

FIG. 40 shows an example of a mapping table T after step S408 is performed on all of the delete operations calculated in step S403, that is, after all the relevant entities e are deleted, and FIG. 39 shows an example of a mapping table T before all the relevant entities e are deleted.

Next, a concrete example of the operation of step S410 shown in FIG. 33 will be described with reference to FIGS. 40 and 41.

In step S410, the requirement data update unit 103 confirms entities e' of which the mapping destination column of the mapping table T is empty.

For example, in the example of FIG. 40, there are the following entities e' of which the mapping destination column of the mapping table T is empty:

a node "App1";
a node "App2";
a node "Server1";
an edge

an edge

an edge

and
an edge

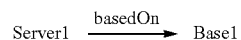

Figure 41:
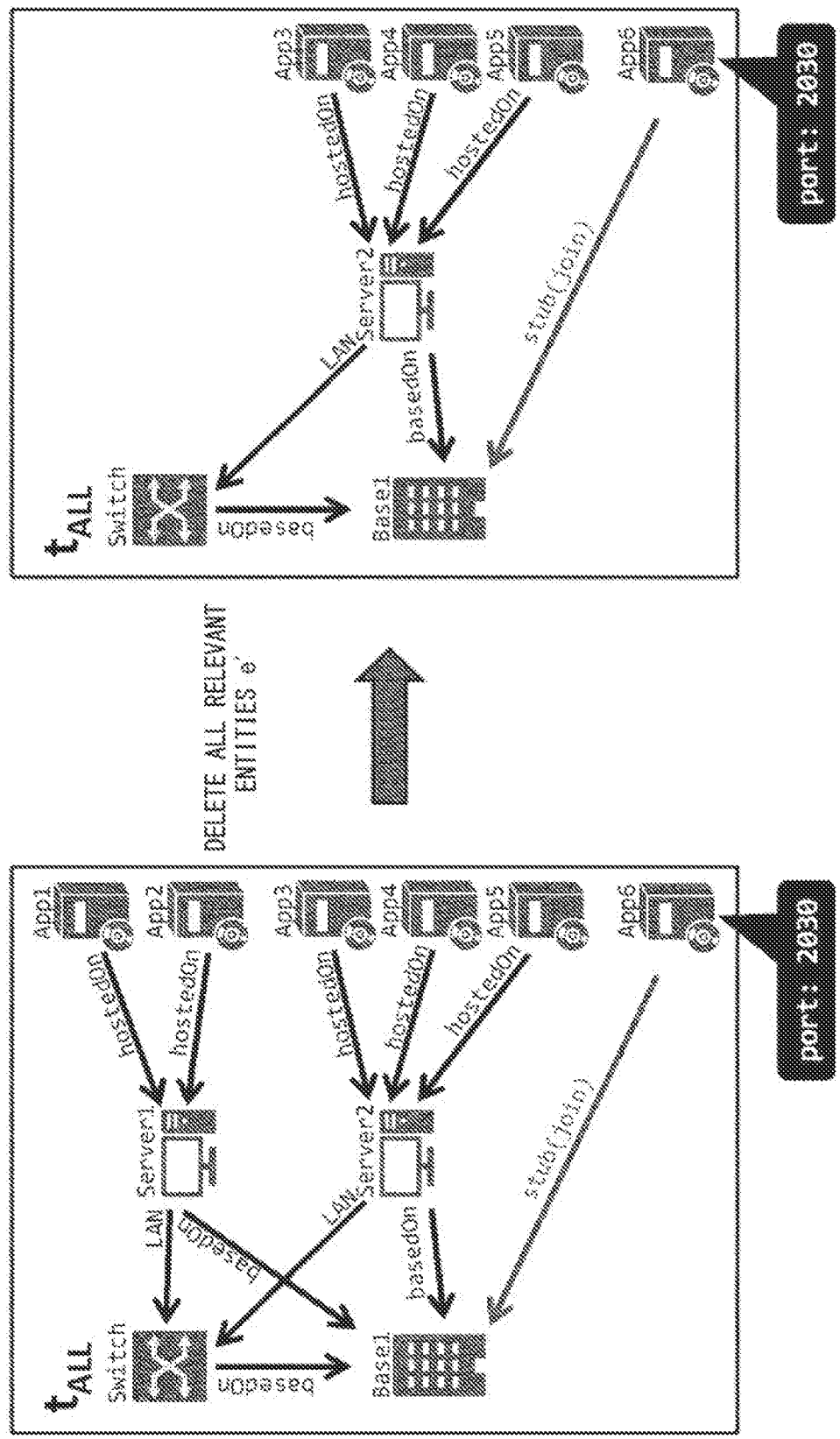
FIG. 41 is a view illustrating a concrete example of an operation of step S410 shown in FIG. 33.

Therefore, the requirement data update unit 103 deletes all entities e' of which the mapping destination column is empty as shown in FIG. 41, from the requirement data $t_{ALL}$.

In FIG. 41, the entity (edge)

is deleted in conjunction with the deletion of the node.

Figure 43:
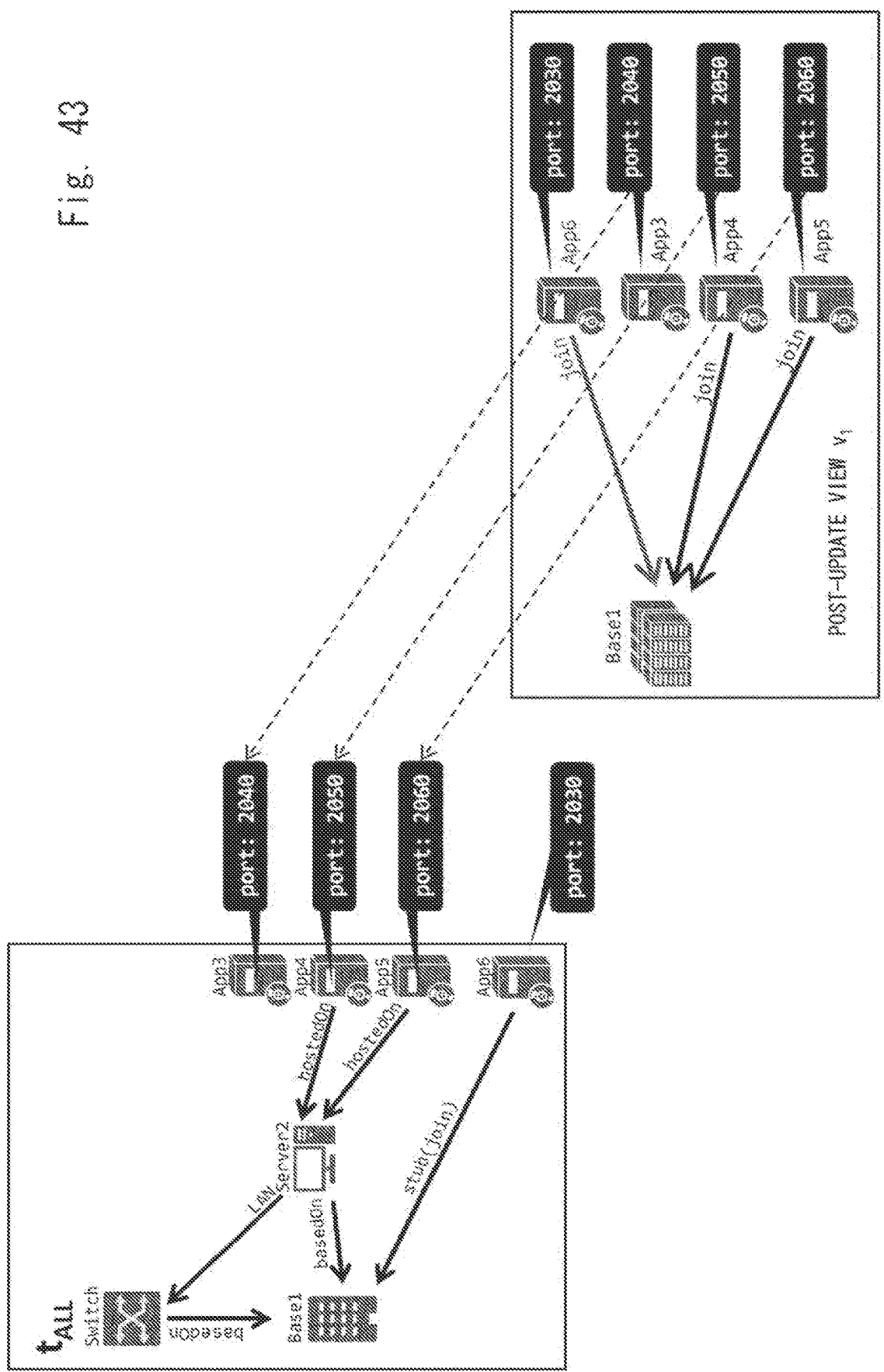
FIG. 43 is a view illustrating a concrete example of an operation of step S411 shown in FIG. 33.

Next, a concrete example of the operation of step S411 shown in FIG. 33 will be described with reference to FIGS. 42 and 43.

In step S411, the requirement data update unit 103 refers to the mapping table T. When the entities e' with the empty mapping destination column are deleted from the mapping table T shown in FIG. 40, the result is as shown in FIG. 42. The requirement data update unit 103 can determine which entity in the requirement data $t_{ALL}$ corresponds to each of the entities in the post-update view $v_1$ with reference to the mapping table T shown in FIG. 42. Therefore, as shown in FIG. 43, the requirement data update unit 103 sets a property of the entity in the post-update view $v_1$ to a property of the corresponding entity in the requirement data $t_{ALL}$. In step S405 described with reference to FIG. 37, a property has already been set for the node "App6" in the requirement data $t_{ALL}$. Therefore, it is not necessary to perform the property setting in step S411 on the node "App6" in the requirement data $t_{ALL}$.

<System Requirement Concretization Unit>

The system requirement concretization unit 101 will be described in detail below.

First, a description will be given with reference to FIG. 44 with respect to a flow of a schematic operation of the automatic design process by the system requirement concretization unit 101.

Figure 44:
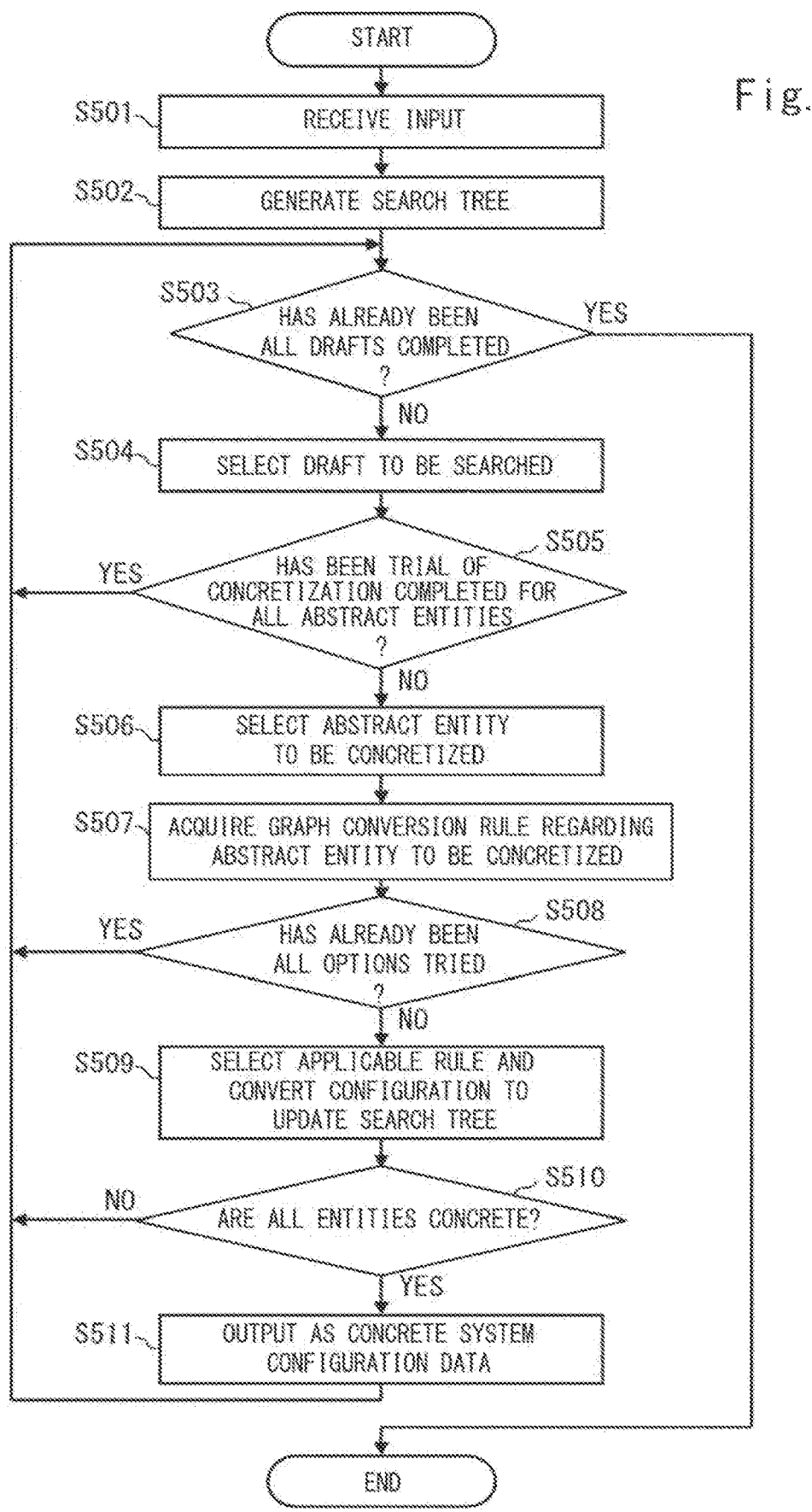
FIG. 44 is a flowchart illustrating an example of a flow of an automatic design process by a system requirement concretization unit according to the first example embodiment.

As shown in FIG. 44, first, the system requirement concretization unit 101 receives input of requirement data of configuration requirements described as an abstract configuration and a list of aspect models from the input/output device (not shown) (step S501).

Next, the system requirement concretization unit 101 generates a search tree including a root node (hereinafter, referred to as drafts), the root node including attached information (which will be described below) related to the received requirement data and the received aspect model (step S502). The system requirement concretization unit 101 records the generated search tree.

Next, the system requirement concretization unit 101 confirms whether the search is completed for all the drafts in the search tree (step S503). When the search is completed (YES in step S503), the system requirement concretization unit 101 ends the entire processing of the automatic design process.

When the search is not completed for all the drafts in the search tree (NO in step S503), the system requirement concretization unit 101 selects one draft to be searched next (step S504). As a method of selecting the draft to be searched next, the system requirement concretization unit 101 can use a random selection method, a depth-first selection method, or a width-first selection method.

Next, the system requirement concretization unit 101 confirms whether a trial of concretization has been completed for all abstract entities included in the selected draft (step S505). The abstract entity to be confirmed in step S505 includes not only an abstract entity in the requirement data but also an abstract entity in each view (pre-update view) generated from the requirement data. When the trial of concretization has been completed for all the abstract entities (YES in step S505), the system requirement concretization unit 101 performs the process of step S503 again.

When the trial of concretization has not been completed for all the abstract entities (NO in step S505), the system requirement concretization unit 101 selects an abstract entity to be concretized from the abstract entities for which the trial of concretization has not been completed (step S506). As a method of selecting the abstract entity to be concretized, the system requirement concretization unit 101 can use a random selection method, a depth-first selection method, or a width-first selection method.

Next, the system requirement concretization unit 101 inquires the graph conversion rule DB 107 of the graph conversion rule that can be used for conversion of the abstract entity to be concretized using the selected abstract entity to be concretized as a key. Next, the system requirement concretization unit 101 acquires the graph conversion rule from the graph conversion rule DB 107 (step S507).

Next, the system requirement concretization unit 101 confirms whether all options have been completely tried with respect to options of the concretization method described in the acquired graph conversion rule (step S508). When all the options have been completely tried (YES in step S508), the system requirement concretization unit 101 performs the process of step S503 again.

When all the options of the concretization method have not been completely tried (NO in step S508), the system requirement concretization unit 101 selects an option indicating the applicable concretization method from the unselected options. As a method of selecting the concretization method, the system requirement concretization unit 101 can use a random selection method, a depth-first selection method, or a width-first selection method.

Next, the system requirement concretization unit 101 converts a part of the configuration including the abstract entity selected according to the conversion rule indicated by the selected concretization method. At this time, when the abstract entity is an abstract entity in the requirement data, the system requirement concretization unit 101 performs the above-described conversion by applying the requirement data concretization pattern using the graph conversion unit 1011, and generates a new draft that the requirement data in the draft selected in step S504 is converted by this conversion. On the other hand, when the abstract entity is an abstract entity in the view (pre-update view), the system requirement concretization unit 101 performs the above-described conversion by applying the view concretization pattern using the graph conversion unit 1011, and generates a new draft that the draft selected in step S504 is converted by reflecting the content of the converted view (post-update view) on the requirement data in the draft selected in step S504 using the requirement data update unit 103.

Next, the system requirement concretization unit 101 adds the generated new draft to the search tree as a child element of the draft selected in step S504. By execution of the above processing, the system requirement concretization unit 101 updates the search tree (step S509).

In addition, the system requirement concretization unit 101 records, as attached information of the draft selected in step S504, that the concretization method selected in step S509 has already been applied to the abstract entity selected in step S506.

When the all of the concretization methods have already been applied to the abstract entity selected in step S506, the system requirement concretization unit 101 further records, as attached information of the draft, that all of the options have already been tried for the abstract entity.

When the fact is recorded that all of the options have already been tried for all of the abstract entities of the draft selected in step S504, the system requirement concretization unit 101 records, as attached information of the draft, that the trial of concretization has already been completed for all of the abstract entities. In each determination process in steps S503, S505, and S508, the system requirement concretization unit 101 can use the recorded attached information of the draft.

Next, the system requirement concretization unit 101 confirms whether all of the entities in the new draft generated by the conversion are concrete (step S510). The entity to be confirmed in step S510 includes not only the entity in the requirement data but also the entity in each view (pre-update view) generated from the requirement data. When the new draft includes a non-concrete entity (NO in step S510), the system requirement concretization unit 101 performs the process of step S503 again.

When all of the entities included in the new draft are concrete (YES in step S510), the system requirement concretization unit 101 outputs, as concrete system configuration data, the requirement data associated with the new draft generated in step S509 to the input/output device (not shown) (step S511).

Subsequently, a specific example of the automatic design process shown in FIG. 44 will be described with reference to FIGS. 45 to 56.

First, a description will be given with reference to FIG. 45 with respect to a specific example of nodes of a search tree generated and updated by the automatic design process shown in FIG. 44.

The nodes of the search tree in the existing automatic design process have contained only the requirement data (see FIG. 1).

Figure 45:
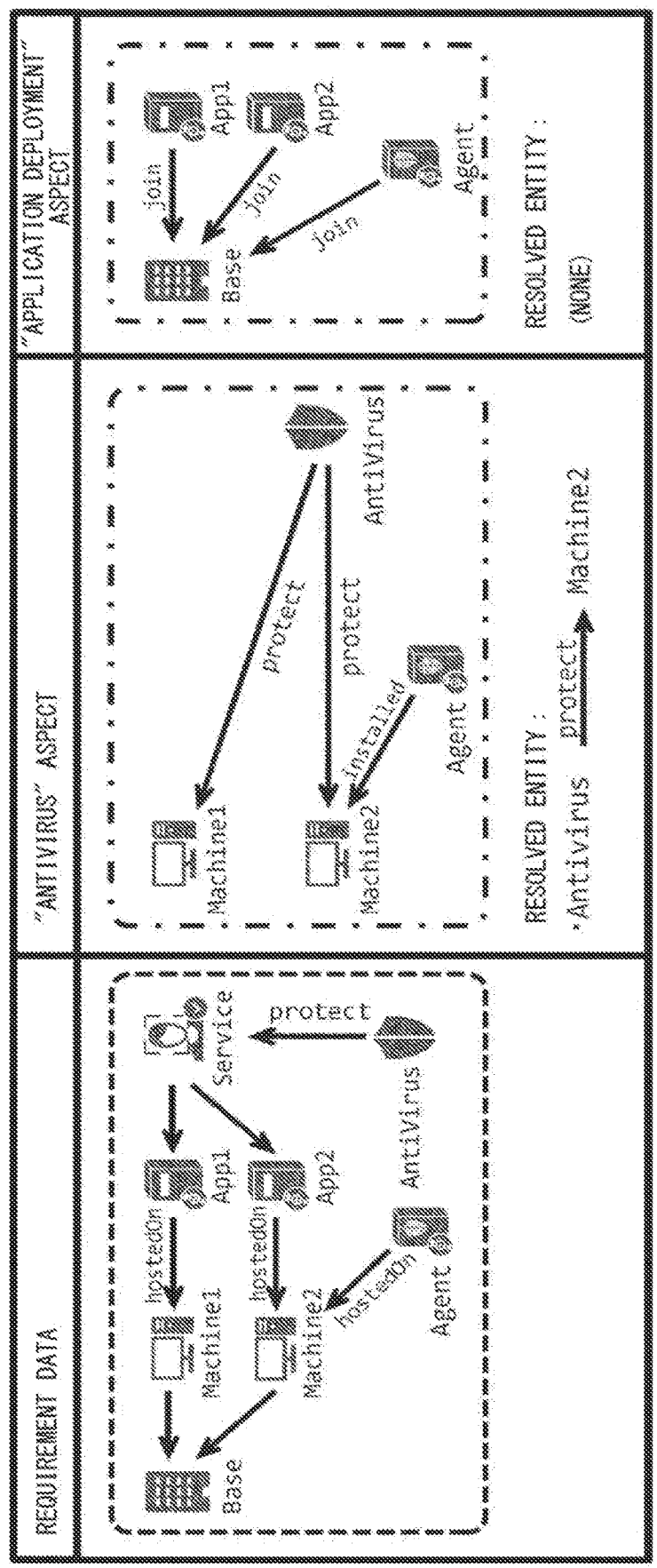
FIG. 45 is a view illustrating a concrete example of a node of a search tree generated and updated by the automatic design process shown in FIG. 44.

On the other hand, the nodes of the search tree in the automatic design process according to the first example embodiment contain not only requirement data but also the following two kinds of data regarding each aspect model to be used, as shown in FIG. 45.

(1) View

A view is a view generated from the requirement data.

(2) List of Resolved Entities

A resolved entity is an entity, which has already been converted using the view concretization pattern, out of the entities in the view.

FIG. 45 shows an example of a node when two aspect models of "antivirus" and "application deployment" are selected by the system requirement concretization unit 101.

A specific example of the operation of steps S505 and S510 shown in FIG. 44 will be described below with reference to FIG. 46.

In step S505, the system requirement concretization unit 101 searches for an abstract entity for which the trial of concretization has not been completed, and performs the process of step S506 when such an abstract entity is found.

In step S510, the system requirement concretization unit 101 searches for a non-concrete entity (that is, an abstract entity), and performs the process of step S503 again when such an abstract entity is found.

The abstract entity found in step S505 or S510 is selected as the abstract entity to be concretized in subsequent step S506 and is converted using the graph conversion rule in subsequent step S509.

In the existing automatic design process, only the abstract entity in the requirement data is found.

On the other hand, the following two kinds of abstract entities are found in the automatic design process according to the first example embodiment.

(1) Abstract entity in requirement data (2) Abstract entity, which is not on the list of resolved entities, out of the abstract entities in the view.

Figure 46:
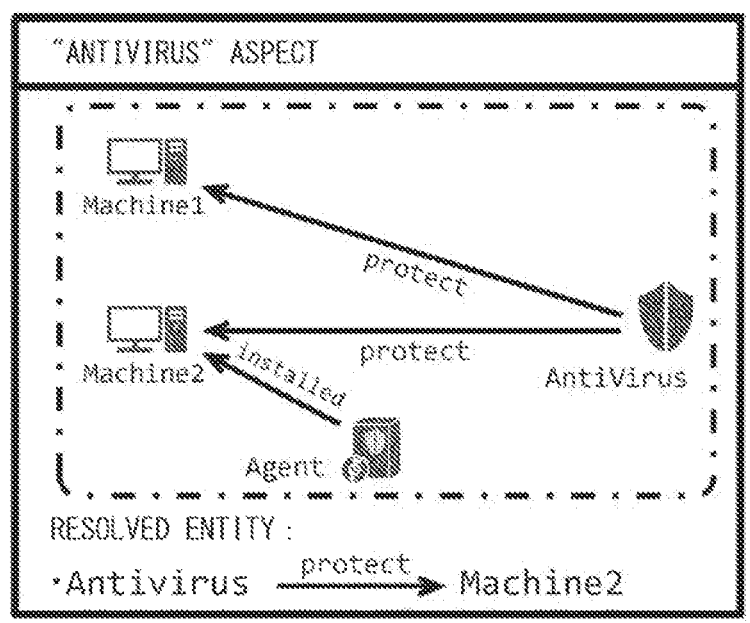
FIG. 46 is a view illustrating a concrete example of operations of steps S505 and S510 shown in FIG. 44.

For example, an edge "protect" in the view shown in FIG. 46 is assumed to be an abstract edge. In the example of FIG. 46, two edges "protect" are spread.

However, one edge

is designated as resolved.

Therefore, in the example of FIG. 46, only the other edge

is an abstract entity that is found by the system requirement concretization unit 101 in step S505 or S510.

Next, a specific example of the operation of step S509 shown in FIG. 44 will be described below with reference to FIGS. 47 to 56.

In step S509, using the graph conversion unit 1011, the system requirement concretization unit 101 converts the requirement data by applying the requirement data concretization pattern or converts the view (pre-update view) by applying the view concretization pattern.

Therefore, first, a description will be given with reference to FIGS. 47 to 50 with respect to a specific example of the operation when the requirement data is converted using the requirement data concretization pattern in step S509 shown in FIG. 44.

When converting the requirement data by applying the requirement data concretization pattern using the graph conversion unit 1011, the system requirement concretization unit 101 generates the view (pre-update view) again from the converted requirement data using the view generation unit 102.

Hereinafter, the above-described procedure for converting the requirement data will be described in order.

Figure 47:
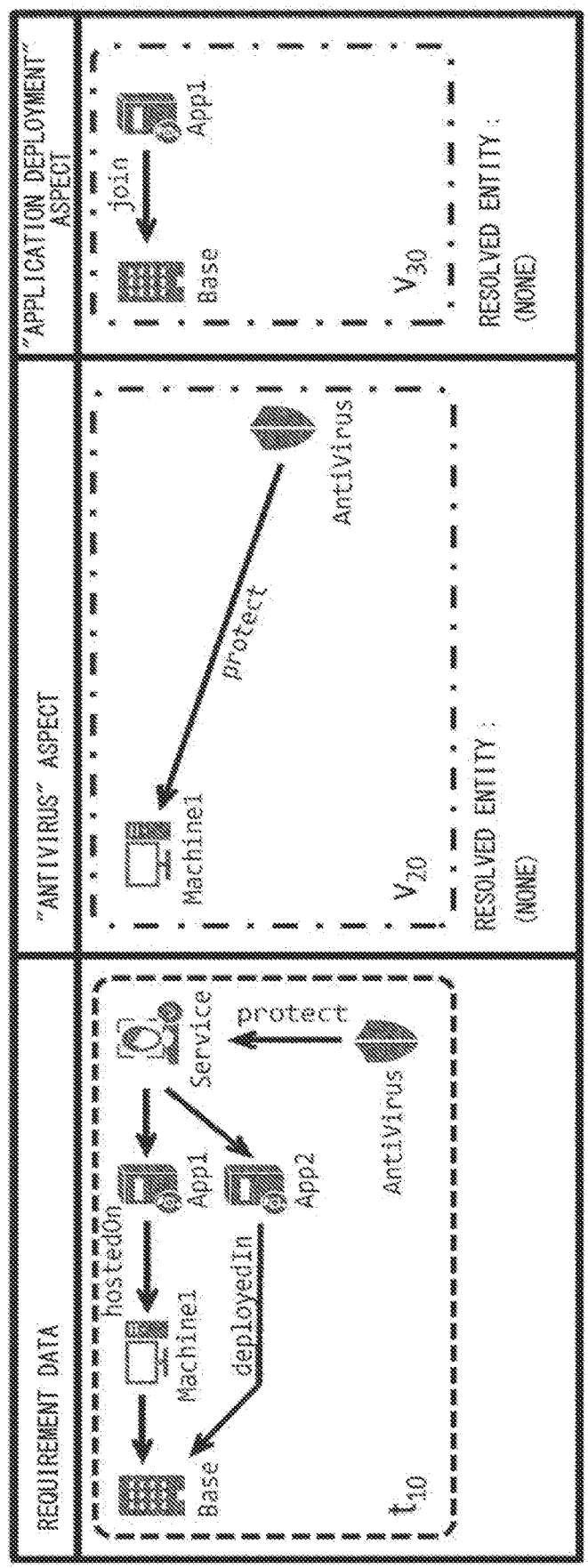
FIG. 47 is a view illustrating a concrete example of an operation of step S509 shown in FIG. 44.

As shown in FIG. 47, it is assumed herein that the node to be processed in step S509 includes requirement data $t_{10}$, a view $v_{20}$ generated from the requirement data $t_{10}$ using the aspect model of "antivirus", and a view $v_{30}$ generated from the requirement data $t_{10}$ using the aspect model of "application deployment".

Figure 48:
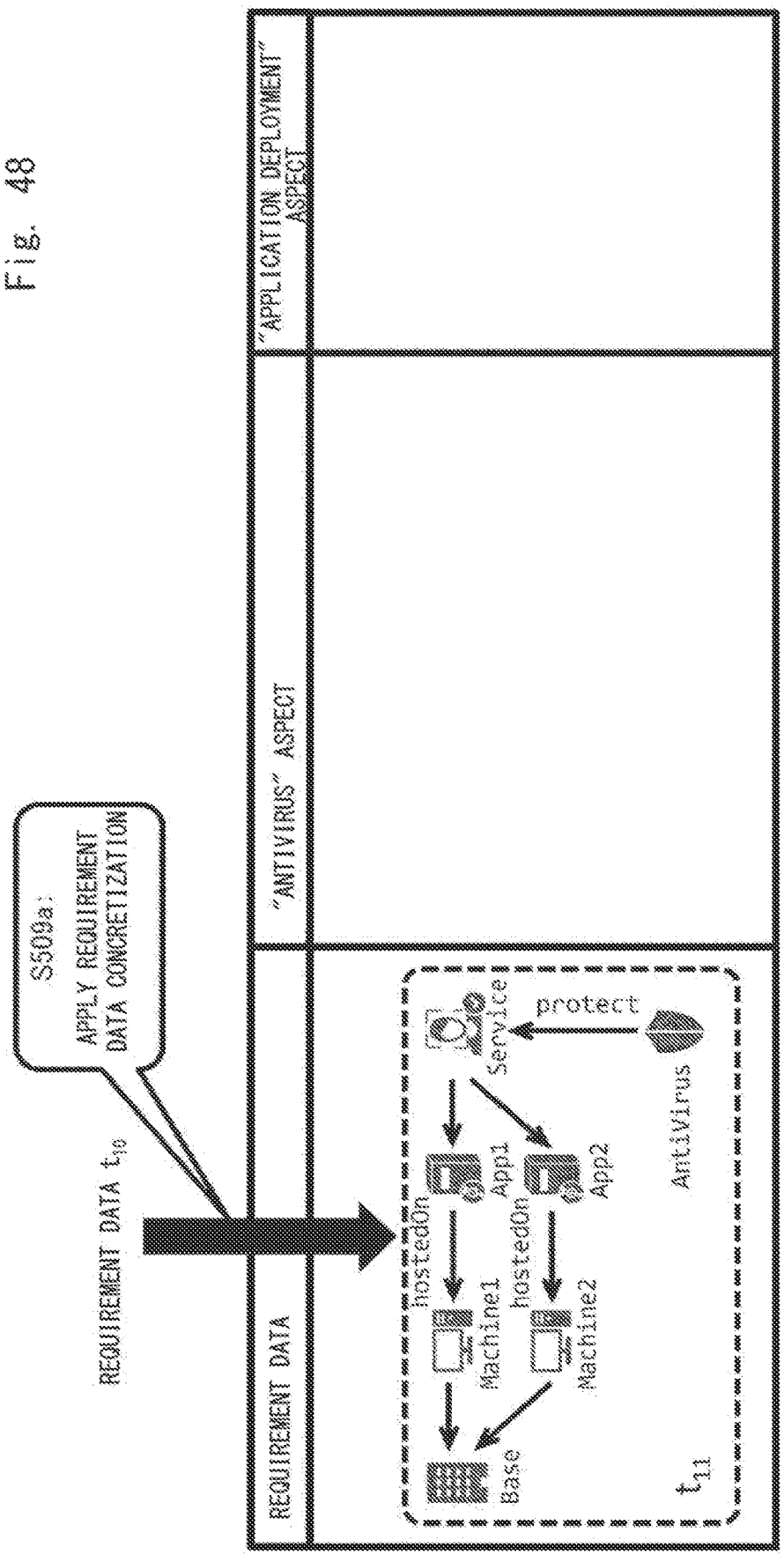
FIG. 48 is a view illustrating a concrete example of an operation of step S509 shown in FIG. 44.

Step S509a:

First, as shown in FIG. 48, the system requirement concretization unit 101 converts the requirement data $t_{10}$ into requirement data $t_{11}$ by applying the requirement data concretization pattern to the requirement data $t_{10}$ using the graph conversion unit 1011.

Figure 49:
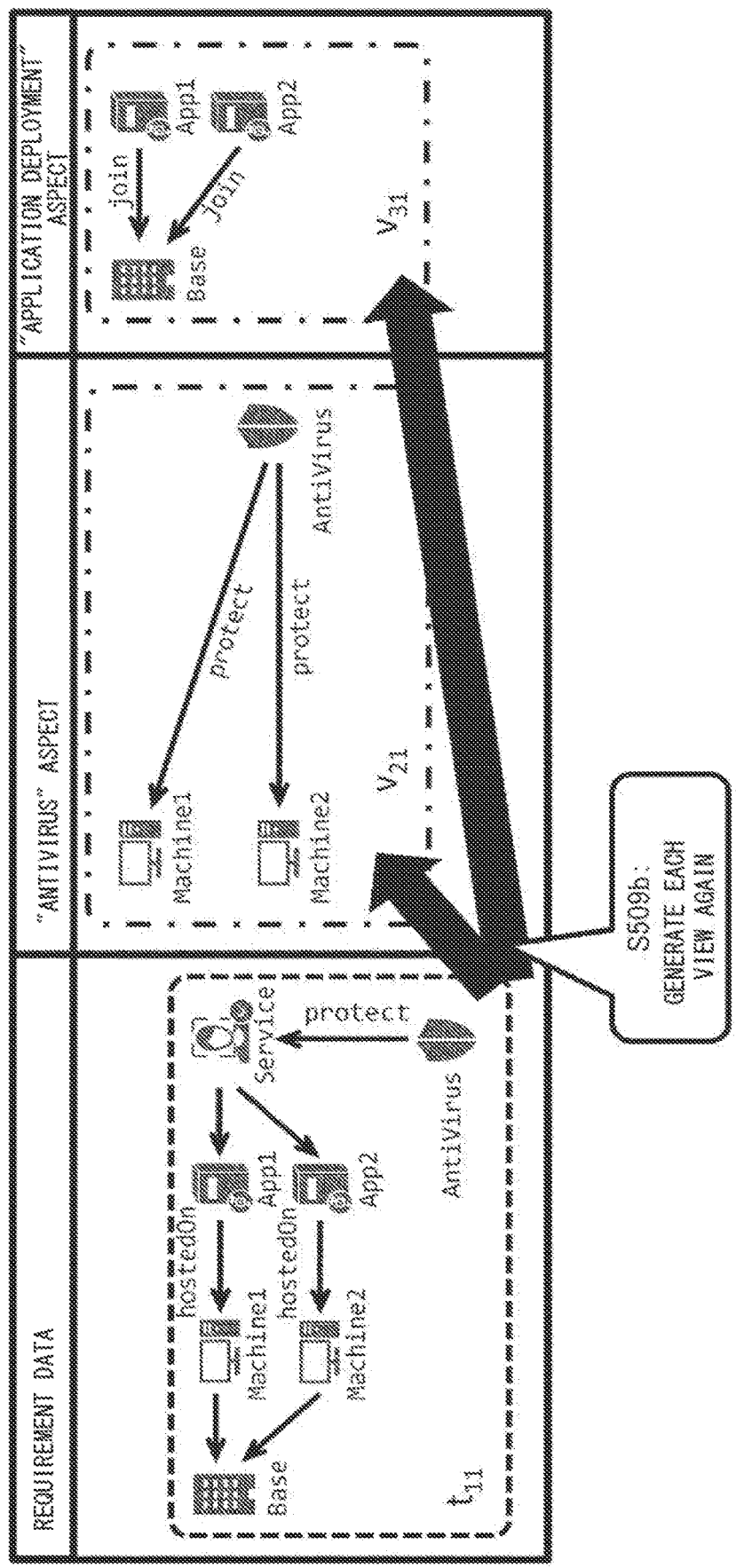
FIG. 49 is a view illustrating a concrete example of an operation of step S509 shown in FIG. 44.

Step S509b:

Next, as shown in FIG. 49, the system requirement concretization unit 101 generates a view $v_{21}$ again from the requirement data $t_{11}$ using the aspect model of "antivirus" with the view generation unit 102. Further, the system requirement concretization unit 101 generates a view $v_{31}$ again from the requirement data $t_{11}$ using the aspect model of "application deployment" with the view generation unit 102.

Figure 50:
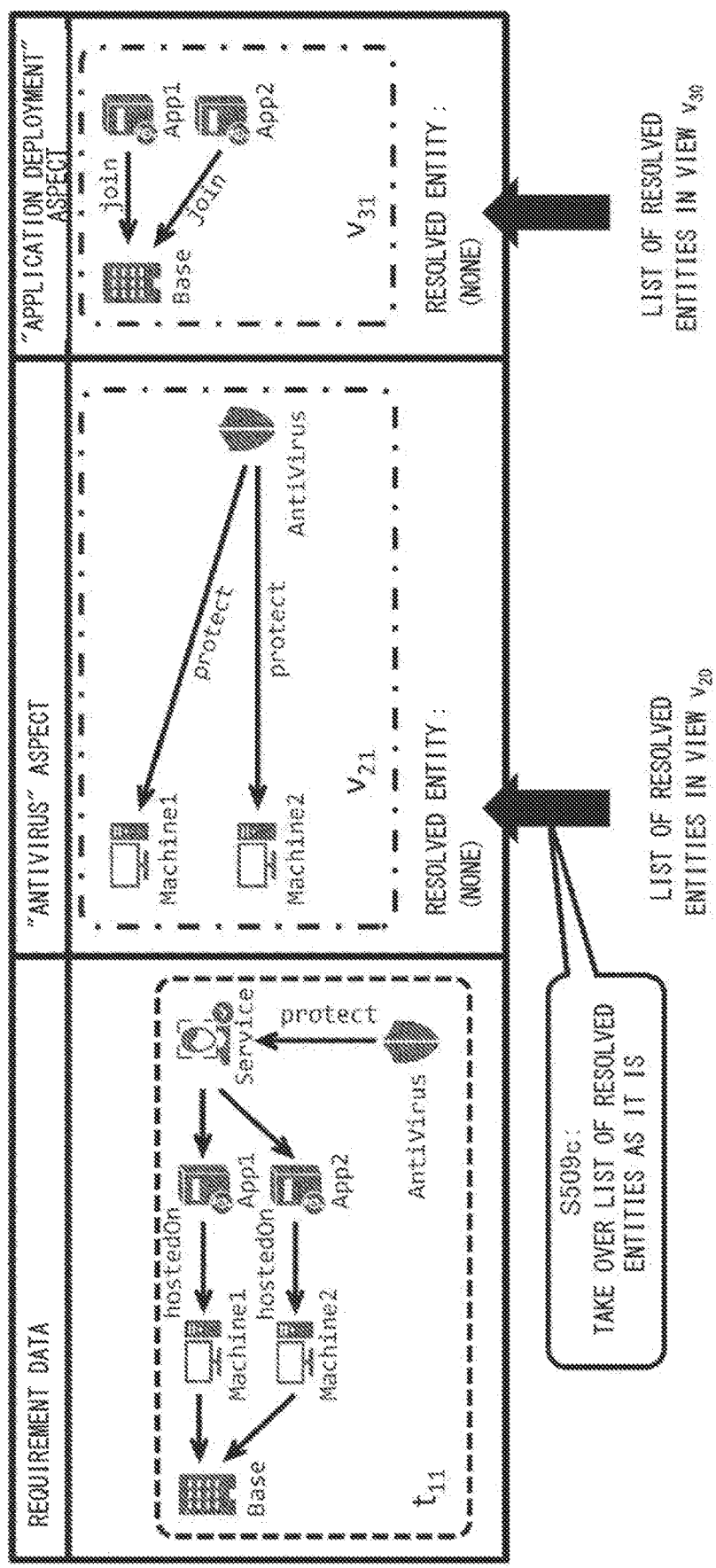
FIG. 50 is a view illustrating a concrete example of an operation of step S509 shown in FIG. 44.

Step S509c:

Thereafter, as shown in FIG. 50, the system requirement concretization unit 101 takes over the list of resolved entities in the view $v_{20}$ as it is as a list of resolved entities in the view $v_{21}$. Further, the system requirement concretization unit 101 takes over the list of resolved entities in the view $v_{30}$ as it is as a list of resolved entities in the view $v_{31}$.

Next, a description will be given with reference to FIGS. 51 to 56 with respect to a specific example of the operation of converting the view (pre-update view) by applying the view concretization pattern using the graph conversion unit 1011 in step S509 shown in FIG. 44.

In a case of converting the view (pre-update view) by applying the view concretization pattern using the graph conversion unit 1011, the system requirement concretization unit 101 updates the list of resolved entities in the converted view (post-update view), and reflects the content of the post-update view on the requirement data using the requirement data update unit 103. Then, the system requirement concretization unit 101 generates another view again using the view generation unit 102.

Figure 51:
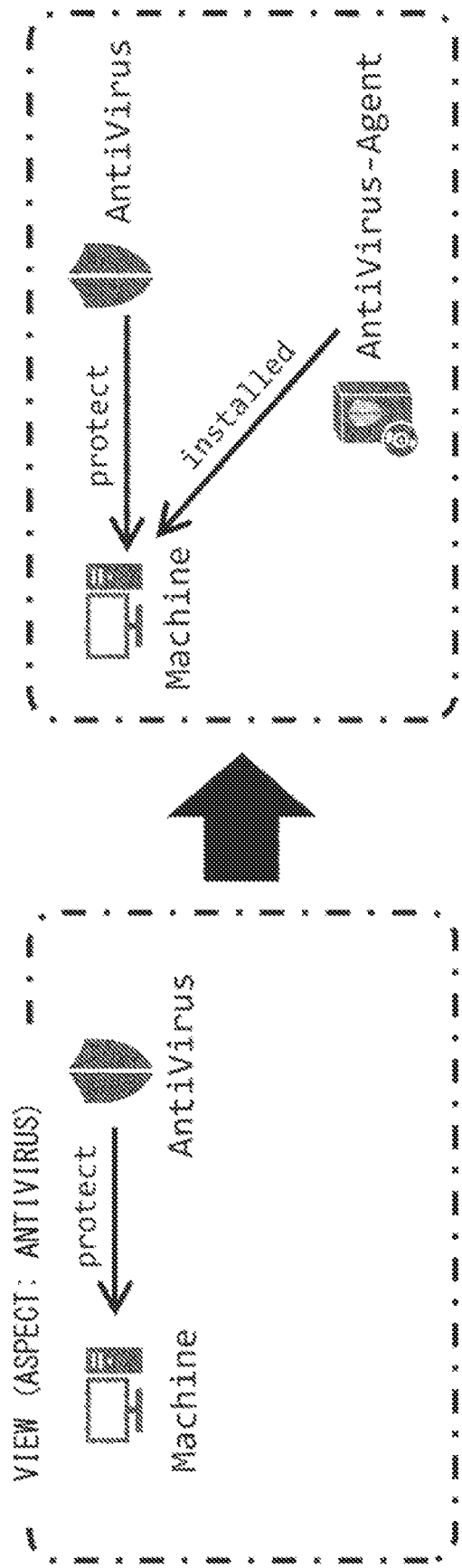
FIG. 51 is a view illustrating a concrete example of an operation of step S509 shown in FIG. 44.

At this time, the view concretization pattern may designate the converted abstract entity in the converted view (post-update view) as "resolved" (simply, may add it to the list of resolved entities) as shown in FIG. 51.

In the example of FIG. 51, an edge

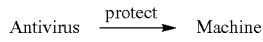

can be added to the list of resolved entities.

Hereinafter, the above-described procedure for converting the view (pre-update view) will be described in order.

Figure 52:
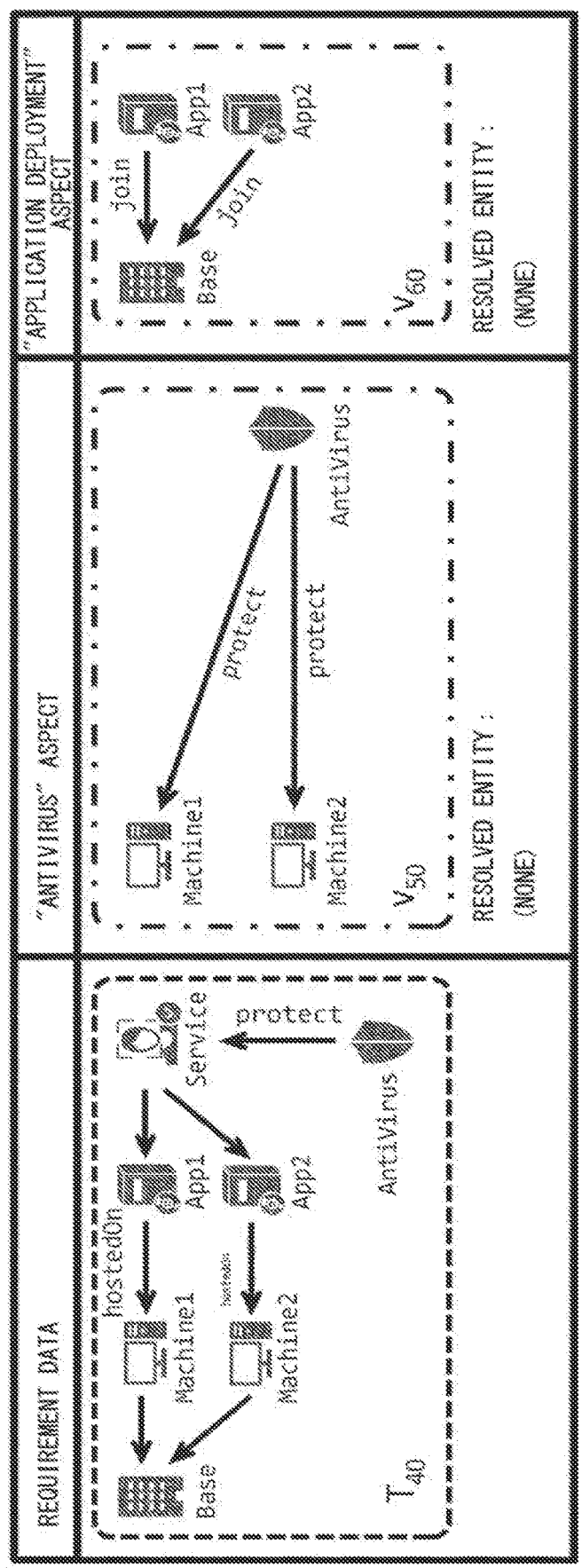
FIG. 52 is a view illustrating a concrete example of an operation of step S509 shown in FIG. 44.

As shown in FIG. 52, it is assumed herein that the node to be processed in step S509 includes requirement data $t_{40}$, a view $v_{50}$ generated from the requirement data $t_{40}$ using the aspect model of "antivirus", and a view $v_{60}$ generated from the requirement data $t_{40}$ using the aspect model of "application deployment".

Figure 53:
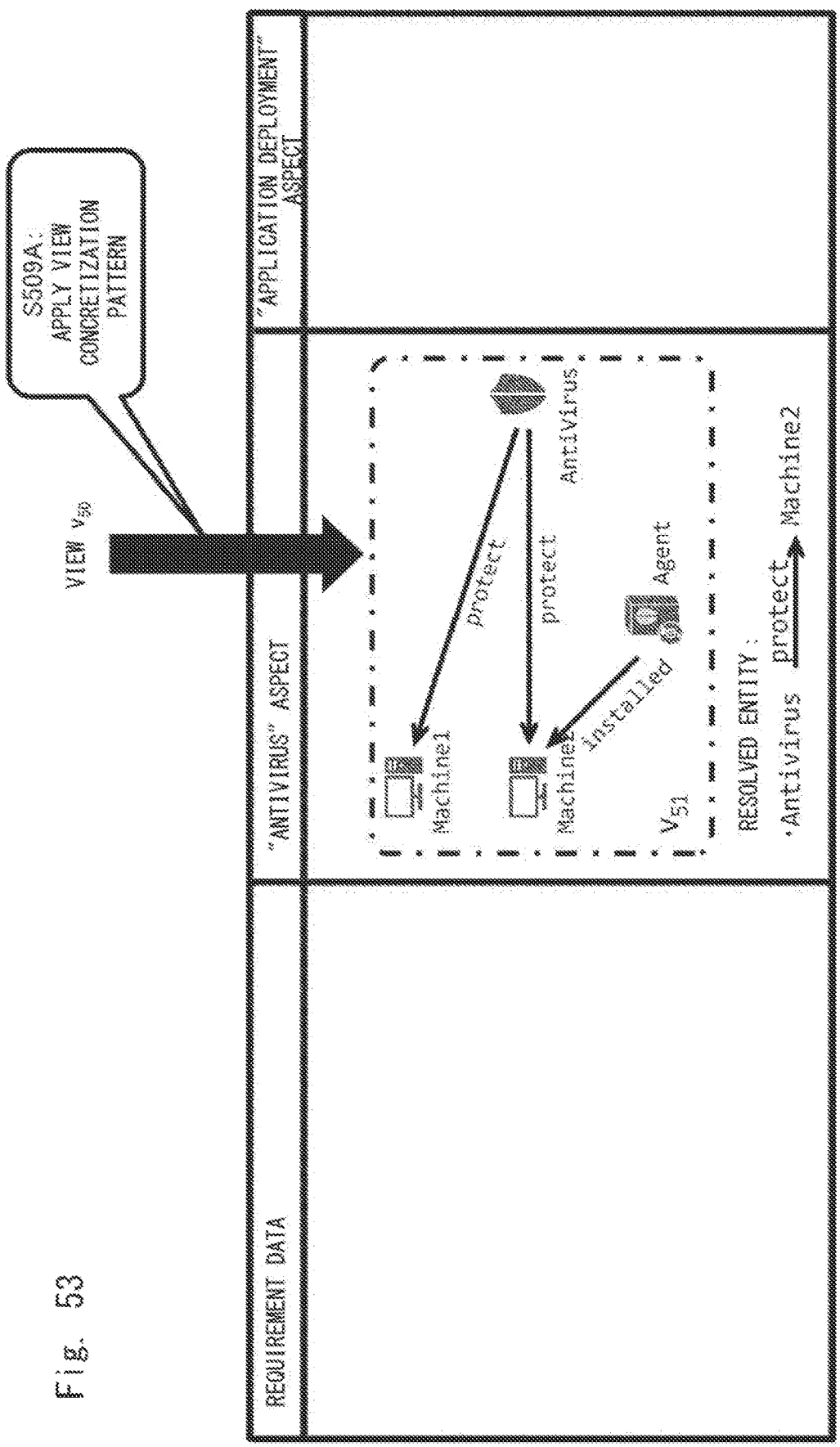
FIG. 53 is a view illustrating a concrete example of an operation of step S509 shown in FIG. 44.

Step S509A:

First, as shown in FIG. 53, the system requirement concretization unit 101 converts the view $v_{50}$ into a view $v_{51}$ by applying the view concretization pattern to the view $v_{50}$ using the graph conversion unit 1011. Further, the system requirement concretization unit 101 adds an edge

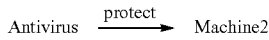

to the list of resolved entities.

Figure 54:
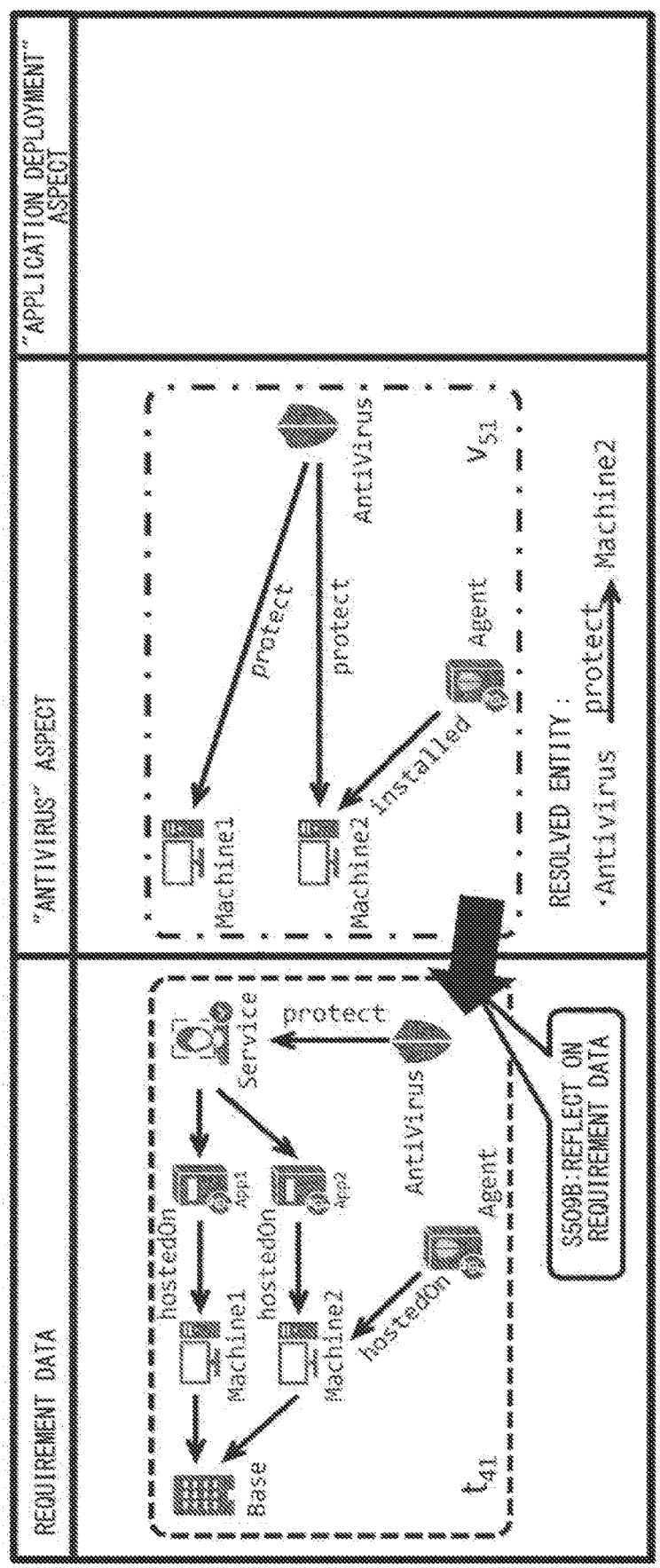
FIG. 54 is a view illustrating a concrete example of an operation of step S509 shown in FIG. 44.

Step S509B:

Next, as shown in FIG. 54, the system requirement concretization unit 101 reflects the content of the view $v_{51}$ on the requirement data $t_{40}$ using the requirement data update unit 103 to convert the requirement data $t_{40}$ into requirement data $t_{41}$.

Figure 55:
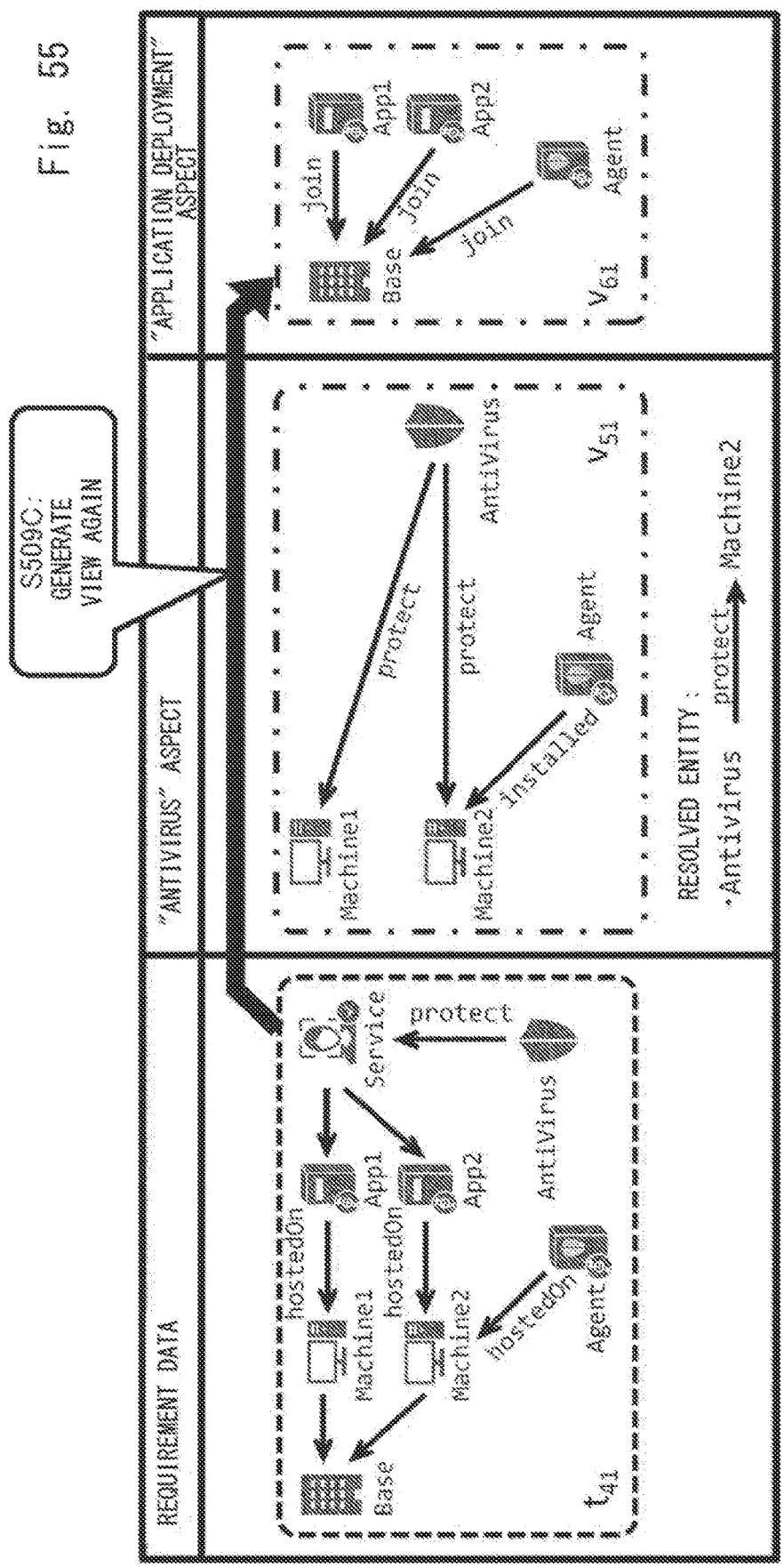
FIG. 55 is a view illustrating a concrete example of an operation of step S509 shown in FIG. 44.

Step S509C:

Next, as shown in FIG. 55, the system requirement concretization unit 101 generates a view $v_{61}$ again from the requirement data $t_{41}$ using the aspect model of "application deployment" with the view generation unit 102.

Figure 56:
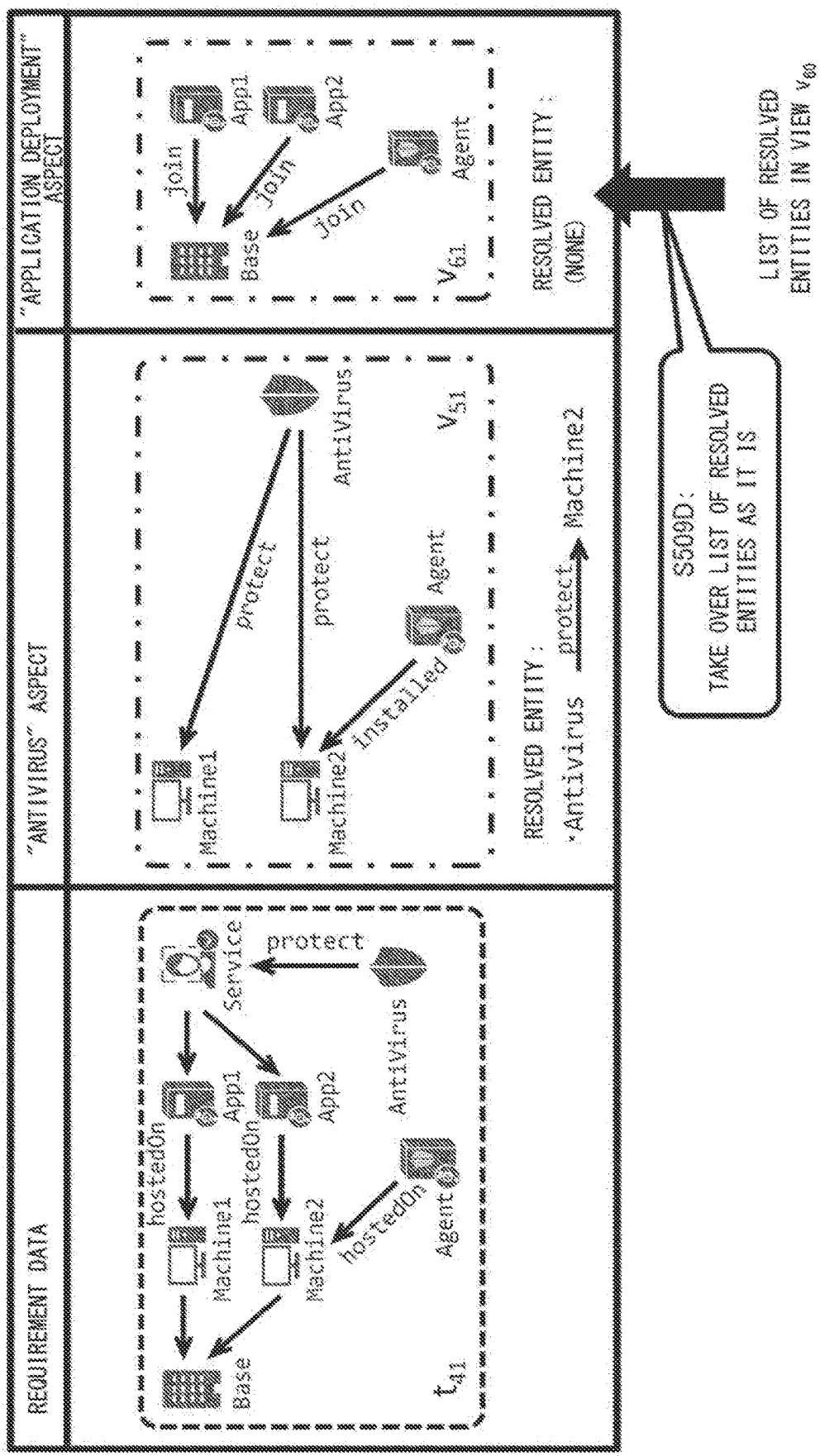
FIG. 56 is a view illustrating a concrete example of an operation of step S509 shown in FIG. 44.

Step S509D:

Thereafter, as shown in FIG. 56, the system requirement concretization unit 101 takes over the list of resolved entities in the view $v_{60}$ as it is as a list of resolved entities in the view $v_{61}$.

Effects of First Example Embodiment

As described above, according to the first example embodiment, the view generation unit 102 generates the view from the requirement data using the aspect model, and outputs the generated view as the pre-update view. The graph conversion unit 1011 converts the requirement data or the pre-update view using the graph conversion rule. The requirement data update unit 103 reflects the content of the post-update view, which is obtained after the pre-update view is converted, on the requirement data. The system requirement concretization unit 101 converts the requirement data using the graph conversion unit 1011 in a stepwise manner, or converts the pre-update view into the post-update view using the graph conversion unit 1011, and converts the requirement data by reflecting the content of the post-update view on the requirement data using the requirement data update unit 103 in a stepwise manner. Then, the system requirement concretization unit 101 outputs the requirement data, which is sufficiently concretized, as the concrete system configuration data.

As described above, according to the first example embodiment, it is possible to generate the view having explicitly the requirements not represented in the requirement data as the edge or the node, from the requirement data. Further, the mechanism is added to make concrete not only the requirements contained in the requirement data but also the requirements contained in the view. This makes it possible to handle requirements that cannot be represented in the requirement data.

Second Example Embodiment

Figure 57:
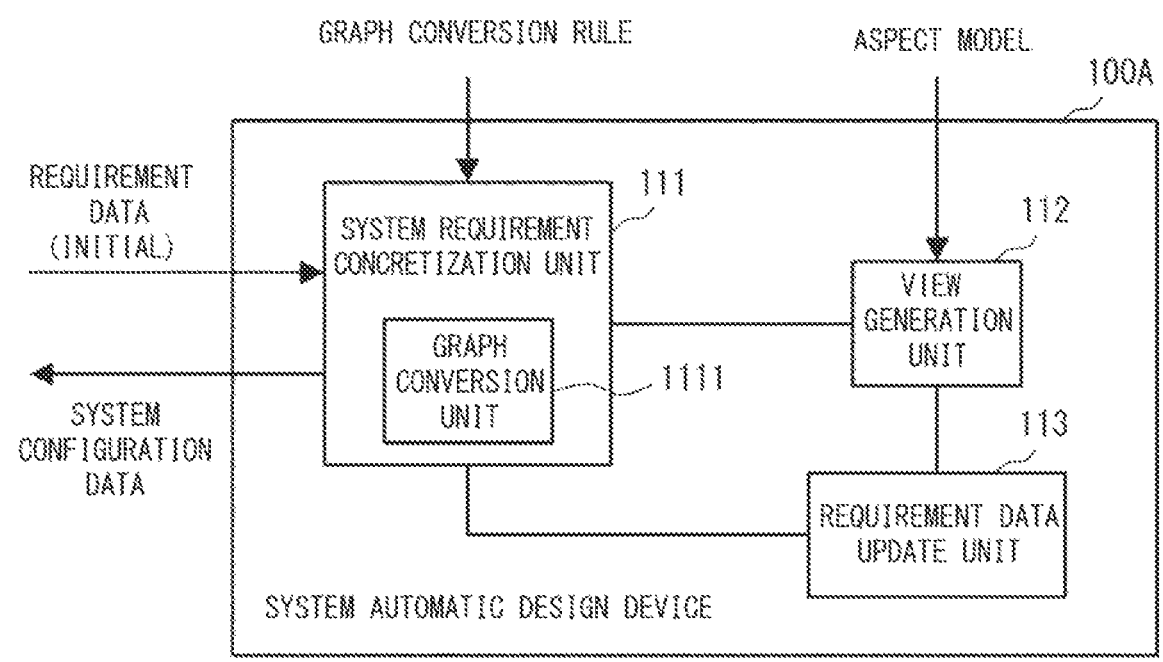
FIG. 57 is a block diagram showing a configuration example of a system automatic design device according to a second example embodiment.

Subsequently, a configuration example of a system automatic design device 100A according to the second example embodiment will be described with reference to FIG. 57. As shown in FIG. 57, the system automatic design device 100A according to the second example embodiment includes a system requirement concretization unit 111, a view generation unit 112, and a requirement data update unit 113. Further, the system requirement concretization unit 111 includes a graph conversion unit 1111. In FIG. 57, the graph conversion unit 1111 is provided inside the system requirement concretization unit 111, but may be provided outside the system requirement concretization unit 111.

The view generation unit 112 inputs requirement data that is a graph representing system requirements, and inputs an aspect model that is a model defining a conversion method of converting into a graph in which alternative representation of the system requirements represented by the requirement data is given. The view generation unit 112 generates a view that is a graph obtained by converting the requirement data using the aspect model, and outputs the generated view as a pre-update view. The view generation unit 112 corresponds to the view generation unit 102.

The graph conversion unit 1111 inputs the requirement data or the pre-update view, and inputs a graph conversion rule that is data representing a rule for converting a substructure, which matches a specific structure, into a more concretized entity for the requirement data or the pre-update view. The graph conversion unit 1111 converts the requirement data or the pre-update view using the graph conversion rule. The graph conversion unit 1111 corresponds to the graph conversion unit 1011.

The requirement data update unit 113 inputs the requirement data, and inputs a post-update view that is a view obtained after the pre-update view is converted by the graph conversion unit 1111. The requirement data update unit 113 reflects a content of the post-update view on the requirement data. The requirement data update unit 113 corresponds to the requirement data update unit 103.

The system requirement concretization unit 111 outputs system configuration data that is a graph in which the requirement data is concretized. At this time, the system requirement concretization unit 111 obtains system configuration data by repeatedly performing the operation of converting the requirement data by the graph conversion unit 1111 or converting the pre-update view into the post-update view by the graph conversion unit 1111, and reflecting the content of the post-update view on the requirement data by the requirement data update unit 113 to convert the requirement data. The system requirement concretization unit 111 corresponds to the system requirement concretization unit 101.

As described above, according to the second example embodiment, it is possible to generate the view having explicitly the requirements not represented in the requirement data as the edge or the node, from the requirement data. Further, the mechanism is added to make concrete not only the requirements contained in the requirement data but also the requirements contained in the view. This makes it possible to handle requirements that cannot be represented in the requirement data.

The graph conversion rule may include a requirement data concretization pattern for converting the requirement data and a view concretization pattern for converting the pre-update view. Further, the graph conversion unit 1111 may convert the requirement data using the requirement data concretization pattern, or may convert pre-update view using the view concretization pattern.

In addition, when the system requirement concretization unit 111 converts the requirement data by the graph conversion unit 1111, the view generation unit 112 may generate the pre-update view again from the converted requirement data.

Further, in a situation where a plurality of pre-update views are generated from the requirement data, in the case of converting one pre-update view of the plurality of pre-update views to the post-update view by the graph conversion unit 1111 and converting the requirement data by reflecting the content of the post-update view on the requirement data with the requirement data update unit 113, the system requirement concretization unit 111 may generate a pre-update view other than one pre-update view of the plurality of pre-update views again from the converted requirement data with the view generation unit 112.

Further, in the case of converting the pre-update view into the post-update view with the graph conversion unit 1111, the system requirement concretization unit 111 may add the converted entity in the post-update view to the list. In the case of converting the post-update view again with the graph conversion unit 1111, the system requirement concretization unit 111 may convert a substructure that is not on the list in the post-update view.

Further, the requirement data update unit 113 may acquire the pre-update view and calculate an additional operation, which adds an entity, from operations performed on the pre-update view by comparing the pre-update view with the post-update view. Then, the requirement data update unit 113 may add an entity corresponding to the entity added to the pre-update view by the additional operation to the requirement data.

In addition, the requirement data update unit 113 may further acquire a mapping table that is a table data in which entities in the requirement data are shown in a first column and entities in the pre-update view corresponding to the entities in the requirement data are shown in a second column of the same row. Further, the requirement data update unit 113 may calculate a delete operation of deleting entities from the operations performed on the pre-update view by comparing the pre-update view with the post-update view. Then, requirement data update unit 113 may delete the entities, which are deleted from the pre-update view by the delete operation, from the second column of the mapping table, and may delete an entity of which second column in the same row is empty among the entities shown in the first column, from the requirement data.

Third Example Embodiment

Figure 58:
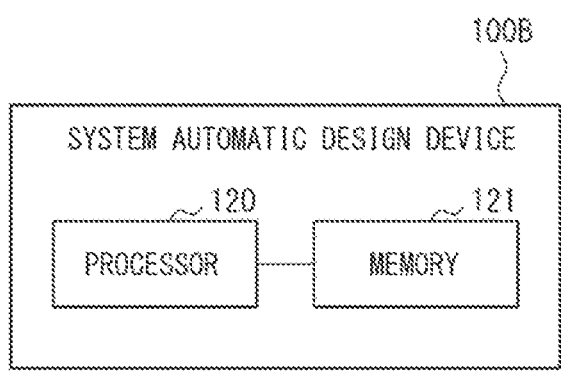
FIG. 58 is a block diagram showing a hardware configuration example of a system automatic design device according to a third example embodiment.

Subsequently, a description will be given with reference to FIG. 58 with respect to a hardware configuration example of a system automatic design device 100B according to a third example embodiment. As shown in FIG. 58, the system automatic design device 100B according to the third example embodiment includes a processor 120 and a memory 121.

The processor 120 may be, for example, a microprocessor, a micro processing unit (MPU), or a central processing unit (CPU). The processor 120 may include a plurality of processors.

The memory 121 is formed by a combination of a volatile memory and a nonvolatile memory. The memory 121 may include a storage located away from the processor 120. In this case, the processor 120 may access the memory 121 through an input/output interface (I/O interface, not shown).

The system automatic design device 100 according to the first example embodiment and the system automatic design device 100A according to the second example embodiment described above may have the hardware configuration shown in FIG. 58. The system requirement concretization unit 101, the view generation unit 102, the requirement data update unit 103, and the aspect model reading unit 104 in the system automatic design device 100 and the system requirement concretization unit 111, the view generation unit 112, the requirement data update unit 113, and the aspect model reading unit 104 in the system automatic design device 100A described above may be realized when the processor 120 reads and executes a program stored in the memory 121. In addition, the aspect model DB 105, the type information DB 106, and the graph conversion rule DB 107 in the system automatic design device 100 described above may be realized by the memory 121.

Further, the program described above includes a set of instructions (or software codes) for causing a computer to perform one or more functions described above in the example embodiments when being read into the computer. The program may be stored on a non-transitory computer-readable medium or a tangible storage medium. As an example, but not limited, the computer-readable medium or the tangible storage medium includes a random-access memory (RAM), a read-only memory (ROM), a flash memory, a solid-state drive (SSD) or other memory technologies, a CD-ROM, a digital versatile disc (DVD), a Blu-ray disc or other optical disc storages, a magnetic cassette, a magnetic tape, and a magnetic disc storage or other magnetic storage devices. The program may be transmitted on a transitory computer-readable medium or a communication medium. As an example, but not limited, the transitory computer-readable medium or the communication medium includes an electrical, optical, acoustic, or other forms of propagation signal.

Although the present disclosure is described above with reference to the example embodiments, the present disclosure is not limited to the above-described example embodiments. Various modifications that can be understood by those skilled in the art can be made to the configuration and details of the present disclosure within the scope of the present disclosure.

The first to third embodiments can be combined as desirable by one of ordinary skill in the art.

What is claimed is:

1. A system automatic design device comprising:
a view generation unit configured to input requirement data that is a graph representing system requirements, to input an aspect model that is a model defining a conversion method of converting into a graph in which alternative representation of the system requirements represented by the requirement data is given, to generate a view that is a graph obtained by converting the requirement data using the aspect model, and to output the generated view as a pre-update view;
a graph conversion unit configured to input the requirement data or the pre-update view, to input a graph conversion rule to the requirement data or the pre-update view, the graph conversion rule being data representing a rule for converting a substructure, which matches a specific structure, into a more concretized entity, and to convert the requirement data or the pre-update view using the graph conversion rule;
a requirement data update unit configured to input the requirement data, to input a post-update view that is a view obtained after the pre-update view is converted, and to reflect a content of the post-update view on the requirement data; and
a system requirement concretization unit configured to output system configuration data that is a graph in which the requirement data is concretized, wherein
the system requirement concretization unit being configured to obtain the system configuration data by repeatedly performing operations of:
converting the requirement data by the graph conversion unit, or
converting the pre-update view into the post-update view by the graph conversion unit, and converting the requirement data by reflecting the content of the post-update view on the requirement data by the requirement data update unit.

2. The system automatic design device according to claim 1, wherein
the graph conversion rule includes a requirement data concretization pattern for converting the requirement data and a view concretization pattern for converting the pre-update view, and
the graph conversion unit converts the requirement data using the requirement data concretization pattern or converts the pre-update view using the view concretization pattern.

3. The system automatic design device according to claim 1, wherein, when the requirement data is converted by the graph conversion unit, the system requirement concretization unit generates the pre-update view again from the converted requirement data by the view generation unit.

4. The system automatic design device according to claim 1, wherein in a situation where a plurality of pre-update views are generated from the requirement data, in a case of converting the one pre-update view of the plurality of pre-update views to the post-update view by the graph conversion unit and converting the requirement data by reflecting the content of the post-update view on the requirement data with the requirement data update unit, the system requirement concretization unit uses the view generation unit to generate the pre-update view other than the one pre-update view of the plurality of pre-update views again from the converted requirement data.

5. The system automatic design device according to claim 1, wherein the system requirement concretization unit is configured to:
add a converted entity in the post-update view to a list in a case of converting the pre-update view into the post-update view with the graph conversion unit; and
convert then a substructure that is not on the list in the post-update view in a case of converting the post-update view again with the graph conversion unit.

6. The system automatic design device according to claim 1, wherein the requirement data update unit is configured to:
acquire the pre-update view,
calculate an additional operation, which adds an entity, from operations performed on the pre-update view by comparing the pre-update view with the post-update view, and
add an entity corresponding to the entity added to the pre-update view by the additional operation to the requirement data.

7. The system automatic design device according to claim 6, wherein the requirement data update unit is configured to:
acquire a mapping table that is a table data in which entities in the requirement data are shown in a first column and entities in the pre-update view corresponding to the entities in the requirement data are shown in a second column in the same row,
calculate a delete operation of deleting entities, from operations performed on the pre-update view by comparing the pre-update view with the post-update view,
delete the entities, which are deleted from the pre-update view by the delete operation, from the second column of the mapping table, and
delete an entity of which the second column in the same row is empty among the entities shown in the first column, from the requirement data.

8. A system automatic design method performed by the system automatic design device, the method comprising:
a view generation step of inputting requirement data that is a graph representing system requirements, inputting an aspect model that is a model defining a conversion method of converting into a graph in which alternative representation of the system requirements represented by the requirement data is given, generating a view that is a graph obtained by converting the requirement data using the aspect model, and outputting the generated view as a pre-update view;
a graph conversion step of inputting the requirement data or the pre-update view, inputting a graph conversion rule to the requirement data or the pre-update view, the graph conversion rule being data representing a rule for converting a substructure, which matches a specific structure, into a more concretized entity, and converting the requirement data or the pre-update view using the graph conversion rule; and
a requirement data update step of inputting the requirement data, inputting a post-update view that is a view obtained after the pre-update view is converted, and reflecting a content of the post-update view on the requirement data, wherein
system configuration data being a graph in which the requirement data is concretized is obtained by repeatedly performing operations of:
converting the requirement data by the graph conversion step, or
converting the pre-update view into the post-update view by the graph conversion step, and converting the requirement data by reflecting the content of the post-update view on the requirement data by the requirement data update step.

9. A non-transitory computer-readable medium in which a program is stored, the program causing a computer to execute:
- a view generation function of inputting requirement data that is a graph representing system requirements, inputting an aspect model that is a model defining a conversion method of converting into a graph in which alternative representation of the system requirements represented by the requirement data is given, generating a view that is a graph obtained by converting the requirement data using the aspect model, and outputting the generated view as a pre-update view;
- a graph conversion function of inputting the requirement data or the pre-update view, inputting a graph conversion rule to the requirement data or the pre-update view, the graph conversion rule being data representing a rule for converting a substructure, which matches a specific structure, into a more concretized entity, and converting the requirement data or the pre-update view using the graph conversion rule;
- a requirement data update function of inputting the requirement data, to input a post-update view that is a view obtained after the pre-update view is converted, and reflecting a content of the post-update view on the requirement data; and
- a system requirement concretization function of outputting system configuration data that is a graph in which the requirement data is concretized, wherein in the system requirement concretization function, the system configuration data is obtained by repeatedly performing operations of:

converting the requirement data by the graph conversion function, or converting the pre-update view into the post-update view by the graph conversion function, and converting the requirement data by reflecting the content of the post-update view on the requirement data by the requirement data update function.

* * * * *